United States Patent
Kleinpeter et al.

(10) Patent No.: US 10,691,721 B2
(45) Date of Patent: *Jun. 23, 2020

(54) RESTRICTIVE ACCESS CONTROL LIST

(71) Applicant: Dropbox, Inc., San Francisco, CA (US)

(72) Inventors: Thomas Kleinpeter, Seattle, WA (US); Tony Xu, Seattle, WA (US); Alex Sydell, Seattle, WA (US); Nils Bunger, Palo Alto, CA (US); Sam Jau, San Francisco, CA (US); Aaron Staley, San Francisco, CA (US); Sara Lin, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,514

(22) Filed: Aug. 31, 2018

(65) Prior Publication Data

US 2019/0266342 A1    Aug. 29, 2019

Related U.S. Application Data

(63) Continuation of application No. 15/857,708, filed on Dec. 29, 2017, now Pat. No. 10,095,879.

(Continued)

(51) Int. Cl.
*G06F 21/62* (2013.01)
*G06F 21/60* (2013.01)
(Continued)

(52) U.S. Cl.
CPC .............. *G06F 16/27* (2019.01); *G06F 1/04* (2013.01); *G06F 3/065* (2013.01); *G06F 3/067* (2013.01);
(Continued)

(58) Field of Classification Search
CPC .......................... G06F 16/907; G06F 16/182
See application file for complete search history.

(56) References Cited

U.S. PATENT DOCUMENTS 5,335,346 A    8/1994 Fabbio
5,778,389 A    7/1998 Pruett et al.
(Continued)

FOREIGN PATENT DOCUMENTS

| CN | 106897352 A | 6/2017 |
| CN | 106941504 A | 7/2017 |
| WO | 2015055035 A1 | 4/2015 |

OTHER PUBLICATIONS

Kristal T. Pollack and Scott Brandt, "Efficient Access Control for Distributed Hierarchical File Systems." Source: Proceedings—Twenty-second IEEE/Thirteenth NASA Goddard Conference on Mass Storage Systems and Technologies, IEEE/NASA MSST2005, Apr. 11, 2005-Apr. 14, 2005, pp. 253-260.

(Continued)

*Primary Examiner* — Ali Shayanfar
(74) *Attorney, Agent, or Firm* — Polsinelli PC

(57) ABSTRACT

The present technology pertains to a organization directory hosted by a synchronized content management system. The corporate directory can provide access to user accounts for all members of the organization to all content items in the organization directory on the respective file systems of the members' client devices. Members can reach any content item at the same path as other members relative to the organization directory root on their respective client device. In some embodiments novel access permissions are granted to maintain path consistency.

15 Claims, 50 Drawing Sheets

Related U.S. Application Data

(60) Provisional application No. 62/611,473, filed on Dec. 28, 2017.

(51) Int. Cl.

| | | |
|---|---|---|
| *G06F 16/27* | (2019.01) | |
| *G06F 16/11* | (2019.01) | |
| *G06F 16/18* | (2019.01) | |
| *G06F 16/178* | (2019.01) | |
| *G06F 16/176* | (2019.01) | |
| *G06F 16/23* | (2019.01) | |
| *G06F 16/22* | (2019.01) | |
| *H04L 29/08* | (2006.01) | |
| *G06F 16/182* | (2019.01) | |
| *G06F 1/04* | (2006.01) | |
| *G06F 16/185* | (2019.01) | |
| *H04L 29/06* | (2006.01) | |
| *G06F 16/16* | (2019.01) | |
| *G06F 16/13* | (2019.01) | |
| *G06F 16/174* | (2019.01) | |
| *G06F 16/14* | (2019.01) | |
| *G06F 16/907* | (2019.01) | |
| *G06F 16/17* | (2019.01) | |
| *G06F 3/06* | (2006.01) | |
| *G06F 9/54* | (2006.01) | |
| *G06F 12/14* | (2006.01) | |
| *G06F 16/2455* | (2019.01) | |
| *G06F 16/172* | (2019.01) | |
| *G06F 11/14* | (2006.01) | |
| *G06F 21/10* | (2013.01) | |
| *G06F 16/958* | (2019.01) | |
| *G06F 16/901* | (2019.01) | |
| *G06F 16/951* | (2019.01) | |
| *G06F 16/955* | (2019.01) | |
| *H04L 9/32* | (2006.01) | |

(52) U.S. Cl.
CPC .......... *G06F 3/0619* (2013.01); *G06F 3/0623* (2013.01); *G06F 3/0629* (2013.01); *G06F 3/0652* (2013.01); *G06F 9/547* (2013.01); *G06F 11/1469* (2013.01); *G06F 12/1466* (2013.01); *G06F 16/11* (2019.01); *G06F 16/113* (2019.01); *G06F 16/116* (2019.01); *G06F 16/119* (2019.01); *G06F 16/122* (2019.01); *G06F 16/125* (2019.01); *G06F 16/128* (2019.01); *G06F 16/13* (2019.01); *G06F 16/137* (2019.01); *G06F 16/148* (2019.01); *G06F 16/152* (2019.01); *G06F 16/156* (2019.01); *G06F 16/16* (2019.01); *G06F 16/162* (2019.01); *G06F 16/168* (2019.01); *G06F 16/172* (2019.01); *G06F 16/176* (2019.01); *G06F 16/178* (2019.01); *G06F 16/1734* (2019.01); *G06F 16/1744* (2019.01); *G06F 16/1767* (2019.01); *G06F 16/1787* (2019.01); *G06F 16/18* (2019.01); *G06F 16/182* (2019.01); *G06F 16/183* (2019.01); *G06F 16/184* (2019.01); *G06F 16/185* (2019.01); *G06F 16/1827* (2019.01); *G06F 16/1844* (2019.01); *G06F 16/2246* (2019.01); *G06F 16/2255* (2019.01); *G06F 16/2322* (2019.01); *G06F 16/2358* (2019.01); *G06F 16/2365* (2019.01); *G06F 16/2379* (2019.01); *G06F 16/24552* (2019.01); *G06F 16/275* (2019.01); *G06F 16/907* (2019.01); *G06F 16/9027* (2019.01); *G06F 16/951* (2019.01); *G06F 16/955* (2019.01); *G06F 16/958* (2019.01); *G06F 21/10* (2013.01); *G06F 21/604* (2013.01); *G06F 21/6218* (2013.01); *H04L 9/3213* (2013.01); *H04L 9/3247* (2013.01); *H04L 63/08* (2013.01); *H04L 63/0853* (2013.01); *H04L 63/10* (2013.01); *H04L 63/101* (2013.01); *H04L 63/102* (2013.01); *H04L 67/06* (2013.01); *H04L 67/1095* (2013.01); *H04L 67/1097* (2013.01); *G06F 2201/84* (2013.01); *G06F 2212/1052* (2013.01); *G06F 2221/2141* (2013.01); *H04L 67/306* (2013.01); *H04L 67/42* (2013.01)

(56) References Cited

U.S. PATENT DOCUMENTS

| | | | |
|---|---|---|---|
| 5,802,253 | A | 9/1998 | Gross et al. |
| 5,956,715 | A | 9/1999 | Glasser et al. |
| 6,408,298 | B1 | 6/2002 | Van et al. |
| 6,560,655 | B1 | 5/2003 | Grambihler et al. |
| 6,618,735 | B1 | 9/2003 | Krishnaswami et al. |
| 6,665,863 | B1 | 12/2003 | Lord et al. |
| 7,024,392 | B2 | 4/2006 | Stefik et al. |
| 7,051,039 | B1 | 5/2006 | Murthy et al. |
| 7,263,718 | B2 * | 8/2007 | O'Brien ................ G06F 21/53 726/14 |
| 7,275,177 | B2 | 9/2007 | Armangau et al. |
| 7,529,931 | B2 | 5/2009 | Vasishth et al. |
| 7,567,991 | B2 | 7/2009 | Armangau et al. |
| 7,734,690 | B2 | 6/2010 | Moromisato et al. |
| 7,925,631 | B1 | 4/2011 | Thillai et al. |
| 7,962,950 | B2 | 6/2011 | Choo et al. |
| 8,015,204 | B2 | 9/2011 | Kaler et al. |
| 8,180,747 | B2 | 5/2012 | Marinkovic et al. |
| 8,250,397 | B2 | 8/2012 | Marcy et al. |
| 8,326,874 | B2 | 12/2012 | Wright et al. |
| 8,359,467 | B2 | 1/2013 | Subramanian et al. |
| 8,417,676 | B2 | 4/2013 | Petri |
| 8,661,070 | B2 | 2/2014 | Goldsmith et al. |
| 8,661,539 | B2 * | 2/2014 | Hodges ................ H04L 29/06 709/224 |
| 8,688,734 | B1 * | 4/2014 | Tidd .................... G06F 21/6218 707/783 |
| 8,706,701 | B1 | 4/2014 | Stefanov et al. |
| 8,904,503 | B2 * | 12/2014 | Agbabian ........... G06F 21/6245 380/277 |
| 8,949,179 | B2 | 2/2015 | Besen et al. |
| 9,129,088 | B1 | 9/2015 | Baschy |
| 9,210,116 | B2 | 12/2015 | Jeng et al. |
| 9,239,841 | B2 | 1/2016 | Arnaudov et al. |
| 9,294,485 | B2 | 3/2016 | Allain et al. |
| 9,300,609 | B1 | 3/2016 | Beausoleil et al. |
| 9,310,981 | B2 | 4/2016 | Lynch et al. |
| 9,325,571 | B2 | 4/2016 | Chen |
| 9,330,106 | B2 | 5/2016 | Piasecki et al. |
| 9,336,219 | B2 | 5/2016 | Makkar et al. |
| 9,336,227 | B2 | 5/2016 | Eberlein et al. |
| 9,361,473 | B2 | 6/2016 | Chou Fritz et al. |
| 9,413,708 | B1 | 8/2016 | Michael et al. |
| 9,424,437 | B1 | 8/2016 | Ancin et al. |
| 9,426,216 | B2 | 8/2016 | Subramani et al. |
| 9,430,669 | B2 | 8/2016 | Staley et al. |
| 9,432,457 | B2 | 8/2016 | Marano et al. |
| 9,449,082 | B2 | 9/2016 | Leonard |
| 9,449,182 | B1 | 9/2016 | Dang et al. |
| 9,479,567 | B1 | 10/2016 | Koorapati et al. |
| 9,479,578 | B1 | 10/2016 | Swanson |
| 9,483,491 | B2 | 11/2016 | Wijayaratne et al. |
| 9,495,478 | B2 | 11/2016 | Hendrickson et al. |
| 9,507,795 | B2 | 11/2016 | Dorman et al. |
| 9,529,804 | B1 | 12/2016 | Muddu et al. |
| 9,529,818 | B2 | 12/2016 | Catmull et al. |
| 9,542,404 | B2 | 1/2017 | Moore et al. |
| 9,558,202 | B2 | 1/2017 | Lockhart et al. |
| 9,563,638 | B2 | 2/2017 | Newhouse |

(56) References Cited

U.S. PATENT DOCUMENTS

| | | | |
|---|---|---|---|
| 9,589,131 B2 | 3/2017 | Austin | |
| 9,596,246 B2 | 3/2017 | Peddada | |
| 9,648,088 B1 | 5/2017 | Pande | |
| 9,652,490 B2 | 5/2017 | Belanger et al. | |
| 9,703,800 B1 | 7/2017 | Korshunov et al. | |
| 9,703,801 B2 | 7/2017 | Melahn et al. | |
| 9,710,535 B2 | 7/2017 | Aizman et al. | |
| 9,754,119 B1 | 9/2017 | Kilday | |
| 9,767,106 B1 | 9/2017 | Duggal et al. | |
| 9,773,051 B2 | 9/2017 | Smith | |
| 9,805,054 B2 | 10/2017 | Davis et al. | |
| 9,817,987 B2 | 11/2017 | Mityagin | |
| 9,824,090 B2 | 11/2017 | Hayrapetian et al. | |
| 9,830,345 B1 | 11/2017 | Baars | |
| 9,838,424 B2 | 12/2017 | Brady | |
| 9,852,147 B2 | 12/2017 | Von Muhlen et al. | |
| 9,922,201 B2 | 3/2018 | Von Muhlen et al. | |
| 9,936,020 B2* | 4/2018 | Leggette | H04L 67/1097 |
| 10,037,339 B1 | 7/2018 | Kleinpeter et al. | |
| 2004/0080549 A1 | 4/2004 | Lord et al. | |
| 2005/0149450 A1 | 7/2005 | Stefik et al. | |
| 2005/0151738 A1 | 7/2005 | Lord et al. | |
| 2005/0222996 A1 | 10/2005 | Yalamanchi | |
| 2007/0016771 A1 | 1/2007 | Allison et al. | |
| 2007/0067349 A1 | 3/2007 | Jhaveri et al. | |
| 2007/0156670 A1* | 7/2007 | Lim | G06F 21/6218 |
| 2007/0208948 A1 | 9/2007 | Costa-Requena et al. | |
| 2007/0250552 A1 | 10/2007 | Lango et al. | |
| 2008/0059474 A1* | 3/2008 | Lim | G06F 21/604 |
| 2010/0235649 A1* | 9/2010 | Jeffries | G06F 21/6209 713/189 |
| 2012/0079606 A1 | 3/2012 | Evans et al. | |
| 2012/0102539 A1 | 4/2012 | Robb et al. | |
| 2012/0254123 A1 | 10/2012 | Ferguson et al. | |
| 2013/0014023 A1 | 1/2013 | Lee et al. | |
| 2013/0067542 A1 | 3/2013 | Gonsalves et al. | |
| 2013/0086640 A1 | 4/2013 | Hashimoto et al. | |
| 2013/0191631 A1* | 7/2013 | Ylonen | H04L 63/16 713/153 |
| 2013/0268480 A1 | 10/2013 | Dorman | |
| 2013/0318160 A1 | 11/2013 | Beraka et al. | |
| 2013/0346557 A1 | 12/2013 | Chang et al. | |
| 2014/0075501 A1* | 3/2014 | Srinivasan | H04L 63/20 726/1 |
| 2014/0173694 A1 | 6/2014 | Kranz | |
| 2014/0189355 A1 | 7/2014 | Hunter | |
| 2014/0201145 A1 | 7/2014 | Dorman et al. | |
| 2014/0258350 A1 | 9/2014 | Duval et al. | |
| 2014/0258418 A1 | 9/2014 | Subramani et al. | |
| 2014/0282851 A1 | 9/2014 | Miller et al. | |
| 2014/0310175 A1 | 10/2014 | Coronel | |
| 2014/0317128 A1 | 10/2014 | Simeonov et al. | |
| 2014/0359085 A1 | 12/2014 | Chen | |
| 2015/0026597 A1 | 1/2015 | Gadamsetty et al. | |
| 2015/0026604 A1 | 1/2015 | Mulukuri et al. | |
| 2015/0058932 A1 | 2/2015 | Faitelson et al. | |
| 2015/0101021 A1 | 4/2015 | McErlean et al. | |
| 2015/0120763 A1 | 4/2015 | Grue et al. | |
| 2015/0134600 A1 | 5/2015 | Eisner et al. | |
| 2015/0154418 A1 | 6/2015 | Redberg | |
| 2015/0186668 A1 | 7/2015 | Whaley et al. | |
| 2015/0205977 A1* | 7/2015 | Rundle | G06F 21/6218 707/781 |
| 2015/0222580 A1 | 8/2015 | Grue | |
| 2015/0222615 A1 | 8/2015 | Allain et al. | |
| 2015/0248384 A1 | 9/2015 | Luo et al. | |
| 2015/0286833 A1 | 10/2015 | Resch et al. | |
| 2015/0288680 A1 | 10/2015 | Leggette | |
| 2015/0296012 A1 | 10/2015 | Piyush et al. | |
| 2015/0370825 A1 | 12/2015 | Outcalt et al. | |
| 2016/0028796 A1 | 1/2016 | Garcia et al. | |
| 2016/0036822 A1 | 2/2016 | Kim et al. | |
| 2016/0050177 A1 | 2/2016 | Cue et al. | |
| 2016/0062839 A1 | 3/2016 | Kapoor | |
| 2016/0065672 A1 | 3/2016 | Savage | |
| 2016/0103750 A1 | 4/2016 | Cooper et al. | |
| 2016/0110374 A1 | 4/2016 | Wetherall et al. | |
| 2016/0285890 A1 | 9/2016 | Beausoleil et al. | |
| 2016/0291856 A1 | 10/2016 | von Muhlen et al. | |
| 2016/0292179 A1 | 10/2016 | Von Muhlen et al. | |
| 2016/0292443 A1 | 10/2016 | von Muhlen et al. | |
| 2016/0294916 A1 | 10/2016 | Daher et al. | |
| 2016/0315941 A1* | 10/2016 | Dang | G06F 16/192 |
| 2016/0321293 A1 | 11/2016 | Auer | |
| 2016/0323358 A1 | 11/2016 | Malhotra et al. | |
| 2016/0337356 A1 | 11/2016 | Simon et al. | |
| 2016/0349999 A1 | 12/2016 | Adler et al. | |
| 2016/0352752 A1 | 12/2016 | Bush et al. | |
| 2017/0005974 A1 | 1/2017 | Wheeler et al. | |
| 2017/0026379 A1 | 1/2017 | Lu et al. | |
| 2017/0039216 A1 | 2/2017 | Fan et al. | |
| 2017/0075921 A1 | 3/2017 | Benton et al. | |
| 2017/0078383 A1 | 3/2017 | Murstein et al. | |
| 2017/0109370 A1* | 4/2017 | Newhouse | H04L 67/06 |
| 2017/0123931 A1 | 5/2017 | Aizman et al. | |
| 2017/0193448 A1 | 7/2017 | Piyush et al. | |
| 2017/0235759 A1 | 8/2017 | Altaparmakov et al. | |
| 2017/0270136 A1 | 9/2017 | Chen et al. | |
| 2017/0289210 A1 | 10/2017 | Pai et al. | |
| 2017/0302737 A1 | 10/2017 | Piyush et al. | |
| 2017/0308598 A1 | 10/2017 | Goldberg et al. | |
| 2017/0308599 A1 | 10/2017 | Newhouse | |
| 2017/0316222 A1* | 11/2017 | Muhlestein | G06F 16/13 |
| 2017/0357663 A1 | 12/2017 | Giampaolo | |
| 2018/0039788 A1 | 2/2018 | Leggette | |
| 2018/0089349 A1 | 3/2018 | Rezgui | |
| 2018/0121370 A1* | 5/2018 | Mukkamala | H04L 63/0272 |
| 2018/0260125 A1 | 9/2018 | Botes et al. | |
| 2018/0270534 A1 | 9/2018 | Badawiyeh | |
| 2019/0207940 A1 | 7/2019 | Kleinpeter et al. | |

OTHER PUBLICATIONS

"CentreStack", Gladinet, Inc., Boca Raton, FL, May 30, 2015 (Available online at https://webcache.googleusercontent.com/search?q=cache:R3ogLpu7xJYJ:https://www.gladinet.com/library/admin/index.htm+&cd=1&hl=en&ct=clnk&gl=us, last visited Feb. 8, 2018).

Salman Niazi et al., "HopsFS: Scaling Hierarchical File System Metadata Using NewSQL Databases," The 15th USENIX Conference on File and Storage Technologies (FAST 17) (2017), pp. 89-104, Submitted on Jun. 6, 2016 (v1), last revised Feb. 22, 2017 (this version, v2)).

Wolff, David, "A Web-Based Tool for Managing the Submission of Student Work", Journal of Computing Sciences in Colleges, vol. 20, Issue 2, Dec. 2004, pp. 144-153.

Kappes, Giorgos, et al., "Virtualization-aware Access Control for Multitenant Filesystems", MSST 2014, Santa Clara, CA, Jun. 2-6, 2014, pp. 1-6.

Biztalker, "Optimizing Business Rule Engine (BRE) Performance," Jun. 7 2017, retrieved from https://docs.microsoft.com/en-us/biztalk/technical-guides/optimizing-business-rule-engine-bre-perfor . . . , on Oct. 22, 2019, 5 Pages.

Non-Final Office Action from U.S. Appl. No. 15/857,729, dated Nov. 20, 2019, 12 pages.

Non-Final Office Action from U.S. Appl. No. 15/857,766, dated Oct. 31, 2019, 27 pages.

Non-Final Office Action from U.S. Appl. No. 15/857,772, dated Nov. 25, 2019, 11 pages.

Non-Final Office Action from U.S. Appl. No. 15/857,725, dated Jan. 2, 2020, 10 pages.

Non-Final Office Action from U.S. Appl. No. 15/857,779, dated Jan. 17, 2020, 17 pages.

Non-Final Office Action from U.S. Appl. No. 15/857,789, dated Jan. 22, 2020, 15 pages.

RUBYRAILESGUIDE, "Active Record Callbacks," Nov. 18, 2016, retrieved from https://web.archive.org/web/20161118225731/http://guides.rubyonrails.org/active_record_callbacks.html, on Dec. 13, 2019, 11 Pages.

NTFS, "File and Folder Basic NTFS Permissions," Dec. 7, 2016, retrieved from http://www.ntfs.com/ntfs-permissions-file-folder.htm, on Jan. 14, 2020, 9 Pages.

(56) References Cited

OTHER PUBLICATIONS

Requirement for Restriction/Election from U.S. Appl. No. 15/857,588, dated Jan. 29, 2020, 6 pages.
Non-Final Office Action from U.S. Appl. No. 15/857,732, dated Dec. 27, 2019, 29 pages.
Non-Final Office Action from U.S. Appl. No. 15/857,784, dated Dec. 19, 2019, 18 pages.
Ucar, "Setting file and directory permissions," Sep. 2017, retrieved from https://webarchive.org/web/20170920093821/https://www2.cisl.ucar.edu/user-support/Setting-file-and- . . . , on Dec. 8, 2019, 5 Pages.
Non-Final Office Action from U.S. Appl. No. 15/857,715, dated Feb. 20, 2020, 8 pages.
Final Office Action from U.S. Appl. No. 15/857,732, dated May 1, 2020, 26 pages.
Microsoft Outlook, "Cannot Copy this folder because it may contain private items," Feb. 23, 2015, retrieved from http://techy-wire.blogspot.com/2015/02/cannot-copy-this-folder-because-it-may.html, 3 pages.

\* cited by examiner

147

| Namespace/Directory | Access Control List |
|---|---|
| 240 → Member 1 (ns_id = 45) | Write (Member 1) |
| 241 → Marketing (ns_id = 2) | Write (Marketing) |
| 243 → folder 221 (ns_id=4) | Write (Marketing), Read (Member 1) |
| 244 → Finance (ns_id = 3) | Write (Finance) |

| Namespace/Directory | Access Control List |
|---|---|
| 245 → *Design (ns_id = 9)* | |
| 246 → *folder 223 (ns_id=3, dir_id=101)* | |

FIG. 3

| dir_id | ns_id | t_user_id | path | target_ns | active |
|---|---|---|---|---|---|
| 45 | 45 | Empl_1 | /Member_1 | 1 | 1 |
| 18 | 18 | | /Design | 1 | 1 |
| 3 | 3 | Empl_2 | /Member_2 | 1 | 1 |
| 23 | 23 | | /Member_Handbook | 1 | 1 |
| 3 | 3 | | /Finance | 1 | 1 |
| 65 | 65 | Empl_3 | /Member_3 | 1 | 1 |
| 101 | 3 | | /Finance/folder 223 | 1 | 1 |
| 2 | 2 | | /Marketing | 1 | 1 |
| 4 | 4 | | /folder 221 | 2 | 1 |
| 9 | 9 | | /Design | 1 | 1 |
| 1 | 1 | | /Acme/ | root | 1 |

FIG. 6

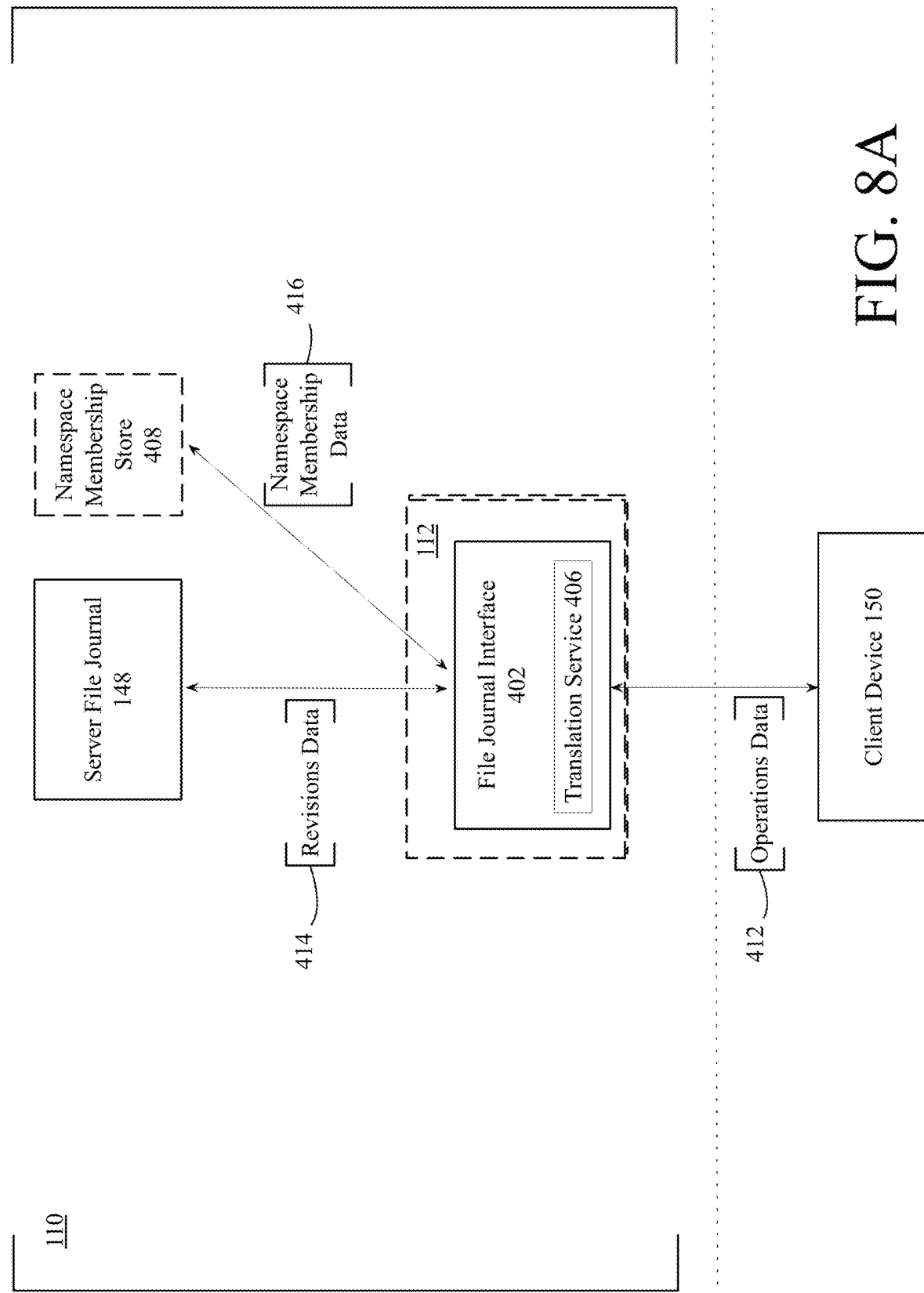

Member 1's View Before Access Change
Member 1's View After Access Change
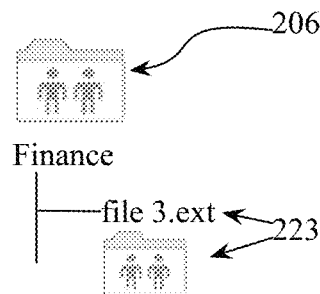
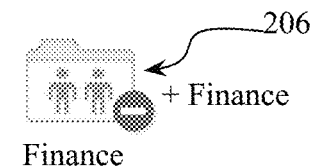
Finance
Finance
FIG. 18

| | Read Content | Write | Read-name-only | No Access | Traverse |
|---|---|---|---|---|---|
| Read Content | no action | mount edit | unmount and re-mount | unmount | unmount and mount traversal paths |
| Write | mount edit | no action | unmount and re-mount | unmount | unmount and mount traversal paths |
| Read-name-only | unmount and re-mount | unmount and re-mount | no action | unmount | unmount and mount traversal paths |
| No Access | mount | mount | mount | no action | mount traversal paths |
| Traverse | unmount and re-mount | unmount and re-mount | unmount and re-mount | unmount | no action |

FIG. 20

| Criteria | Warning (will be accompanied by informational message) | Solution |
|---|---|---|
| content item was in team-shared folder, now in user folder | Can't move "[folder_name]" to your member folder | Undo move, or change access |
| Delete of user account folder | Can't delete your user account folder | Undo delete |
| Move folder from org. directory that is read only | Can't move "[folder_name]" to "[destination name]" | Undo move |
| Rename in org. directory that is read only | Can't rename "[folder_name]" | Undo rename |
| Move from team-shared folder | Can't move "[folder_name]" to "[destination name]" | Undo move, or change access |
| Move from confidential folder to non-confidential folder | Can't move "[folder_name]" to "[destination name]" | Undo move, or change access |
| New content added to team-shared folder | Save to "{team-shared folder}" | Give option to continue or save to user account folder |
| Move content item outside confidential folder | Share with everyone who can access "[parent_folder]"? | Give option to continue or cancel. |
| Admin, but not in admin console - deletes from org. directory. | Can't delete "[folder_name]". To delete the folder, use the admin console. | Undo, and give option to launch admin console |
| Delete on-demand content item | This is a on-line only "[content item]" and will be removed from your account. It won't be moved to your trash. | Give option to continue or cancel. |
| Delete 100+ content items | Are you sure you want to delete these "[content item(s)]" They will be deleted from your account. | Give option to continue, cancel, or make the content items online only. |
| Unmount of shared folder, not a move | Are you sure you want to delete these "[content item(s)]"? They will be deleted from your account, but will remain accessible to others to whom the shared folder has been shared. | Give option to continue, cancel, or learn about shared folders. |
| Delete content item from shared folder. | Are you sure you want to delete these "[content item(s)]" They will be deleted for all members of the "[shared folder]". | Give option to continue or cancel. |

FIG. 25

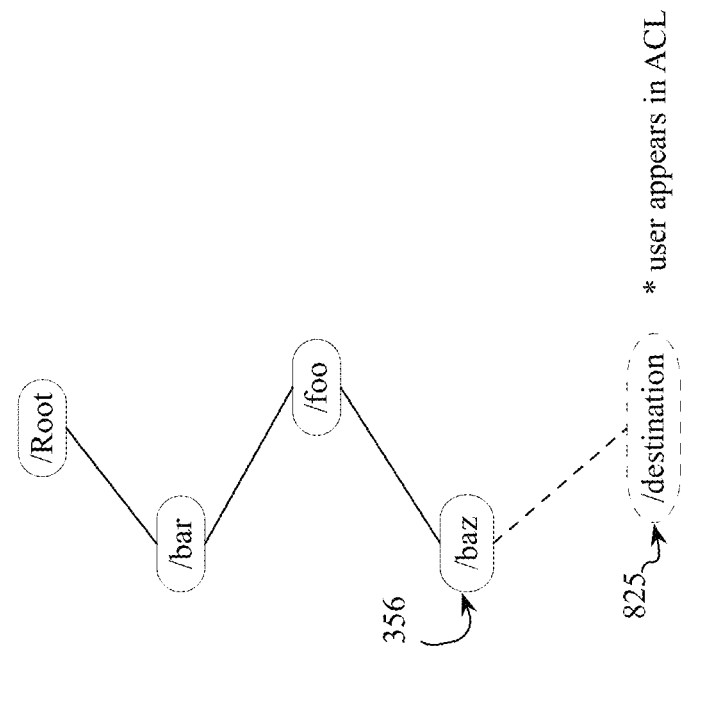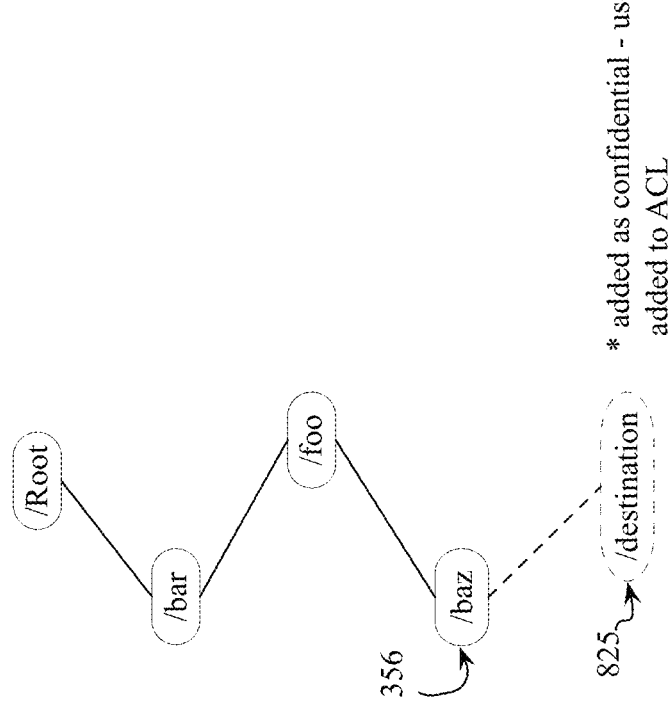
FIG. 30B

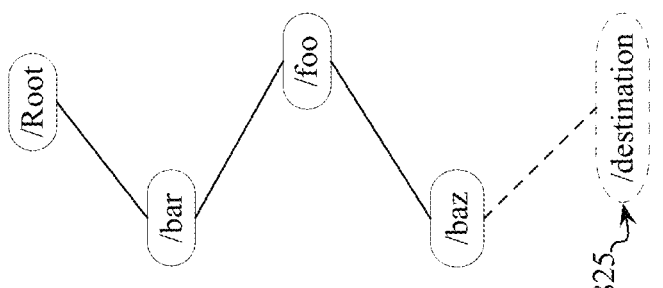
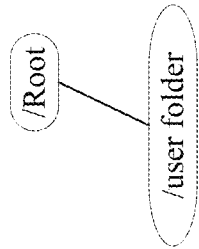
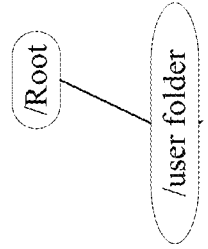
FIG. 30C from mount table:

```
mounts for ns=acme
acme/Member_1
acme/design
acme/Member_handbook
acme/finance
acme/marketing
``` from namespace view builder:

```
ns=Member_1
paths=
Member_1/shared_with_user_Z
Member_1/unshared.tx
Member_1/
```

RESTRICTIVE ACCESS CONTROL LIST

CROSS-REFERENCE TO RELATED APPLICATIONS

This application is a continuation of U.S. application Ser. No. 15/857,708, filed on Dec. 29, 2017, which claims the benefit of U.S. Provisional Application No. 62/611,473, filed on Dec. 28, 2017; both of which are expressly incorporated by reference herein in their entireties.

TECHNICAL FIELD

The present technology pertains to providing a cloud based corporate directory, and more specifically pertains to cloud based corporate directory service that is synchronized amongst user devices and which offers private and shared collections.

BACKGROUND

Organizations have long utilized a space to store their data and content items. Before computers, content items went to repositories or file rooms. With the advent of networked computers, a shared network drive was made accessible to members of the organization. In both paradigms, the overall goal was the same—to provide a location where all of an organization's data could be stored and accessed by anyone with sufficient rights.

One modern storage paradigm utilizes a synchronized content management system that offers services such as synchronizing copies of content items locally onto a client computer, sharing outside of an organization, and more. However, the additional features offered by the synchronized content management system create a great number of technical challenges to safely store all of an organization's content items while maintaining appropriate rights management.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3 shows an example restrictive access control list in accordance with some embodiments of the present technology;

FIG. 6 shows an example mount table in accordance with some embodiments of the present technology;

FIG. 8A shows an example of communications processed by a file journal interface between a client device and a server file journal on a content management system in accordance with some embodiments of the present technology;

FIG. 18 shows an example of a member's directory before and after an access change in accordance with some embodiments of the present technology;

FIG. 20 shows an example table with possible access transitions in accordance with some embodiments of the present technology;

FIG. 25 shows an example table of several file system warnings in accordance with some embodiments of the present technology;

FIG. 30A, FIG. 30B, and FIG. 30C show example locations in which a shared content item could be stored in accordance with some embodiments of the present technology;

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a synchronized content management system that provides an organization centric storage model. As will be addressed in more detail below, in the synchronized content management system, collections and content items are synchronized between cloud storage and one or more client devices. Collections and content items stored on a client device are under the management of an operating system on the client device, and thus the synchronized content management system has limited control over actions taken on the client device. Furthermore, since multiple user accounts within an organization can access and make changes to the same collections and content items, this poses risks with respect to maintaining correct access privileges to content items when access rights to directories suddenly changed, or directories are moved or deleted.

Additionally, it can be desirable within an organization-wide storage space that anyone within an organization that has access to a particular collection or content item has access to the data under the same file path. This facilitates knowledge sharing by making it more simple to discuss resources that might be available in the organization's storage space. However, maintaining consistent file paths across the organization can create access permission problems. For example, a human resources department may have a collection that must have restricted access, but the human resources department may also have a collection that can be shared outside of the human resources department. If the collections were organized in the most logical way where all human resources content items are in the same collection, this would require either very careful collection organization, or would require an innovative data model and permissions management schema. The present technology provides the later.

Figure 1:
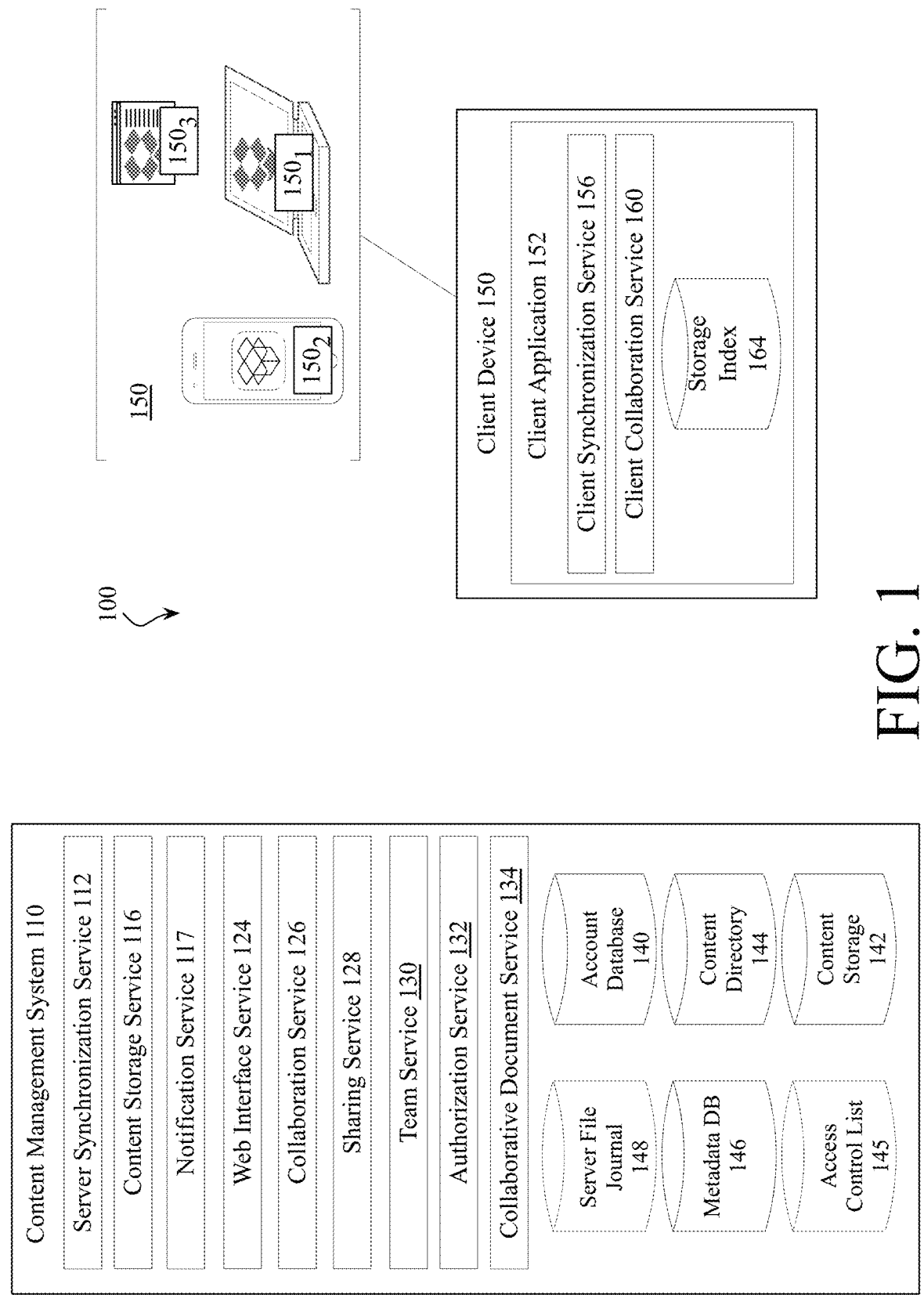
FIG. 1 shows an example of a content management system and client devices in accordance with some embodiments of the present technology.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for an organization, with sub-teams (e.g., business units, or project teams, etc.), and user accounts assigned to teams and sub-teams, or teams can be created for any defined group of user accounts. Teams service 130 can provide an organization directory which is a common shared space for the team that can include private user account folders, and team-shared folders. Teams service can also provide a management interface for an administrator to manage collections in organization directory and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, Internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Organization Directory Introduction

As introduced above, it is desirable to provide a common space to store all of an organization's content item, but the many features desired in modern storage systems can create a myriad of challenges. The present technology solves such challenges.

Figure 2:
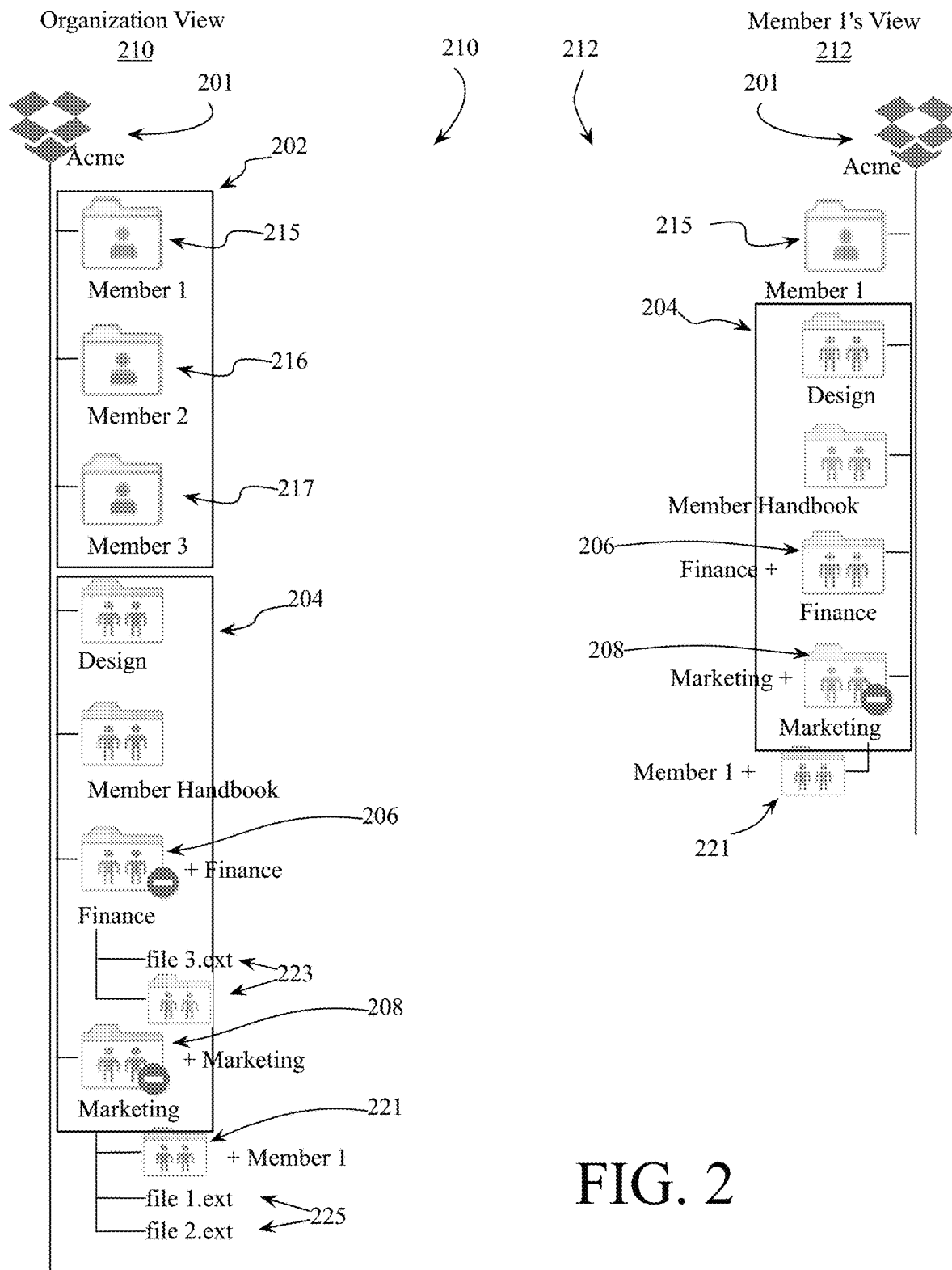
FIG. 2 shows an example organization directory including organization view and an member's view in accordance with some embodiments of the present technology.

FIG. 2 illustrates an organization directory 201 for an organization, Acme, as viewed by the organization in organization view 210, and as viewed by Member 1 in Member 1's View 212 displayed on client device 150 of Member 1. Organization directory 201 includes user account folders 202 specific to user accounts of the organization, and team-shared folders 204 that are all shared by every member at Acme except for folders 206 and 208 which are confidential team-shared folders and with access limited to members of the finance team, and marketing team, respectfully. All members of Acme can see the existence of finance team-shared folder 206, and marketing team-shared folder 208, but they may not access the folder unless they are a member of the respective team.

While each of the folders illustrated in FIG. 2 appear as a part of organization directory 201 when viewed on client device 150, in some embodiments each folder can be considered its own namespace, where the folders representing the namespaces have been mounted within other folders to give the appearance of a cohesive organization directory 201. While, in some embodiments, each of the folders illustrated in FIG. 2 may be their own namespace and therefore in some ways a separate from organization directory, the folders such as user account folder 202, and team folders 204 have particular behaviors, and attributes due to their membership in organization directory 201.

One benefit of this storage paradigm is that all content items relevant to the organization are under the management of the organization. Often members of organizations store content items that they are not sharing with others on local storage of their client device. Storing content items locally on a client, such as client 150, can be more convenient because content items stored locally on client 150 are always available, even when client 150 is not connected to the Internet. Also, a user is generally not required to separately login to their file system to access content items locally on client device 150. And since the content items are locally stored, a user doesn't need to wait as long for a content item to load. All of these reasons lead to members of organizations often storing personal folders and content items outside of cloud or network based storage systems. The present technology eliminates all of these common barriers to storing personal folders and content items in a content management system under management of the organization.

Another benefit of this storage paradigm is that every member of the organization will access the same content item at the same path, even when accessing the content item on his or her respective file system on his or her respective client device 150. Each of team-shared folders 204 illustrated in FIG. 2 will be mounted for each user account of the organization in the same arrangement (i.e., have the same path from the root).

Another benefit of this storage paradigm is that access rights to folders can be more granular than in typical storage systems. Since folders can be their own namespaces, separate access permissions can be provided to each folder on a per user account basis. In some embodiments, this can lead to non-conventional access rights, as will be explained in more detail herein.

Another benefit of this storage paradigm is that it can account for challenges inherent in shared content management systems where multiple user accounts can make changes at the same time. Furthermore, this storage paradigm can account for challenges inherent in a synchronized content management system wherein changes made on client device 150 need to be propagated to content management system 110 and other client devices 150 of other user accounts associated with the organization. Such changes can sometimes change access and/or permissions for other user accounts that can create risks for content loss or content leaking as will be explained in more detail herein.

FIG. 2 also illustrates a comparison between organization view 210 of organization directory 201 and member view 212 of organization directory 201. Organization view 210 includes user account folders 202 for each member of the organization as well as team-shared folders 204. However, member view 212, which provides a view from the perspective of the user account of Member 1, includes only user account folder 215 for Member 1, and team-shared folders 204, which are visible to all members of the organization.

As will be addressed in greater detail below, team service 130 provides a variety of access levels including (from least access to greatest access): no access (user account can't access or see a folder); view-name-only (allows a user account to view the existence of a folder), traversal (allows a user account to view the existence of the folder, and open the folder, but does not allow the user account to see any folder(s) or content item(s) within the folder other than a specified folder(s) or content item(s)); read access (can view and open, but cannot change any content item or write to the folder); write access (can modify the folder or content item); and owner access (can write+modify membership to the folder/namespace). In some cases, these access levels can be used by content management system 110 to determine that a folder (such as those of Member 2, and Member 3) should not be synchronized with client device 150. In such cases, client device 150 for user account of Member 1 is not aware of the existence of user account folder 216 for Member 2 and user account folder 217 for Member 3.

Further Member 1's view 212 also differs from organization view 210 with respect to confidential team-shared folders 206 and 208. Team-shared folder 1 219 is a confidential folder. The existence of team-shared folders 206 and 208 can still be seen by members of the organization that don't have access to the folders, but members of the organization that don't have access to the folders generally can't view the content items of the folder. Specifically, confidential team-shared folder 206 includes content items 223 and confidential team-shared folder 208 includes content items 225—neither content items 223 nor content items 225 are accessible to user account of Member 1, and are not shown in Member 1's view 212.

In some embodiments, the user account of Member 1 may still be able to see a specific folder or content item within a confidential folder that the user account does not otherwise have access to—the user account has traversal rights to the confidential folder. For example, Member 1's view 212 does include folder 221 that is subordinate to confidential team-shared folder 208. In this instance, and as will be explained in greater detail below, the user account of Member 1 has be added to the access control list for folder 221. While the user account of Member 1 still does not have permissions to view the contents of confidential team-shared folder 208 in general, the user account of Member 1 has been given specific permission to access folder 221. To account for the user account of Member 1's general lack of access to confidential team-shared folder 208, and the user account of Member 1's specific access to folder 221, the user account of Member 1 is granted traversal access to confidential team-shared folder 208—Member 1 can see and navigate through confidential team-shared folder 208, but does not have general access to content items in confidential team-shared folder 208, and Member 1 cannot see any folders or content items in confidential team-shared folder 208 other than folder 221 to which Member 1 has been granted explicit access.

Data Model

The present technology introduces a data model that is effective to provide the benefits addressed above and throughout this description. The data model accounts for the integration of a plurality of user account folders, and team-shared folders into an organization directory by combining functionality provided by namespaces, access control lists, filters, and authentications.

The organization directory is its own namespace (organization namespace) and is a root level for the organization directory and the root level for all user accounts for members of the organization. All of the team-shared folders (namespaces themselves) and content items within the team-shared folders are displayed within the organization directory, and are viewable at the same path(s) (relative to the root of the namespace) by all members of the organization subject to access rights. An administrator controls access privileges for the organization directory and manages the organization directory and team-shared folders.

As indicated above, each of the plurality of user account folders are also their own namespaces, which are the root level for each respective user account's folder, but are mounted within the organization directory (e.g., user account folder 215 for Member 1 is mounted with organization directory 201). A user account namespace is a folder containing content items that are personal content items (in the context of the user account's membership in the organization) for the user account. These content items are not generally shared with any other members of the organization, but sharing of sub-folders and content items can occur through explicit action by the user account to select another user account with which to share or by sending a link to the content item to another user account. The respective user account for the user account folder generally has rights to manage the user account folder and its contents. However, the user account folder can still also be under control of the administrator of the organization, wherein the administrator can be responsible for creating the user account folder, and can access the user account folder in some instances.

In some embodiments, each of the team-shared folders such as team-shared folders 204 can also be their own namespaces. Each of team-shared folders can be associated with attributes such that they are automatically mounted for all user accounts of the organization, and they cannot be unmounted (except by an administrator).

Restrictive Access Control List

By default user accounts associated with an organization have at least read access to team-shared folders 204 mounted within organization directory 201. For team-shared folders 204 with this default behavior there is no need to list explicit permissions for the user accounts associated with the organization in an access control list as the permissions are implied through the default behavior.

However, some team-shared folders 204, such as finance folder 206 and marketing folder 208 can be deemed "confidential" wherein the default behavior for a team-shared folder is not observed. Access to such confidential folders is through explicit permissions recorded in restrictive access control list 147. Restrictive access control list 147 functions inversely from conventional access control list 145. Conventional access control list 145 is used to grant access to specified individuals that would not otherwise have access. However, restrictive access control list 147 restricts all users that would otherwise have access from access unless they are excluded from the restriction by being listed in restrictive access control list 147. For example, the design folder has the default behavior for team-shared folders 204, and allows at least read access all user accounts, and therefore there would be no entry for the member handbook folder in restrictive access control list 147. However, finance folder 206 is marked confidential, and therefore it is entered into restrictive access control list 147. By virtue of its inclusion in restrictive access control list, only user accounts or teams listed restrictive access control list 147 have at least read access to finance folder 206 and all other user accounts to not have at least read access.

In some embodiments restrictive access control list 147 can be stored with, or as part of access control list 145, however, in such embodiments entries can be marked as restricted, or the restrictive nature of the entries can be determined from a namespace identifier. For clarity, throughout this description, reference to access control lists that do not specify access control list 145 or restrictive access control list 147 refer to either or both types of access control list.

FIG. 3 illustrates restrictive access control list 147. In some embodiments, restrictive access control list 147 can record entities having access on a namespace/folder basis. As illustrated, restrictive access control list 147 can include reference to specific teams (e.g., marketing) or specific user accounts having specified rights. For example, restrictive access control list 147 includes entry 241 for marketing folder 208 and can identify marketing team as having "write access" without individually listing each member of the marketing team. This provides the advantage that as members come onto the marketing team, or leave the marketing team, restrictive access control list 147 for marketing folder 208 does not need to be modified. Instead members that come onto the marketing team, or leave the marketing team need only be added to or removed from the marketing team definition.

Restrictive access control list 147 also includes entry 243 for folder 221 that identifies folder 221 as providing "write access" to the marketing team and "read access" to Member 1.

Entries 245 and 246 are illustrated outside of the table since they are not included in restrictive access control list 147, and are included in FIG. 3 for the purposes of explanation. In some embodiments, namespaces and folders that allow the default access model are not included in restrictive access control list 147 since these are not restrictive permissions. For example entry 245 pertains to the design folder that permits all user accounts associated with organization directory 201 to have write access to this namespace. Since there are no restrictions on access from the default access, entry 245 is not needed in restrictive access control list 147 and appears outside the table. Entry 246 is also not needed in restrictive access control list and appears outside restrictive access control list 147. While access to folder 223 is restricted by virtue of being a child folder under finance folder 206, access rights to folder 223 are inherited from finance folder 206, and are implied by the existence of folder 223 in the namespace of finance folder 206. Since there are no explicit access changes for folder 223 it does not need to be listed in restrictive access control list 147.

Restrictive access control list 147 can also be used to illustrate when a folder is its own namespace and when it is nested within another namespace. As illustrated in FIG. 3, all team-shared folders have a unique ns_id (namespace ID). Design folder in entry 245 has a ns_id=9, marketing folder 208 in entry 241 has a ns_id=2, finance folder 206 in entry 244 has a ns_id=3. Each team-shared folder typically has different access rights from organization directory 201, and therefore they are namespaces. Namespaces are used to define a new access model from a parent folder. Accordingly, folder 221 is also considered a namespace having a ns_id=4, while folder 223 is not considered a namespace because it has the same access rights as its parent. In entry 246 folder 223 lists its membership in ns_id=3 which is the ns_id for finance folder 206. Folder 223 has a dir_id=101 (directory ID). In some embodiments, the folder names are not listed in restrictive access control list 147 (or in access control list 145)—instead folders can be identified by their ns_id or dir_id.

In some embodiments user account folders can appear in restrictive access control list 147. Entry 240 is for folder "Member 1" which is Member 1's user account folder and has its access restricted to only Member 1.

View-Name-Only Rights

As noted above, all user accounts having access to organization directory 201 have at least sufficient access to view the existence of finance folder 206, but if they are not members of the finance team, they may not have any greater access. Such access is termed view-name-only access. Such access limits a user account, such as user account of Member 1, to view the existence of the folder, but they cannot open the folder (and therefore, they cannot read any contents within it), and they cannot write to the folder. Note that view-name-only access is not explicitly recorded in restrictive access control list 147. Rather, this form of access can be determined at run time (on demand) by determining that finance folder 206 is a confidential folder and that a user account is not listed in restrictive access control list 147 either explicitly by naming the user account or through membership in the finance group.

Traversal Rights

As noted above Member 1 has 'traversal rights" to marketing folder 208. This means that Member 1 can open marketing folder 208 solely for the purpose of traversing through marketing folder 208 to arrive at folder 221 to which Member 1 has explicit "read" access. Traversal rights are an access class that is required by the general rule pertaining to organizational directories that all user accounts should access content items by the same path in organization directory 201. This general rule that all user accounts should access content items in organization directory 201 by the same path conflicts with the confidential attribute of marketing folder 208 so a special type of access is needed—traversal rights.

Just as with view-name-only rights described above, traversal rights are also not explicitly recorded in restrictive access control list. Traversal rights can be determined at run time by determining that a user account has read access or greater to a namespace that is subordinate to a confidential namespace that the user account does not have access to.

Authorization Service and Auth Tokens

One challenge introduced by the general rule that all organization content can be viewed by any user account having access to organization directory 201 is that all user accounts are accessing the same organization directory, but each user account can potentially have a different view (or access rights) to folders in organization directory 201 depending on their method of access, role, or viewing context.

Further, a given user account can have different views or access rights depending on whether a user account is associated with different access levels. An administrator, for example, can access organization directory 201 as a user, or elevate their privileges to access organization directory 201 as an administrator, owner, or as another user. Each role will provide different access rights.

Given the complexity of access, and non-traditional privileges such as traversal rights and view-name-only, traditional access based systems are insufficient. Traditional access based systems typically record an access type for given user account for a specific content item or directory in an access control list, but such systems cannot handle the additional complexities of elevated privileges, or unions of a user account and membership of a team, etc.

Accordingly, the present technology utilizes file system authorization service 132 in combination with restrictive access control list 147. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

As addressed in more detail below, in some embodiments authorization service 132 is called every time data is requested from content management system 101, or a request to write to content management system 110 is received. In some embodiments, authorization service 132 is called whenever a user account attempts to access a namespace for a first time on any specific client device 150, or the user account attempts to access a namespace after changing its role (e.g. user rights to administrator rights, etc.). In such embodiments, after initially confirming access to a namespace, a user account's rights to access the namespace can persist until access permissions to the namespace change, or the user changes roles, etc.

Figure 4:
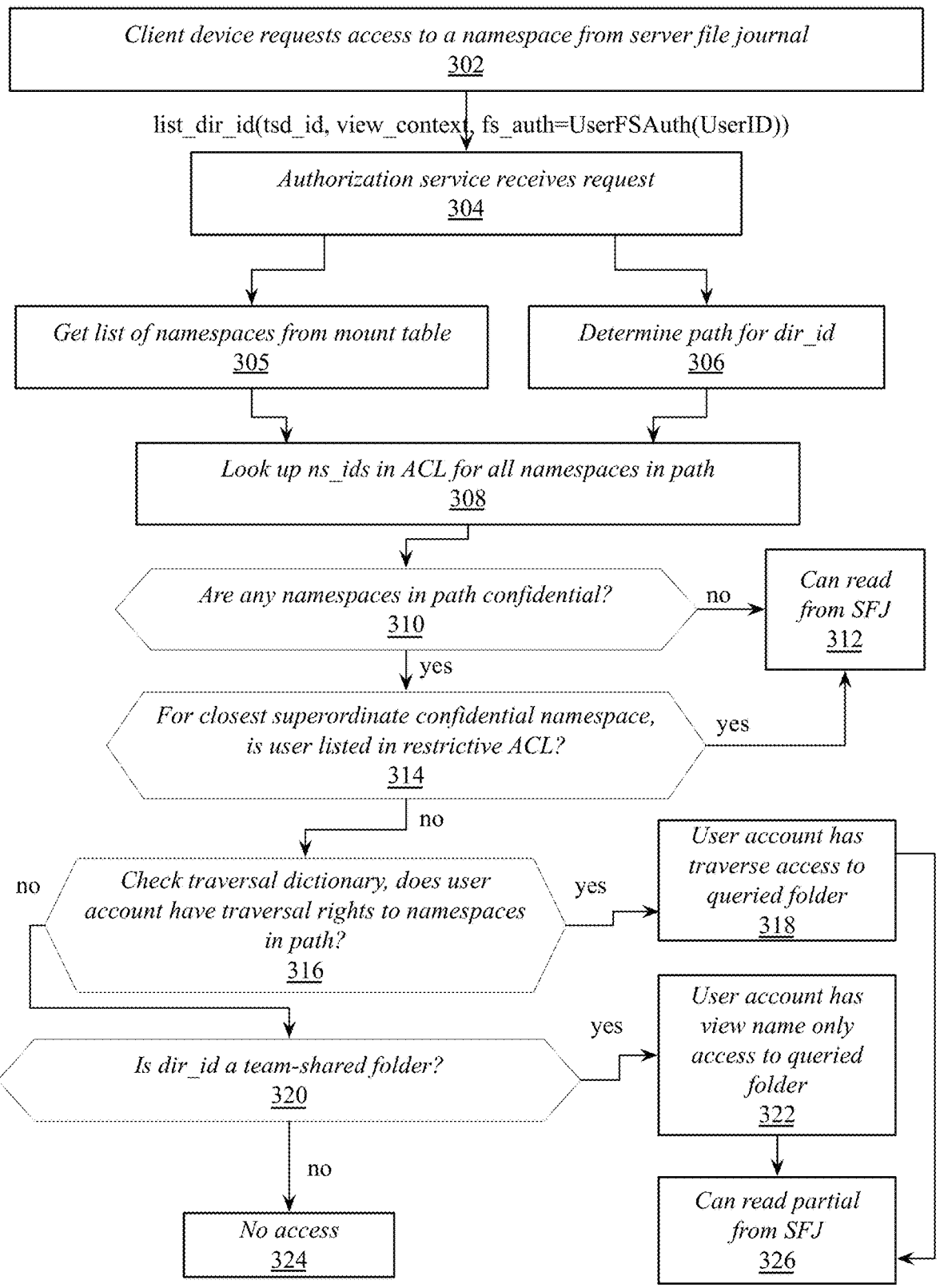
FIG. 4 shows an example process to determine user account and client device access authorizations in accordance with some embodiments of the present technology.

FIG. 4 illustrates an example method for utilizing authorization service 132 to determine access privileges. Client device 150 requests (302) access to a folder from server file journal 148 and includes an Auth token with the request. The Auth token will specify an user account ID, an organization directory ID, and a view context. The view context specifies how client device 150 is viewing member organization directory 201, (e.g., viewing in the file system of client device 150, viewing a preview via web browser, downloading via web browser, viewing as an administrator in a content manager tool, mobile application, via API, etc.

As shown in FIG. 4 authorization service 132 receives a request (304) from client device 150. In some embodiments the request (302) from client device 150 asks for access for an entire organization directory, while in some embodiments, the request (302) may request access for a specific namespace. When the request is pertinent to an entire organization directory, authorization service 132 can query a mount table (described in more detail in FIG. 6) for a list of namespaces in the organization directory. Since organization directory 201 also may contain a large number of member folders that are private to each member, the mount table can filter the mounts for a namespace by a user account ID so as to exclude any member folders that are not the user account folder of the user account ID provided in the Auth token. The pertinent namespaces within the organization directory and their paths can be returned to the authorization service to proceed at step 308.

When the request is for a specific namespace, authorization service 132 can determine (306) a path for the namespace of the folder specified in client request (302) by looking up the namespace path in the mount table.

For each namespace in the path received from mount table following either action 305 or action 306, authorization service 132 can look up (308) namespace IDs (ns_id) in restrictive access control list 147, and can determine (310) if any namespaces in the path are confidential.

If none of the namespaces in the path appear in restrictive access control list 147 this means that the user account can at least read (312) the folder to which it has requested (302) access. Since none of the namespaces in the path appear in restrictive access control list 147, the requested folder must inherit properties from team-shared folder 204, which by default provides at least read access to all user accounts authorized to view organization directory 201.

If any namespaces in the path are listed in restrictive access control list 147 this means that the namespaces are confidential namespaces. As addressed above, confidential namespaces do not inherit access properties from parent namespaces, and the user account will not have any access to a folder that is subordinate in the path to the confidential namespace unless the user account was given explicit permission to access a folder in the path—either by the user account appearing explicitly in restrictive access control list 147 or through membership to a team having explicit access. Accordingly, authorization service 132 determines whether the user account (or a team including the user account) is listed in restrictive access control list 147 for the closest superordinate confidential namespace appearing in the path. If the user account (or a team including the user account) is listed in restrictive access control list 147 for the closest superordinate confidential namespace appearing in the path then authorization service 132 determines that the user account can at least read (312) from server file journal 148.

Figure 5:
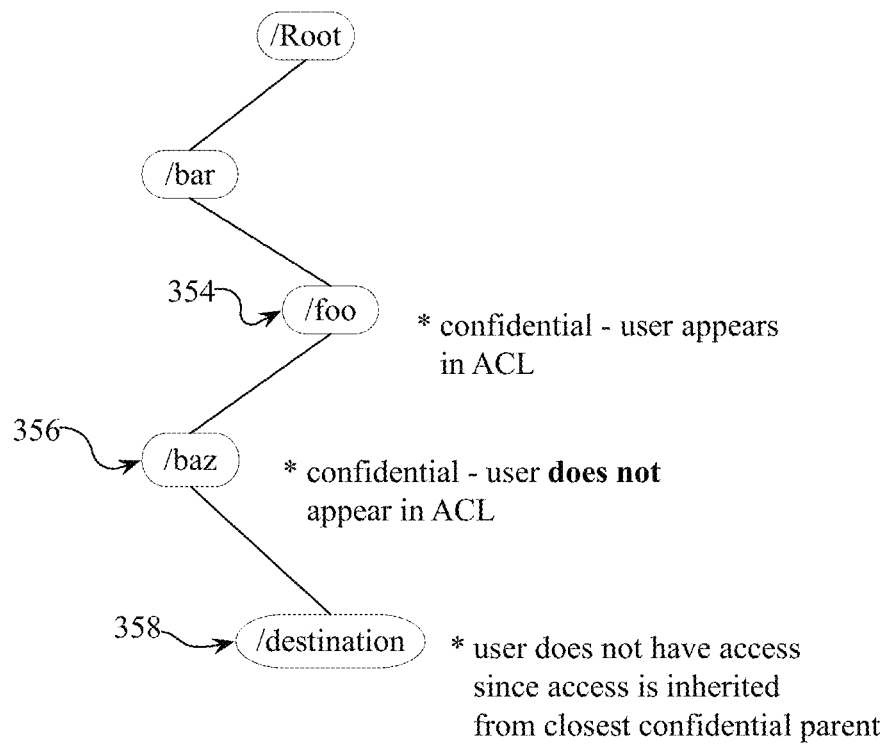
FIG. 5 shows an example file path including a confidential folder in accordance with some embodiments of the present technology.

The reason authorization service 132 only needs to check the closest superordinate confidential namespace in the path is illustrated in FIG. 5. FIG. 5 illustrates a path "/root/bar/foo/baz/destination" where "destination" folder 358 is the folder to which the user account has requested access. As illustrated in FIG. 5 user account has access to folder "/foo" 354 because the user account appears in restrictive access control list 147. However, the path also includes folder "/baz" 356, another confidential folder, where the user account does not appear in restrictive access control list 147, and thus does not have access to "/baz" 356. Since the user account does not have access to "/baz" 356, the user account also does not have access to "/destination" 358 even though user account does have access to "/foo" 354.

When authorization service 132 has determined that there are namespaces in the path that are confidential (310) and that user account is not listed (314) in restrictive access control list 147 for the closest superordinate confidential namespace, it may be possible that user account has at least partial access to folder to which the user account has requested (302) access. This can be determined by authorization service 132 checking a traversal dictionary in metadata database 146. The traversal dictionary connects a namespace to a user account, and also includes a list of traversal paths that the user can see within that namespace.

If the traversal dictionary includes an entry listing the user account as having traversal access to the namespace including the folder to which the user account has requested (302) access, and if the folder is listed within the list of traversal paths that the user can see within the namespace, then the user account has traversal access (318) to the folder to which the user account has requested (302) access.

If the traversal dictionary does not indicate that the user account has traversal rights to access the folder to which the user account has requested (302) access, authorization service 132 can determine (320) whether the folder to which the user account has requested (302) access is a team-shared folder. If it is a team-shared folder, then all user accounts associated with organization directory 201 have rights to at least view the name of all team-shared folders, and the user account has view-name-only access to the folder to which the user account has requested (302) access.

If the folder to which the user account has requested (302) access is not a team-shared folder, then the user account does not have view-name-only access (324).

At the conclusion of the method illustrated in FIG. 4, authorization service 132 can return an answer to server file journal 148 that the user account either has read or write access 312, does not have access 324, or has partial access 326 (meaning that the user account can see some of the folder to which the user account has requested (302) access). When authorization service 132 returns an answer that the user account has partial access 326, this triggers a namespace view filter to identify allowed folders and content items.

Mount Table

FIG. 6 illustrates an example mount table 380. As introduced above, mount table 380 includes a listing of paths for each folder in organization directory 201. Mount table 380 includes at least the fields: directory ID 382, namespace ID 384, team user ID 386, path 388, target namespace 390, and active 392. Directory ID field 382 includes an identifier for each folder in organization directory 201. Namespace ID field 384 includes an identifier for each namespace including the folder in organization directory 201. In some embodiments, such as illustrated by box 396 and elsewhere in mount table 380 the directory ID and the namespace ID are identical when the folder is the root of the namespace. For instance, design folder 204 is a team-shared folder and its own namespace. In some embodiments, such as illustrated by box 394 in mount table 380 the directory ID in the namespace ID are different when the folder is not the root of the namespace. For instance, folder 223 is a sub-folder of finance folder 206 that inherits properties from finance folder 206, and therefore is a directory that is not its own namespace.

Mount table 380 also includes team user ID field 386 which lists a user ID for each member folder. Team user ID field 386 can be used to filter mount table 380 to only return the member folder that is specific to the user ID. As addressed above, an organization directory such as organization directory 201 can include many member folders 202 and each of the member folders is visible only to a specific user account.

Mount table 380 also includes path field 388 which includes a complete path for each folder. Target namespace field 390 includes the namespace to which the namespace containing the folder identified in directory ID 382 is mounted. For example entry 398 identifies the target namespace for folder 221 as target namespace 2=marketing folder 208, which is itself mounted in target namespace 1=Acme 201. Note Acme's target namespace is "root" since Acme is the root namespace.

Active field 392 indicates whether the listed mount is still active with a bit "1" when the mount is still valid, or "0" when the folder has been unmounted.

Cursor

After authorization service 132 determines that a user account has access (whether partial access or read/write access) to a namespace and can therefore read from server file journal 148, the latest entries in server file journal 148 for that namespace can be sent to client device 150 to bring client device 150 into synchronization with content management system 110. Along with information regarding the latest entries in server file journal 148, content management system 110 also sends a cursor to client device 150. The cursor serves several important functions.

First the cursor includes the namespace id (ns_id) and the server file journal id (sj_id) for the entry in server file journal 148. These data items identify the last entry from server file journal 148 that has been sent to client device 150, and consequently, when client device 150 later requests additional updates or requests to commit a change to content management system 110 client device 150 can return the cursor received from content management system 110 along with the request. If the request is to commit a change, then content management system 110 can determine if the cursor reflects the latest entry in server file journal 148 for the namespace identified in the request. If the cursor reflects the latest entry, then client device 150 is allowed to commit the revision. If the cursor does not reflect the latest entry, then client device 150 must first receive the revisions subsequent to the sj_id identified in the cursor. If the request is to read from server file journal 148, then content management system 110 can send any revisions subsequent to the sj_id identified in the cursor to client device 150.

Second, the cursor can include the last observed access state for the user account with respect to a namespace(s). After authorization service 132 has confirmed that a user account has access to a namespace(s), content management system 110 can include any namespaces to which the user account has access in the cursor, and can also include a list of paths to which the user account has partial access in the cursor. This way, whenever client device 150 requests access to a namespace, and the namespace is identified in the cursor, then content management system 110 can know that the user account had access to the identified namespace as of the sj_id listed in the cursor for that namespace. Assuming that no access changes have occurred since the sj_id listed in the cursor for the namespace, client device 150 still has access.

Third, the cursor can be encrypted and signed to ensure that it has not been tampered with since content management system 110 send the cursor to client device 150. This allows content management system 110 to trust the information in the cursor when content management system 110 determines that the cursor bears the correct signature.

In some embodiments there can be a cursor for each namespace to which a user account has access. In some embodiments, one cursor can include all information for all namespaces to which a user account has access.

Server Synchronization Service (Tomahawk)

Having above introduced the concepts of the data model and determining access to folders within an organization directory, the description now turns to a description of synchronizing an organization directory such as organization directory 201.

Figure 7:
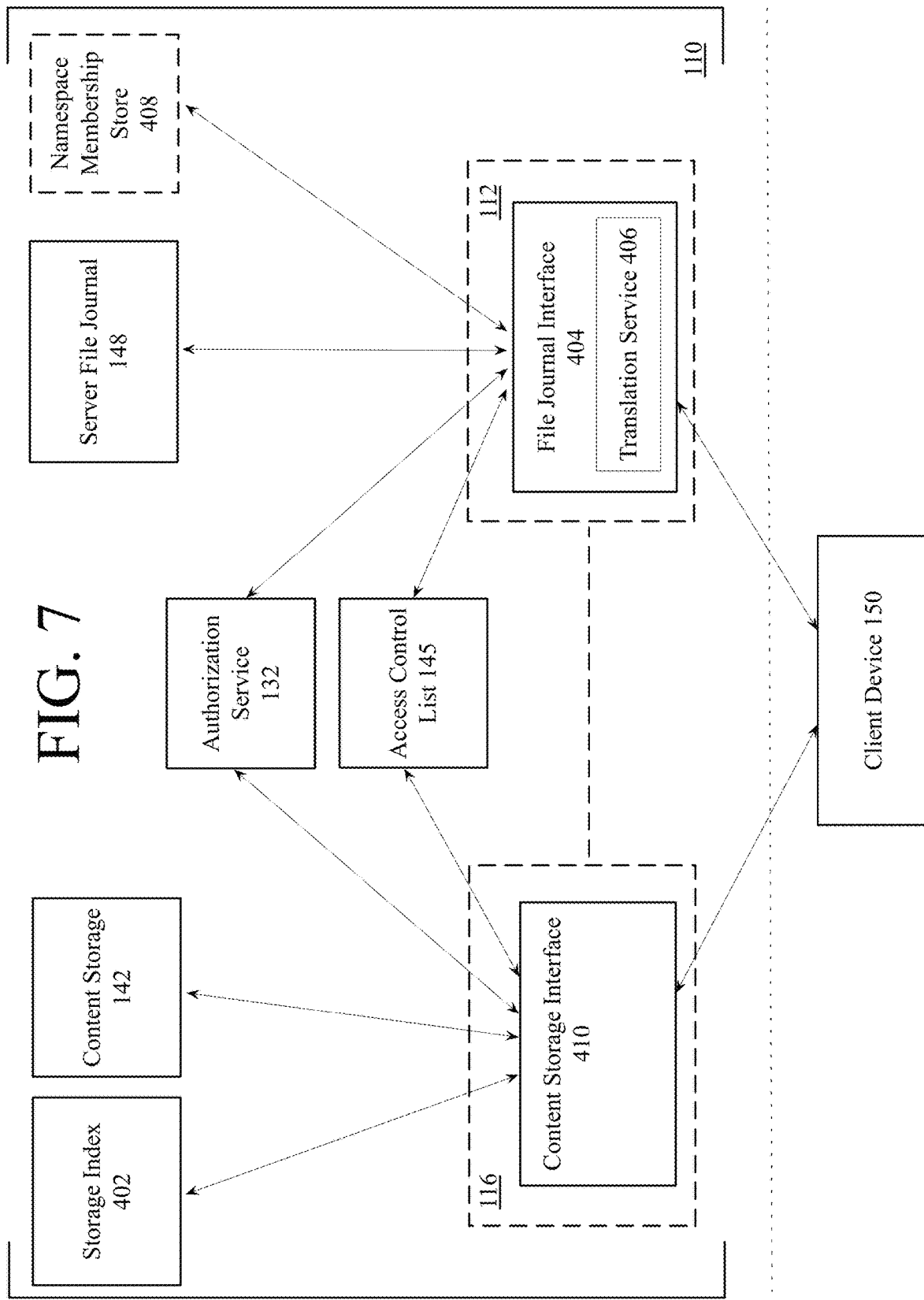
FIG. 7 shows an example system diagram of some aspects of a content management system in accordance with some embodiments of the present technology.

FIG. 7 illustrates a schematic diagram of an example architecture for synchronizing content between content management system 110 and client device 150 in system configuration 100. In this example, client device 150 interacts with content storage 142 and server file journal 148 respectively via content storage interface 410 and file journal interface 404. Content storage interface 410 can be provided or managed by content storage service 116, and file journal interface 404 can be provided or managed by server synchronization service 112. For example, content storage interface 410 can be a subcomponent or subservice of content storage service 116, and file journal interface 404 can be a subcomponent or subservice of server synchronization service 112.

Content storage interface 410 can manage communications, such as content requests or interactions, between client device 150 and content storage 142. Content storage interface 410 can process requests from client device 150 to upload and download content to and from content storage 142. Content storage interface 410 can receive content requests (e.g., downloads, uploads, etc.) from client device 150, verify permissions from FSAuth token in a cursor (to be described below) or through authorization service 132 (as described in FIG. 4) to determine if client device 150 (and/or the request from client device 150) is authorized to upload or download the content to or from content storage 142, and interact with content storage 142 to download or upload the content in content storage 142 to client device 150. If the request from client device 150 is a request to download a content item, content storage interface 410 can retrieve the content item from content storage 142 and provide the content item to client device 150. If the request from client device 150 is a request to upload a content item, content storage interface 410 can obtain the content item from client device 150 and upload the content item to content storage 142 for storage.

When processing content requests from client device 150, content storage interface 410 can communicate with storage index 402 to check the availability and/or storage location of the requested content in content storage 142, and track content items in content storage 142. Storage index 402 can maintain an index of content items on content storage 142 which identifies the content items on content storage 142 and can also identify a respective location of the content items within content storage 142. Thus, storage index 402 can track content items on content storage 142 as well as storage locations of the content items. Storage index 402 can track entire content items, such as files, and/or portions of the content items, such as blocks or chunks. In some cases, content items can be split into blocks or chunks that can be stored at content storage 142 and tracked in storage index 402. For example, content storage 142 can store a content item as blocks or chunks of data which include respective data portions of the content item. Storage index 402 can track the blocks or chunks of the content item stored in content storage 142. FIG. 7 described below illustrates an example configuration for storing and tracking blocks of content items.

File journal interface 404 can manage communications, such as metadata requests and content synchronizations and operations, between client device 150 and server file journal 148. For example, file journal interface 404 can translate, validate, authenticate, and/or process operations, configurations, and state information between client device 150 and server file journal 148. File journal interface 404 can verify permissions from an FSAuth token in a cursor (to be described below) or through authorization service 132 (as described in FIG. 4) to authorize, or verify authorization of, requests sent by client device 150 to server file journal 148. When processing requests or operations from client device 150, file journal interface 404 can access namespace membership store 408 to determine or verify namespace ownership information for any namespaces associated with the requests or operations from client device 150, and retrieve permissions information from access control list 145, 147 to verify permissions of content associated with the requests or operations from client device 150.

Translation service 406 in file journal interface 404 can perform linearization and translation operations for communications between client device 150 and server file journal 148. For example, translation service 406 can translate communications from client device 150 to a different format consistent with the structure and format of data in server file journal 148, and vice versa. To illustrate, in some cases, client device 150 can process content item information (e.g., state, changes, versions, etc.) at client device 150 as operations, while server file journal 148 can process the same information as content item revisions reflected by rows in a data structure such as a database table. To enable synchronization of content item information between client device 150 and server file journal 148, translation service 406 can translate operations from client device 150 into revisions suitable for server file journal 148, and can translate revisions reflected in rows of data on server file journal 148 to operations suitable for client device 150.

In some cases, authorization service 132 can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, and access permissions to identified folders. The token can be included in a cryptographically signed data object called a cursor, which will be described in greater detail below. Content management system 110 can send the token(s) to client device 150, and client device 150 can provide the token to content management system when requesting content item revisions and/or updates to server file journal 148 as further described below. Client device 150 can also provide the cursor including the token to content storage interface 410 to validate any content requests (e.g., downloads, uploads, etc.). Content storage interface 410 can use the cursor including the token to authorize queries to storage index 402 and upload or download content items to or from content storage 142.

FIG. 7 illustrates an example block storage and synchronization configuration. In this example, content storage 142 can store blocks of data, which can be opaque chunks of content items (e.g., files) up to a particular size (e.g., 4 MB). Content items can be split into blocks and the blocks can be stored at content storage 142 for access. Storage index 402 can track blocks stored at content storage 142, as well as the respective locations of the blocks stored at content storage 142. File journal interface 404 can interact with server file journal 148 to track revisions to the content items and/or blocks stored at content storage 142.

As previously mentioned, server file journal 148 tracks content item revisions, including content item adds, edits, moves or renames, deletes, etc. Accordingly, file journal interface 404 can store revision data at server file journal 148 to indicate that a content item was added to content storage 142, or a revision of the content item was made.

FIG. 8A illustrates a diagram of communications processed by file journal interface 404 between client device 150 and server file journal 148. Server file journal 148 tracks content item state and changes (e.g., revisions) as values in rows and fields in server file journal 148. For example, server file journal 148 can maintain one or more journals of revisions to content items in content storage 142. The one or more journals can track revisions of each content item on each namespace. A row of values in a journal on server file journal 148 can identify a content item in a namespace and reflects a state of the content item in the namespace. A subsequent row in the journal corresponding to the same content item in the namespace can reflect a subsequent revision to the content item in the namespace. Thus, rows in server file journal 148 associated with a content item can identify the current state of the content item and any revisions to the content item from creation to the current state.

To synchronize content item information (e.g., state, changes or revisions, etc.) with client device 150, server file journal 148 can send or receive revisions data 414 to or from file journal interface 404, which represent revisions tracked or stored in server file journal 148 for one or more content items. Revisions data 414 can include, for example, a log of content item revisions corresponding to rows in server file journal 148. Server file journal 148 can send revisions data 414 to file journal interface 404, which can translate revisions data 414 into operations data 412 for client device 150, as further described below.

Client device 150 can perform content operations to update or modify content items at client device 150. To synchronize content item information with server file journal 148, client device 150 can send or receive operations data 412 to or from file journal interface 404. Client device 150 can send operations data 412 to file journal interface 404 to report changes at client device 150 to content items, and receive operations data 412 from file journal interface 404 to obtain the latest state of content items from server file journal 148 (e.g., revisions data 414).

For example, client device 150 can edit content item A at client device 150 and report to file journal interface 404 an edit operation indicating the edit to content item A. The edit operation can be included in operations data 412 communicated with file journal interface 404 to indicate the revision to content item A. File journal interface 404 can receive operations data 412 including the edit operation and generate a revision for storage at server file journal 148, tracking the edit to content item A. File journal interface 404 can include the revision associated with the edit operation in revisions data 414 to server file journal 148, in order to update server file journal 148 to store the revision representing the edited state of content item A.

As further described below, operations data 412 can include a cursor which identifies the latest state or revision obtained by client device 150 for each namespace associated with client device 150. For example, the cursor can identify the latest revision in server file journal 148 obtained by client device 150 for each namespace associated with client device 150. The information in the cursor allows file journal interface 404 to determine whether an operation in operations data 412 from client device 150 reflects the latest state or revisions in server file journal 148 for the namespace(s) associated with the operation. This can help file journal interface 404 ensure that operations in operations data 412 from client device 150 that correspond to older revisions in server file journal 148 are not written to server file journal 148, which can create a conflict between existing revisions in server file journal 148 and revisions translated from operations data 412.

To enable synchronization of content item information between client device 150 and server file journal 148, file journal interface 404 can translate (e.g., via translation service 406) operations data 412 to revisions data 414, and vice versa. When receiving operations data 412 from client device 150, file journal interface 404 can convert operations data 412 to revisions data 414, which includes content item revisions interpreted from operations in operations data 412. When receiving revisions data 414 from server file journal 148, file journal interface 404 can convert revisions data 414 to operations data 412, which include operations for implementing revisions in revisions data 414 at client device 150. Revisions data 414 includes data in server file journal 148 describing what happened to one or more content items (i.e., revisions to the one or more content items), and operations data 412 includes operations that have been executed or should be executed at client device 150 to modify the one or more content items. Thus, file journal interface 404 can translate data describing revisions to one or more content items from server file journal 148 (e.g., operations data 412) to operations that have or should be executed at client device 150 to modify the one or more content items at client device 150.

As previously noted, in addition to translating operations data 412 from client device 150 to revisions data 414 for server file journal 148, file journal interface 404 can convert revisions data 414 from server file journal 148 to operations data 412 for client device 150. File journal interface 404 can obtain revisions data 414 from server file journal 148 and translate revisions in revisions data 414 to operations for execution at client device 150 to revise one or more content items at client device 150 according to such revisions. The operations generated from the revisions in revisions data 414 are included in operations data 412 provided by file journal interface 404 to client device 150. This translation between operations data 412 and revisions data 414 allows client device 150 and server file journal 148 to synchronize content item information with each other as necessary.

Prior to writing any revision data 414 generated from operations data 412 provided by client device 150 to server file journal 148, file journal interface 404 can check a cursor in operations data 412 and/or query server file journal 148 to ensure any revisions in revisions data 414 do not create a conflict in server file journal 148. For example, file journal interface 404 can query server file journal 148 to check whether the version of a content item associated with a revision in revisions data 414 is the same version of the content item at server file journal 148, or whether the version of the content item at server file journal 148 is an updated or different version as the content item to which the revision in revisions data 414 pertains. If server file journal 148 shows that the latest version of the content item is a different version than the version to which revision data 414 pertains, the two versions are in conflict.

File journal interface 404 can update server file journal 148 to store new revisions included in revisions data 414 derived from operations data 412. When querying and/or updating revisions in server file journal 148, file journal interface 404 can query namespace membership store 408 to retrieve namespace ownership information associated with any namespaces affected by the revisions in revisions data 414. The namespace ownership information can indicate which user account(s) own a particular namespace and/or are able to access and modify the particular namespace. Thus, file journal interface 404 can analyze the namespace ownership information to ensure server file journal 148 is not updated to include a revision to a namespace from a user account that is not authorized to make such revision to the namespace.

Figure 8B:
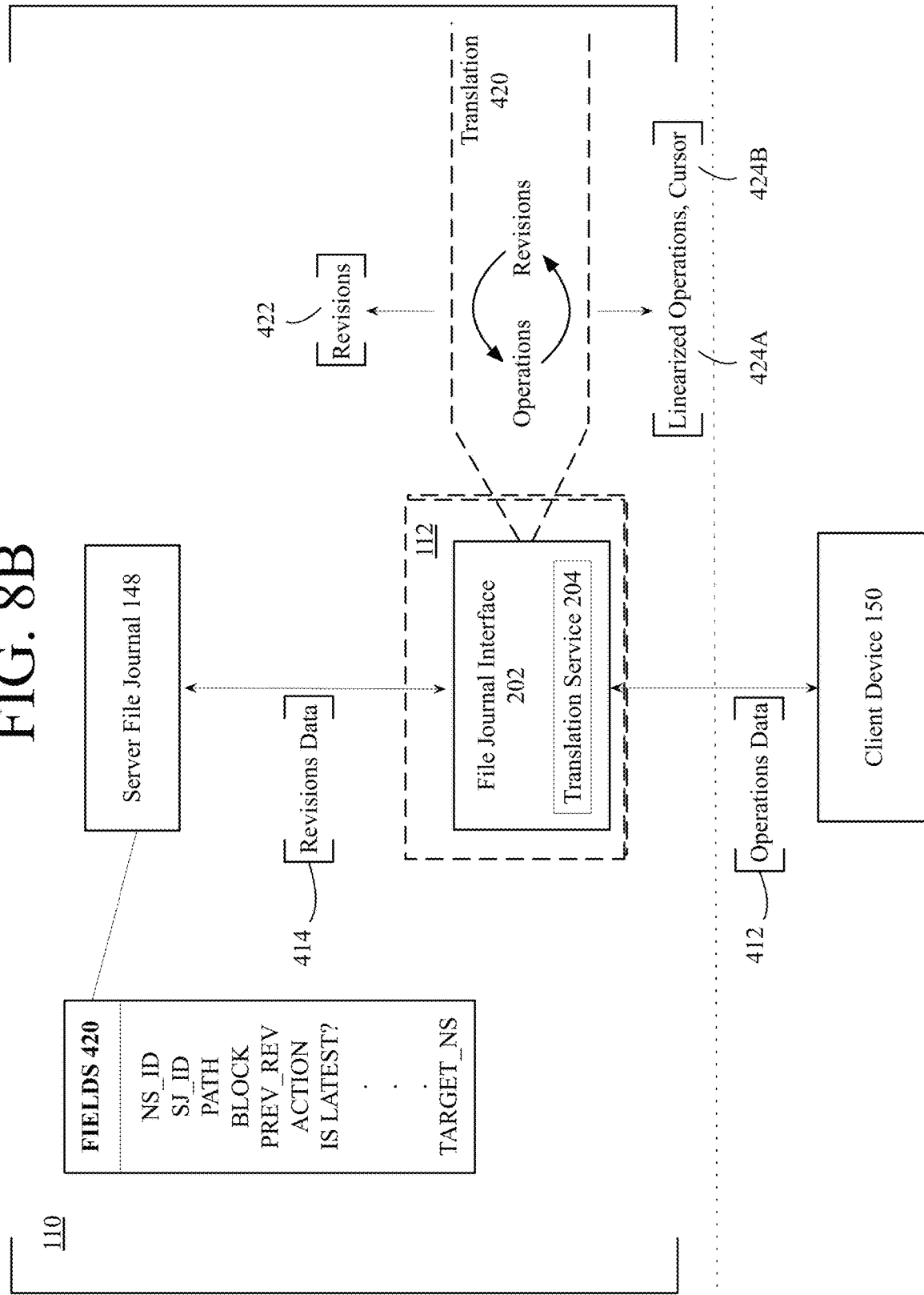
FIG. 8B shows an example process for translating communications between a client device and a server file journal on a content management system in accordance with some embodiments of the present technology.

With reference to FIG. 8B, server file journal 148 can store data for fields 418 to track and identify content item revisions. In this example, fields 418 include a namespace identifier (NS_ID), server journal identifier (SJ_ID), path, block, previous revision (Prev_Rev), action, and target namespace (Target_NS). NS_ID can include one or more values for uniquely identifying a namespace in server file journal 148. SJ_ID include monotonically increasing values which map to a row in a given namespace and provides an ordering of operations or revisions within that namespace. The path can be a namespace-relative path that identifies an associated content item. Prev_Rev identifies the SJ_ID of the row which corresponds to the previous state of the content item associated with the path. Action includes a description of the action with respect to the content item including actions such as mount, move, add, delete, edit, etc. "Is Latest" includes a binary value indicating when a row is the latest entry in server file journal 148 for that file ID or collection ID. Target_NS identifies the NS_ID of the target namespace for a mount point of a mounted namespace. The Target_NS field is not set for rows (e.g., revisions) which do not correspond to mount points.

In some cases, server file journal 148 can include other fields such as a size field which represents the size of an associated content item, a directory field (e.g., Is_Dir) which can be set to indicate when a content item is a directory, a file identifier that uniquely identifies the associated file, a clock or timestamp field, etc.

File journal interface 404 can perform translation 420 based on operations data 412 and revisions data 414 as previously mentioned. When performing translation 420, translation service 406 can transform operations data 412 into revisions 422, which include linearized revisions for storage at server file journal 148. Translation service 406 can also transform revisions data 414 into linearized operations 424A, included in operations data 412 sent to client device 150, which can be applied by client device 150 to update content item information (e.g., state, changes, etc.) at client device 150. Translation service 406 can also generate or update cursor 424B and provide cursor 424B in operations data 412 to client device 150.

Cursor 424B identifies a respective revision or row in server file journal 148 corresponding to each namespace and/or content item associated with linearized operations 424A. For example, cursor 424B can identify a namespace (e.g., NS_ID) and row in server file journal 148 for that namespace (e.g., SJ_ID), which indicate the latest revision in server file journal 148 for that namespace. Cursor 424B can also include the FSAuth token (addressed above) including the user ID, client device 150, a session identifier, a view context, and the last observed access permissions to the NS_ID provided in the cursor. The cursor can be cryptographically signed by content management system 110. The cryptographic signature can used to verify that a malicious entity hasn't forged the cursor or changed any properties of the cursor.

The namespace and row in cursor 424B can be associated with an operation in linearized operations 424A. Cursor 424B can identify a specific position on a log of revisions in server file journal 148 for the particular namespace, indicating the revision or state of the namespace in server file journal 148 after and/or before linearized operations 424A are applied at client device 150. Thus, cursor 424B can indicate the state of a namespace and/or content item in server file journal 148 before or after linearized operations 424A, which can help avoid revision conflicts and track the order of revisions before and after linearized operations 424A are applied.

Figure 9A:
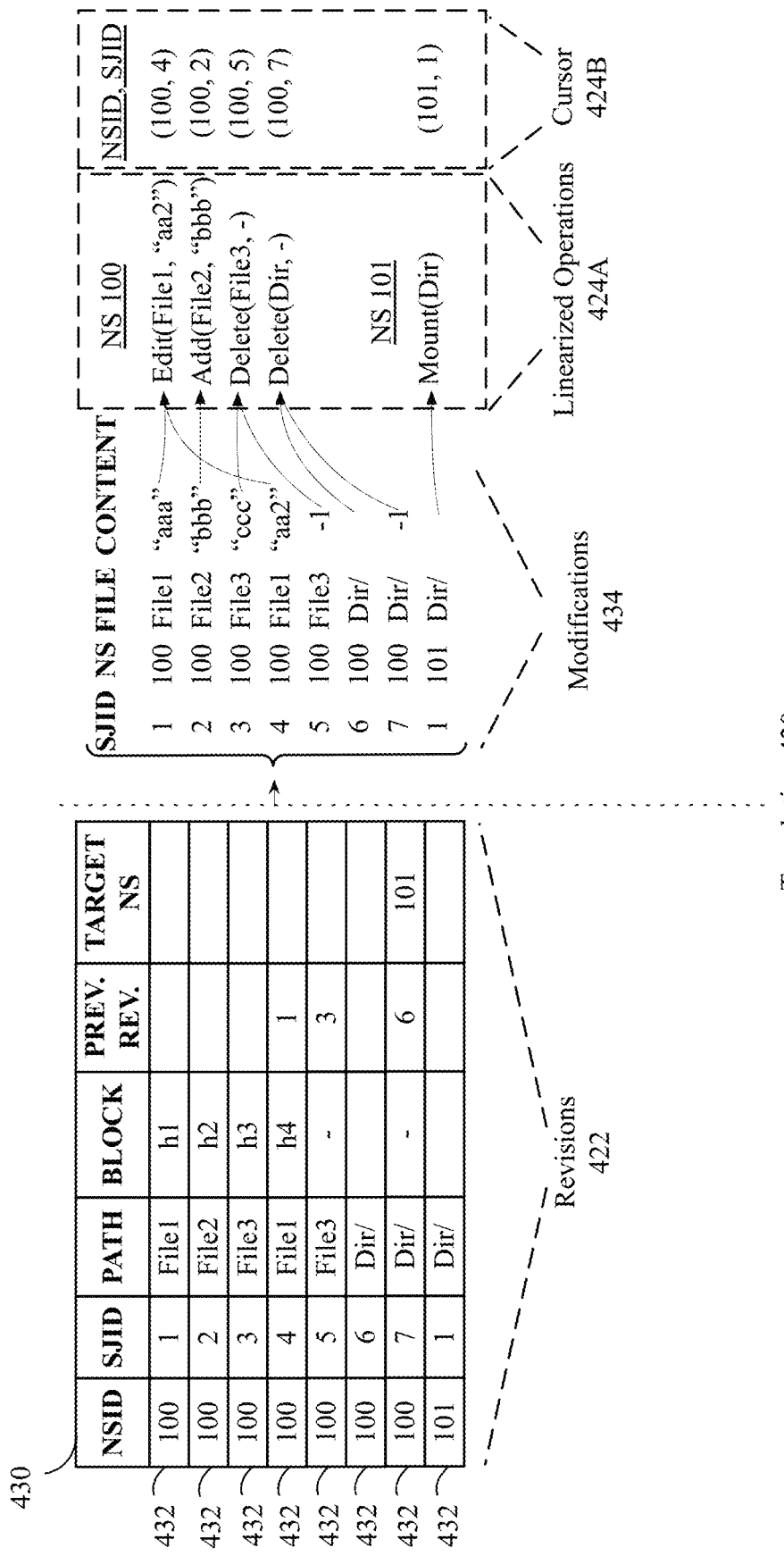
FIG. 9A shows an example translation and linearization process for translating server file journal data to linearized operations in accordance with some embodiments of the present technology.

FIG. 9A illustrates a diagram of an example translation and linearization process for translating server file journal data to linearized operations. Server file journal 148 stores journal 426 including rows 428 which include revisions 422. In this example, journal 426 tracks revisions (422) for multiple namespaces, namely namespaces 100 and 101 (i.e., NS_IDs 100 and 101). However, in some cases, server file journal 148 can store namespace-specific journals that track revisions specific to respective namespaces. The rows (e.g., rows 428) in a namespace-specific journal include data specific to that namespace, and each row reflects a revision specific to that namespace.

Each row (428) in journal 426 includes a namespace identifier field (NS_ID) for uniquely identifying a namespace associated with that row, a server journal identifier field (SJ_ID) that includes monotonically increasing values which map to a row in a given namespace and provides an ordering of operations or revisions within that namespace. Journal 426 also includes a path field (Path) for identifying a namespace-relative path of a content item, a block field (Block) for identifying a block or blocklist associated with the content item, a previous revision field (Prev_Rev) for identifying the row (i.e., SJ_ID) in journal 426 that represents the previous state or revision of the content item, and a target namespace field (Target_NS) for identifying a target namespace for a mount point of a mounted namespace (if the row corresponds to a mount). There is no data for the Target_NS field for rows (e.g., revisions) which do not correspond to mount points.

The first of rows 428 in journal 426 identifies the first revision (SJ_ID 1) for "File1" (Path field value File1) in namespace "100" (NS_ID 100), which corresponds to block "h1" and has no previous revisions (Prev_Rev) or target namespaces (Target_NS). Since the row does not include a previous revision or a target namespace, the revision represented by the row corresponds to an addition at namespace "100" of "File1" associated with block "h1". The row in journal 426 containing SJ_ID "4" represents the last revision in journal 426 for "File1" on namespace "100", since this row is the last row or SJ_ID in journal 426 corresponding to "File1" on namespace "100". This row containing SJ_ID "4" indicates that "File1" on namespace "100" was edited after being added in SJ_ID "1", and the edit corresponds to block "h4".

Modifications 429 depict an example of modifications representing revisions 422. In this example, each of modifications 429 illustrates a content revision from a corresponding row (428) in journal 426. Each modification corresponds to an SJID and NSID in journal 426, and a file associated with the corresponding SJID and NSID in journal 426. In this example, the content associated with modifications 429 represents example content values of the blocks (e.g., "h1", "h2", "h3", "h4") in journal 426. The content values in modifications 429 are provided for illustration purposes to depict example modifications to content associated with each revision.

For example, the first modification in modifications 429 represents SJID "1" and NSID "100" in journal 426, and depicts "File1" in namespace "100" being added. Content "aaa" represents a value of "h1" for "File1" at SJID "1" of NSID "100". Modifications 429 also depict an edit of "File1" in namespace "100" representing SJID "4" and NSID "100" in journal 426, which illustrates the content "aaa" (e.g., "h1") associated with "File1" in namespace "100" being modified to "aa2" (e.g., "h4").

In translation 420, revisions 422 from rows 428 in journal 426 are converted to linearized operations 424A. Linearized operations 424A are generated from revisions 422 in journal 426 and represent modifications 429 after linearization. As illustrated by linearized operations 424A, an operation in linearized operations 424A can be based on multiple revisions (422) and/or modifications (429), or a single revision (422) and/or modification (429).

For example, modifications 429 depict a revision adding "File1" to namespace "100", which corresponds to SJID "1" and NSID "100" in journal 426, and a revision editing "File1" in namespace "100", which corresponds to SJID "4" and NSID "100" in journal 426. The add revision can be inferred from the content value "aaa" (e.g., "h1") associated with "File1" and NSID "100" and the lack of any previous revisions for "File1" and NSID "100". In other words, the content "aaa" indicates that content (e.g., "h1") was either added or edited, and the lack of a previous revision for "File1" and NSID "100" suggests that the content "aaa" represents content (e.g., "h1") being added as opposed to edited. The edit revision can be inferred from the content value "aa2" (e.g., "h4") associated with "File1" and NSID "100" and the previous revision (SJID "1" and NSID "100") associated with "File1" and NSID "100". In other words, the change from content "aaa" to "aa2" associated with "File1" and NSID "100" suggests that the content "aa2" represents an edit.

In linearized operations 424A, the add and edit modifications (429) corresponding to SJID "1" and SJID "4" for NSID "100" can be converted into a single linearized operation (Edit operation) which edits the content value associated with "File1" from "aaa" (e.g., "h1") to "aa2" (e.g., "h4"). The single linearized operation editing content (e.g., "h1") of "File1" to "aa2" (e.g., "h4") reflects the modification adding "File1" associated with content "aaa" (e.g., "h1") to namespace "100", as well as the modification editing content "aaa" (e.g., "h1") associated with "File1" in namespace "100" to "aa2" (e.g., "h4"). Accordingly, this linearized operation is based on two modifications 429 and two corresponding revisions in revisions 422.

The modification in modifications 429 corresponding to SJID "2" and NSID "100" in journal 426 represents a revision adding "File2" associated with content "bbb" (e.g., "h2") to namespace "100". This modification represents the only revision 422 from journal 426 corresponding to "File2" on namespace "100". Accordingly, linearized operations 424A include a single operation for "File2" on namespace "100", which adds "File2" associated with content "bbb" (e.g., "h2") to namespace "100" and is based on a single modification 429 (add of "File2" on namespace "100") and revision 422.

Modifications 429 in this example also include a modification adding "File3" associated with content "ccc" (e.g., "h3") to namespace "100", which corresponds to SJID "3" and NSID "100" in journal 426, and a delete (represented as "−1") of "File3" from namespace "100", which corresponds to SJID "5" and NSID "100" in journal 426. Thus, revisions 422 include two modifications 429 associated with "File3" on namespace "100". Since the last revision in journal 426 associated with "File3" and namespace "100" corresponds to the delete modification representing SJID "5" and NSID "100" in journal 426, the add and delete modifications 429 associated with "File3" and namespace "100" from revisions 422 can be linearized to a single operation deleting "File3" from namespace "100". Accordingly, linearized operations 424A include a single operation for "File3" and namespace "100", which is the single operation deleting "File3" from namespace "100".

SJIDs "6" and "7" for NSID "100" and SJID "1" for NSID "101" in journal 426 represent "Dir" being added to namespace "100" and later moved from namespace "100" to namespace "101". For example, SJID "6" and NSID "100" identifies "Dir" and namespace "100" and does not include a previous revision, which indicates "Dir" was added to namespace "100" at SJID "6". SJID "7" identifies "Dir" being moved from namespace "100" to namespace "101", as reflected by the block field ("-"), the previous revision field (SJID "6"), and the target namespace field ("101"). SJID "1" for NSID "101" then identifies "Dir" being added to namespace "101", as indicated by the lack of prior rows or revisions for "Dir" and namespace "101". The add and move revisions in SJIDs "6" and "7" in NSID "100" and SJID "1" in NSID "8" are depicted by three modifications 429: an add of "Dir" to namespace "100" which corresponds to SJID "6" and NSID "100", a delete of "Dir" from namespace "100" which corresponds to SJID "7" and NSID "100", and an add of "Dir" to namespace "101" which corresponds to SJID "1" and NSID "101".

The add and delete modifications 429 of "Dir" and namespace "100", which respectively correspond to SJIDs "6" and "7" of NSID "100" in journal 426, are linearized to a single operation deleting "Dir" from namespace "100, since the last revision in journal 426 corresponding to "Dir" and namespace "100" is a delete of "Dir" from namespace "100" at SJID "7" and NSID "100". The add of "Dir" to namespace "101", which corresponds to SJID "1" and NSID "101" in journal 426, is the only modification 429 and revision 422 corresponding to "Dir" and namespace "101". Accordingly, the add is provided in linearized operations 424A as a single mount operation for "Dir" and namespace "101". Therefore, the three modifications 429 from revisions 422 corresponding to SJIDs "6" and "7" in NSID "100" and SJID "1" in NSID "101" (i.e., the add and delete of "Dir" on namespace "100", and the add of "Dir" on namespace "101"), are linearized to two operations in linearized operations 424A: a delete operation for "Dir" in namespace "100" and a mount operation for "Dir" in namespace "101".

As illustrated above, linearized operations 424A include an edit operation for "File1" and namespace "100", an add operation for "File2" and namespace "100", a delete operation of "File3" in namespace "100", a delete operation for "Dir" in namespace "100", and a mount operation for adding "Dir" to namespace "101". These operations in linearized operations 424A are generated from revisions 422 and reflect the latest state of each content item in journal 426. File journal interface 404 can generate linearized operations 424A and send linearized operations 424A to client device 150 to ensure client device 150 contains the latest state from revisions 422 in journal 426.

When providing linearized operations 424A to client device 150, file journal interface 404 can include cursor 424B along with linearized operations 424A to client device 150. Cursor 424B can identify the last revision (SJID) for each namespace (NSID) in journal 426. In some embodiments, cursor 424B can also include the FSAuth token including the user ID, and the last observed access permissions to the NS_ID provided in the cursor. The last revision for each namespace can indicate a position in journal 426 corresponding to the latest revisions sent to client device 150 for each namespace.

In some cases, cursor 424B can also map each operation in linearized operations 424A to a namespace (NSID) and row (SJID) in journal 426. The namespace and row associated with an operation can indicate the position in journal 426 corresponding to the operation. In other words, the namespace and row associated with an operation can indicate the revision number in journal 426 represented by that operation. The namespaces and rows in cursor 424B correspond to the latest state in journal 426 for each namespace and content item associated with linearized operations 424A. Cursor 424B can be provided to client device 150 as a tool for client device 150 to identify to file journal interface 404 the latest state or revisions obtained by client device 150 for one or more namespaces and/or content items when attempting to apply changes (e.g., via operations data 412) from client device 150 to the one or more namespaces and/or content items. When file journal interface 404 receives cursor 424B from client device 150, it can use cursor 424B to identify the position of client device 150 at journal 426 (e.g., the latest revisions from journal 426 obtained by client device 150) and detect or avoid conflicts caused by operations from client device 150.

In some embodiments, cursor 424B can also include the FSAuth token including the user ID, and the last observed access permissions to the NS_ID provided in the cursor. File journal interface 404 can use cursor 424B to verify a user account and client device's rights to read from or write to server file journal 148.

For example, if file journal interface 404 receives an operation from client device 150 modifying "File1" in namespace "100", file journal interface 404 can use cursor 424B, which it receives from client device 150 along with the operation, to check whether journal 426 has any newer revisions in namespace "100" than the revision identified in cursor 424B from client device 150. If the revision in cursor 424B is the most current revision in journal 426, file journal interface 404 can commit the edit operation as a new revision in journal 426 (e.g., SJID "8" in NSID "100") for "File1" in namespace "100".

Alternatively, if the revision in cursor 424B is not the most current revision in journal 426 for namespace "100", file journal interface 404 can determine that client device 150 is not synchronized. A requirement for client device to commit changes to content management system 110 is that client device is synchronized. Accordingly, content management system 110 can send any update operations to namespace "100" to client device.

Each time file journal interface 404 sends linearized operations to client device 150, it can include a cursor as described herein which identifies a respective position in journal 426 for each namespace and/or content item. In some embodiments, cursor 424B can also include the FSAuth token including the user ID, and the last observed access permissions to the NS_ID provided in the cursor. In some embodiments, the cursor can be cryptographically signed by content management system 110. Any time client device 150 sends an operation to file journal interface 404, it can include its latest cursor it received from file journal interface 404, which file journal interface 404 can use to map the state at client device 150 with the state at journal 426, and can use to determine whether client device 150 has access to a namespace listed in the cursor.

Journal 426 in this example depicts a journal with multiple namespaces. As previously noted, in some examples, server file journal 148 can maintain namespace-specific journals. Cursor 424B may include an SJID and NSID for each namespace, to indicate the latest revision for each namespace. Based on cursor 424B, file journal interface 200 can query multiple journals, in embodiments where multiple journals are maintained, and/or retrieve revisions from multiple journals, as further explained herein.

Figure 9B:
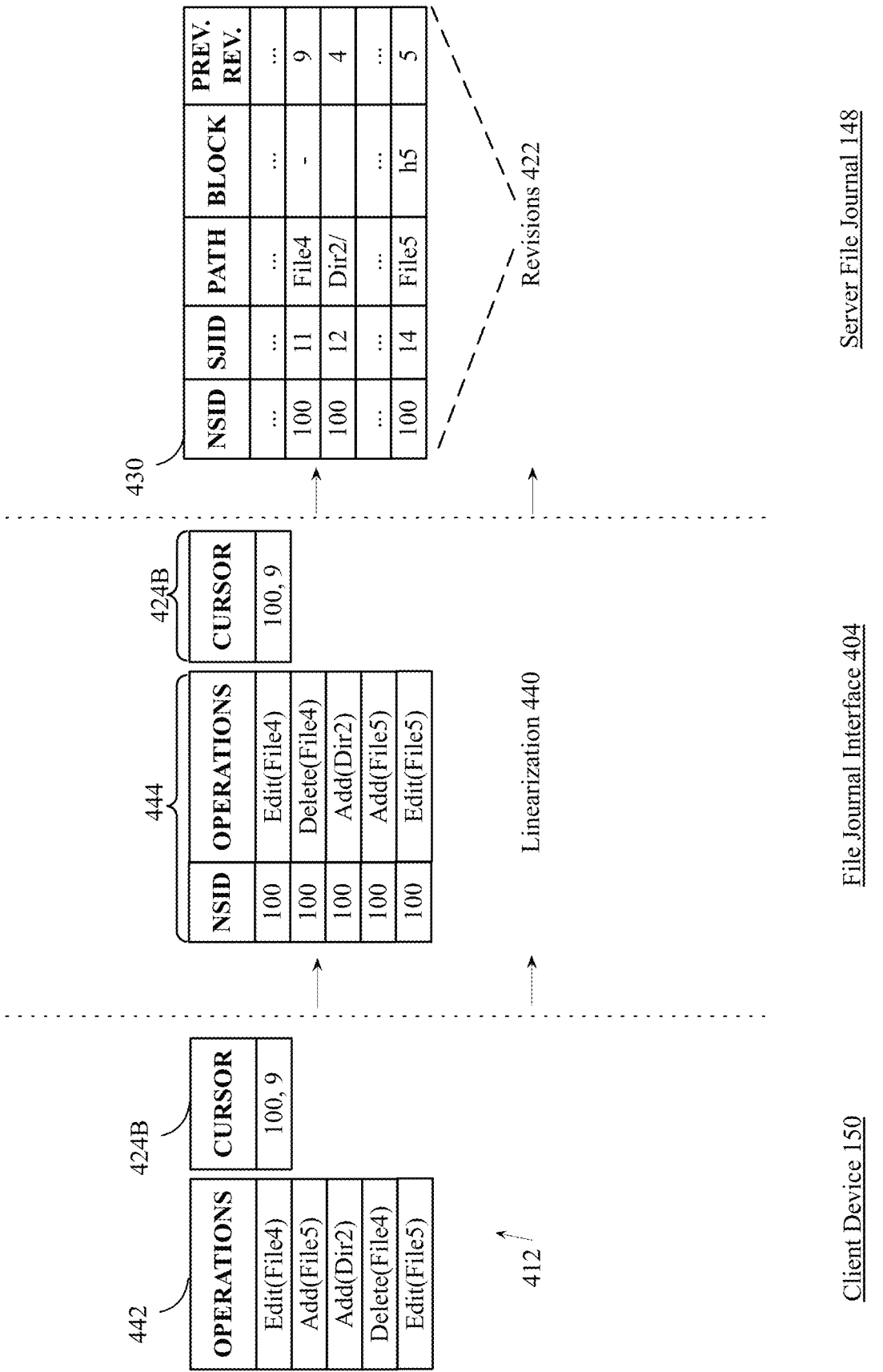
FIG. 9B shows an example translation and linearization process for translating operations from a client device to revisions for a server file journal in accordance with some embodiments of the present technology.

FIG. 9B illustrates a diagram of an example process for linearization 430 to convert operations data 412 from client device 150 to revisions 422 for journal 426 at server file journal 148. Client device 150 can provide operations data 412 to file journal interface 404. Operations data 412 in this example includes operations 412 at client device 150, such as content item edit, add, rename, move, mount, or delete operations. In some cases, operations 412 can include multiple operations to a same content item. For example, operations 412 can include an operation editing "File4" on namespace "100" and an operation deleting "File4" from namespace "100".

Operations data 412 also includes cursor 424B previously received by client device 150 from file journal interface 404. Cursor 424B can identify the state (e.g., NSID and SJID) of latest revisions in journal 426 for one or more namespaces and/or content item and can also include the FSAuth token including the user ID, and the last observed access permissions to the NS_ID provided in the cursor. Client device 150 can provide cursor 424B to file journal interface 404 as a reference point for operations 412. In this example, cursor 424B provides the latest state for namespace "100", which is represented by SJID "9".

Since the cursor was cryptographically signed by content management system 110, file journal interface 404 can determine that the cursor has not been tampered with. Further, since client device 150 can only commit revisions to server file journal 148 when it has received the most recent revisions from server file journal 148 for the namespace, file journal interface 404 can accept that the last observed access permissions to the NS_ID are still valid, and therefore client device has access to the namespace.

File journal interface 404 can receive operations 412 and cursor 424B and perform linearization 430, to linearize and transform operations 412 from client device 150 to revisions 422 for journal 426. Based on operations 412, file journal interface 404 can generate log 433 of operations. Log 433 can include a list of operations from operations 412 mapped to respective namespace(s) in journal 426. In some cases, log 433 can include linearized operations (424A) generated from operations 412 as previously explained.

File journal interface 404 can use cursor 424B to verify that operations 412 reflect the latest state or revisions in journal 426 before updating journal 426 to reflect the operations in log 433. If file journal interface 404 confirms that cursor 424B reflects the latest state or revisions in journal 426 for the namespaces and/or content items associated with log 433, file journal interface 404 can add revisions 422 to journal 426 based on log 433. Revisions 422 can include the latest state or revision of each content item and/or namespace associated with the operations in log 433.

The operations in log 433 include an add and edit operation for "File5". Accordingly, revisions 422 include the edit of "File5", which file journal interface 404 can write to journal 426 as the latest state of "File5" (i.e., the state after the add and edit operations are applied to "File5" in a linearized fashion). The operations in log 433 also include an add operation for "Dir2" as well as edit and delete operations for "File4" on namespace "100". Revisions 422 can thus include an operation adding "Dir2" to namespace "100" and an operation deleting "File4" from namespace "100" as the latest state of "Dir2" and "File4" respectively.

In FIG. 9B, the revisions (422) depicted in journal 426 reflect the latest state of each content item ("File4", "File5", "Dir2") associated with operations 412. However, it should be noted that, in some cases, file journal interface 404 can write every revision represented by log 433 to journal 426 in order to reflect not only the latest state revision of each namespace and/or content item resulting from log 433, but also any previous states or revisions leading up to the latest state or revision. For example, file journal interface 404 can write a revision in journal 426 for the edit of "File4" and a subsequent revision for the delete of "File4", as opposed to only writing the edit of "File4" reflecting the latest state from operations 412, to indicate in journal 426 the full sequence of revisions of "File4" from operations 412.

File journal interface 404 can transform operations in log 433 to revisions 422 and update journal 426 to include revisions 422. File journal interface 404 can write revisions 422 to journal 426 at respective rows in journal 426. File journal interface 404 can add revisions 422 to the next available rows (e.g., SJIDs) in journal 426. In some cases, file journal interface 404 can add revisions 422 based on a relative order which can be determined based on linearization 430 and/or respective timestamps or clocks.

As shown in FIG. 9B, the delete operation of "File4" in namespace "100" is included in row "11" or SJID "11" for namespace "100". The revision in SJID "11" of journal 426 indicates that "File4" in namespace "100" has been deleted, as reflected by the minus symbol in the block field, and identifies SJID "9" as the previous revision in journal 426 for "File4" in namespace "100". The addition of "Dir2" and edit of "File5" are included respectively in rows or SJIDs 12 and 14.

Journal 426 in FIG. 9B has been updated to include revisions 422 based on log 433 and cursor 424B, to reflect the state of each content item modified in log 433. The path field at each row in journal 426 identifies a content item within the associated namespace (e.g., namespace "100"). The path field of a row is based on the file and namespace from a corresponding operation in log 433. The block field in journal 426 represents the content item. In some cases, the block field can include a hash of a respective content item or data block. The block field can be empty if the content item has been deleted and/or is a directory, folder, mount, etc.

When updating journal 426 to include revisions 422 based on log 433 and cursor 424B, translation service 406 can identify the path of each content item to include in the path field of journal 426. In some cases, translation service 406 can translate an identifier of a content item (e.g., File ID) to a path of the content item (e.g., /directory/filename). For example, client device 150 can use identifiers to identify content items (e.g., content items in operations data 412) without having to track or calculate respective paths for the content items. Journal 426 may instead use a content item's path to identify the content item. Translation service 406 can use the identifiers of content items from client device 150 to calculate the paths of the content items for journal 426, and update journal 426 using the paths calculated for the content items. Translation service 406 can also perform a reverse translation to obtain a content item's identifier based on the content item's path, and use the content item's identifier when referencing the content item in communications with client device 150.

For example, translation service 406 can use the path in journal 426, NSID in journal 426, and/or a directory field in journal 426 (or elsewhere in server file journal 148) to identify a content item and obtain an identifier (e.g., File ID) of that content item. If file journal interface 404 sends an update or information to client device 150 pertaining to that content item, file journal interface 404 can provide the identifier of the content item to client device 150, which client device 150 can use to identify the content item with or without the path of the content item.

As previously mentioned, before writing revisions 422 to journal 426 from operations 412, file journal interface 404 can check if cursor 424B reflects the latest state or revision in journal 426 for each namespace and/or content item associated with operations 412. In some cases, after confirming that cursor 424B reflects the latest state or revisions in journal 426, file journal interface 404 can also perform a second check to ensure that a revision generated from operations 412 will not conflict with an existing revision in journal 426. For example, if SJID "5" in namespace "100" at journal 426 represents a delete operation of "File5", the edit revision 422 of "File5" depicted in SJID "14" emitted from operations 412 received by file journal interface 404 from client device 150 would create a conflict by attempting to edit "File5" even though "File5" was deleted at SJID "5". Thus, file journal interface 404 can reject the edit operation and revision in this example, and communicate to client device 150 that the edit operation is invalid. File journal interface 404 can update cursor 424B and provide the updated cursor to client device 150 to inform client device 150 of the latest state or revision in journal 426 for "File5" (and any other content item) as necessary.

Figure 10:
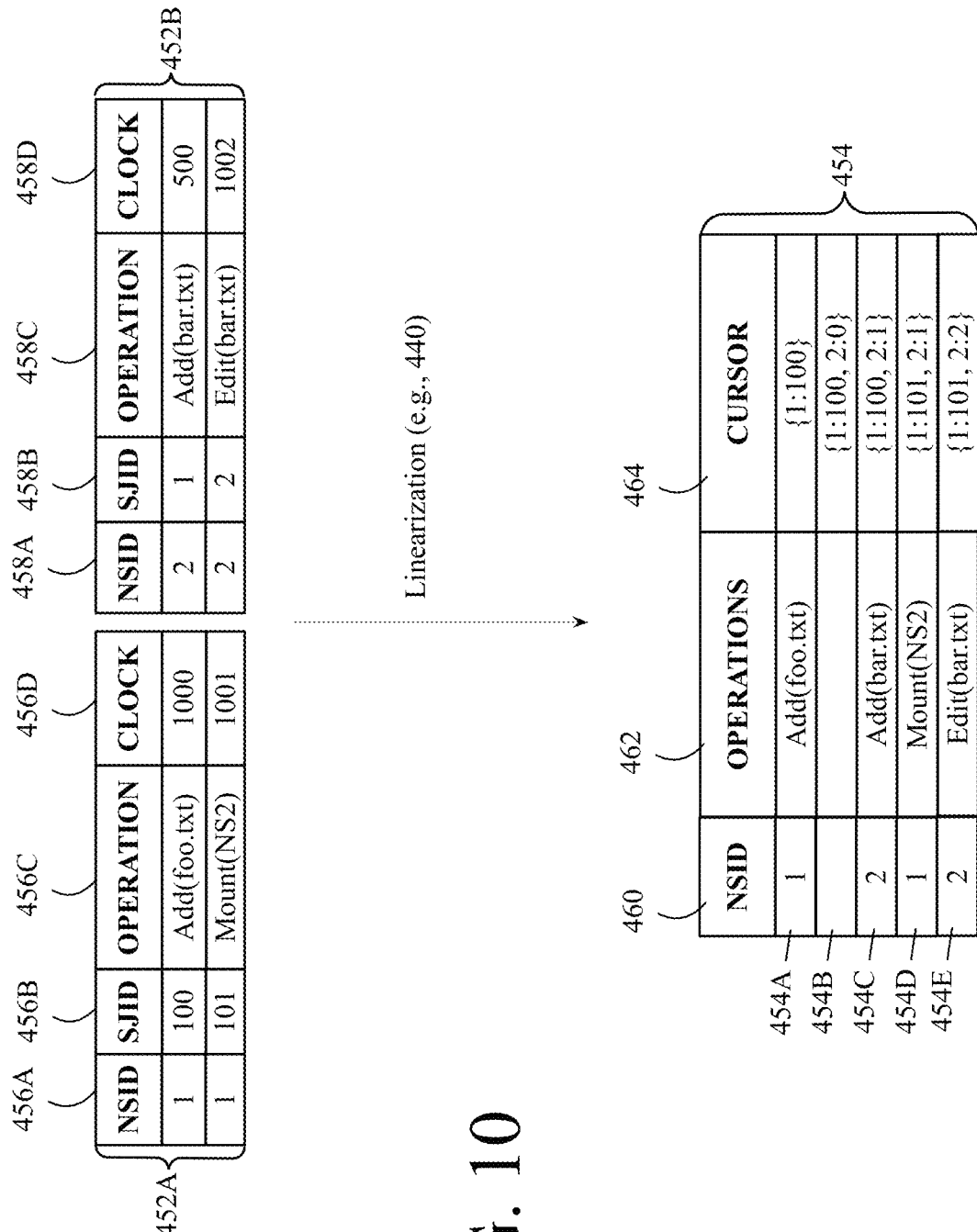
FIG. 10 shows an example linearization of cross-namespace operations in accordance with some embodiments of the present technology.

FIG. 10 illustrates a diagram of an example linearization of cross-namespace operations. Cross-namespace linearization and cross-shard or cross-namespace listing can be performed via clock ordering. Tables 432A, 432B (collectively "432") illustrate a batch of cross-namespace operations for linearization. Tables 432A, 432B respectively include columns 436A, 438A, which are namespace (NSID) fields for identifying a namespace for the records in tables 432A, 432B, columns 436B, 438B are SJID fields for identifying rows or SJIDs in tables 432A, 432B for respective namespaces in columns 436A, 438A, columns 436C, 438C are operations fields for identifying operations associated with each SJID, and columns 436D, 438D are clock fields for identifying a timestamp associated with the operations in columns 436C, 438C.

In this example, table 432A depicts SJIDs "100" and "101" for NSID "1". SJID "100" is associated with an operation adding "foo.txt" to namespace "1" at timestamp "1000", and SJID "101" is associated with an operation mounting namespace "2" at timestamp "1001". Table 432B depicts SJIDs "1" and "2" for NSID "2". SJID "1" is associated with an operation adding "bar.txt" to namespace "2" at timestamp "500", and SJID "2" is associated with an operation editing "bar.txt" at timestamp "1002".

A linearizer (e.g., translation service 406) can obtain the batch of operations in tables 432 and emit a single stream of operations (442) with a cursor (444). The linearizer can identify all namespaces having at least one operation in tables 432 and linearize the operations for all namespaces based on the respective timestamps, NSIDs, SJIDs. In this example, the batch of operations in tables 432 linearize to the stream of operations shown in table 434.

Table 434 includes NSID column 440 which includes NSID fields for identifying the namespace of each operation, operations column 442 which includes operation fields for identifying the operations in table 434, and cursor column 444 which includes cursor fields for identifying a cursor state for each operation. Row 434A in table 434 includes the add operation from SJID "100" of namespace "1" in table 432A. The cursor state in cursor column 444 for row 434A is namespace "1" and SJID "100", which indicates the add operation corresponds to SJID "100" in namespace "1" shown in table 432A. Row 434B in table 434 does not include a value in NSID column 440 or operations column 442, but updates the cursor state in cursor column 444 to include a cross-namespace cursor state, which in this example adds SJID "0" for namespace "2".

Row 434C in table 434 includes the add operation from SJID "1" in namespace "2" shown in table 432A. The cursor state in cursor column 444 for row 434C includes the respective SJIDs "100" and "1" for namespaces "1" and "2" associated with the add operation in row 434C. As shown, the cursor state indicates the cursor is at SJID "100" in namespace "1" and SJID "1" in namespace "2". In other words, the row or SJID in namespace "1" has not increased as the add operation does not affect the state of namespace "1", but the row or SJID in namespace "2" has increased by one as the add operation represents a revision in namespace "2" and affects the state of namespace "2". Thus, the cursor state in row 434C tracks the respective SJIDs for namespace "1" and namespace "2" after the add operation at SJID "1" in namespace "2".

Row 434D in table 434 includes the mount operation at SJID "101" and namespace "1" at table 432A. The mount operation mounts namespace "2" at namespace "1". The mount operation increases the SJID in namespace "1" from "100" to "101", but does not increase the SJID in namespace "2". Accordingly, the cursor state in cursor column 444 for row 434D includes SJID "101" for namespace "1" and remains SJID "1" for namespace "2". This cursor state reflects the state and/or order at namespaces "1" and "2".

Row 434E in table 434 includes the edit operation at SJID "2" and namespace "2" in table 432A, which according to the respective timestamps of the mount and edit operations, is after the mount operation at SJID "101" in namespace "1". The cursor state in cursor column 444 of row 434E maintains the cursor state for namespace "1" at SJID "101" but increases the cursor state for namespace "2" to SJID "2".

As illustrated in table 434, operations 442 are listed as a stream of operations linearized based on causality and timestamps across namespaces "1" and "2". Once operations 442 are linearized in table 434 to reflect cross-namespace causality and sequencing, operations 442 can be converted to revisions in server file journal 148 (e.g., revisions 422 in journal 426) and written to server file journal 148.

For example, a journal for namespace "1" in server file journal 148 can be updated to include a revision at SJID "100" representing the add operation adding "foo.txt" to namespace "1", and a revision at SJID "101" representing the mount operation mounting namespace "2" on namespace "1". Moreover, a journal for namespace "2" in server file journal 148 can be updated to include a revision at SJID "1" representing the add operation adding "bar.txt" to namespace "2", and a revision at SJID "2" representing the edit operation editing "bar.txt" on namespace "2".

Figure 11A:
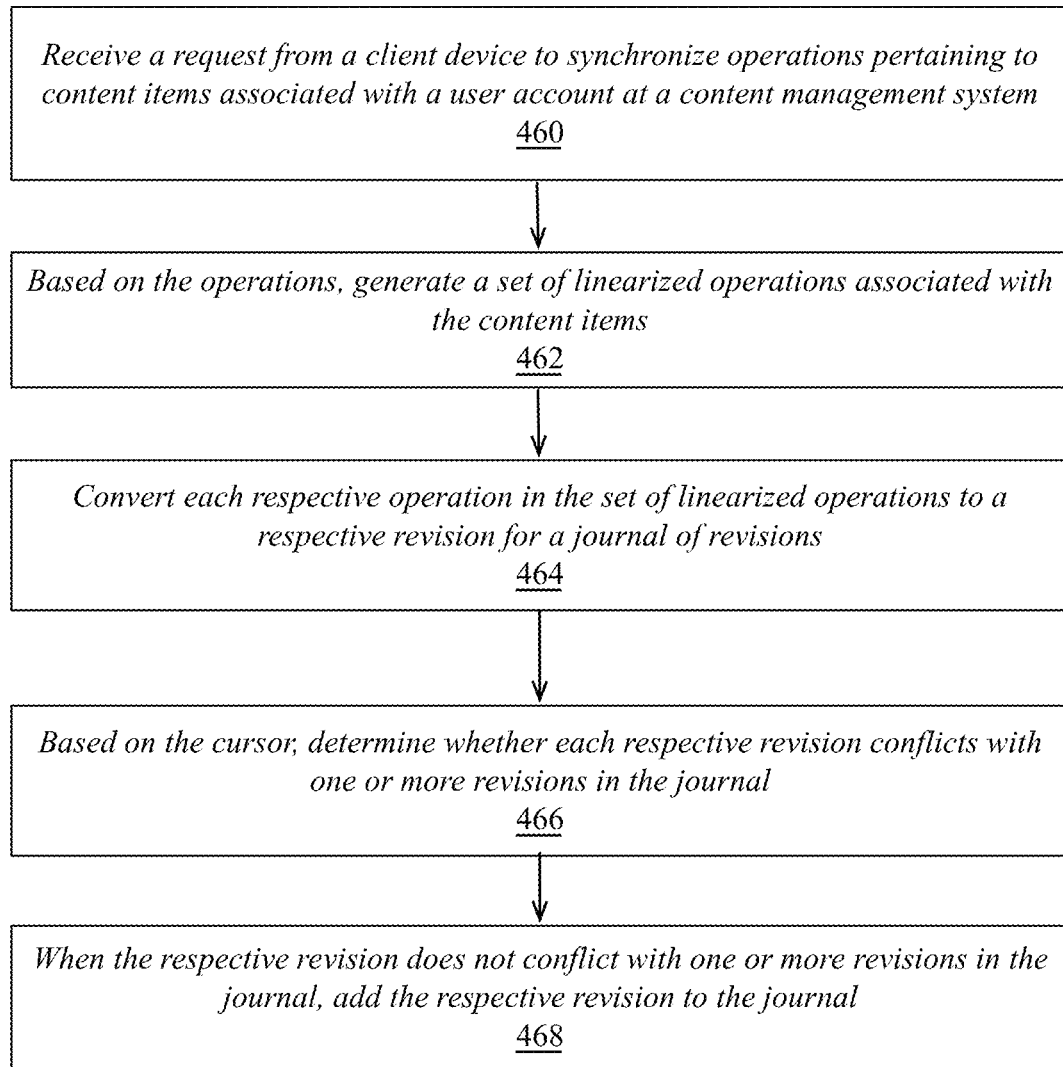
FIG. 11A shows an example method for translating operations from a client device to revisions for a server file journal on a content management system in accordance with some embodiments of the present technology.

FIG. 11A illustrates an example method for translating operations from client device 150 to revisions for server file journal 148 and updating server file journal 148.

At step 468, file journal interface 404 receives a request from client device 150 to synchronize operations pertaining to content items associated with a user account registered at content management system 110. The request includes operations (e.g., 412) associated with the content items and a cursor (e.g., 424B) identifying a current position (e.g., NSID: SJID) of client device 150 in journal 426 at server file journal 148. In some embodiments the cursor can also include the FSAuth token including the user ID, and the last observed access permissions to the NS_ID provided in the cursor. Each of the operations can include a namespace or a content item associated with a namespace. For example, the operations can include an operation to mount a namespace and an operation to add, edit, or delete a content item on a namespace.

Since the cursor was cryptographically signed by content management system 110, file journal interface 404 can determine that the cursor has not been tampered with. Further, since client device 150 can only commit revisions to server file journal 148 when it has received the most recent revisions from server file journal 148 for the namespace, file journal interface 404 can accept that the last observed access permissions to the NS_ID are still valid, and therefore client device has access to the namespace.

Based on the operations, at step 462, file journal interface 404 generates a set of linearized operations (e.g., 424A) associated with the content items, the set of linearized operations including a respective operation for each content item. The respective operation can be derived from one or more of the operations in the request associated with the content item. For example, the respective operation can be based on a single operation for the content item or multiple operations in the request.

At step 464, file journal interface 404 converts each respective operation in the set of linearized operations (e.g., 424A) to a respective revision (e.g., 422) for journal 426. The respective revision can represent a row (e.g., 428) of values for journal 426, reflecting the respective operation. Based on the cursor, at step 466, file journal interface 404 determines whether each respective revision conflicts with one or more revisions in journal 426.

For example, if the cursor indicates that client device 150 had not obtained the most recent revisions in journal 426 prior to the respective operation associated with the respective revision, file journal interface 404 may determine that client device 150 does not have the most current state from journal 426 and the respective revision would create a conflict as it modifies an outdated content item or namespace. File journal interface 404 may then reject the respective revision, send an updated cursor and/or revision(s) to client device 150, or attempt to reconcile the conflict with the latest revisions/state in journal 426. As another example, if the cursor indicates that client device 150 has the latest revisions in journal 426, file journal interface 404 may accept the respective revision. In some cases, prior to accepting the revision, file journal interface 404 can compare the respective revision with one or more previous revisions in journal 426 to validate the respective revision and ensure it would not conflict with previous revisions in journal 426. For example, file journal interface 404 can identify the previous revision in journal 426 for the content item (e.g., namespace, directory, file, etc.) associated with the respective revision, and check to ensure the respective revision does not conflict with the previous revision in journal 426.

At step 468, when the respective revision does not conflict with one or more revisions in journal 426, file journal interface 404 can add the respective revision to journal 426. File journal interface 404 can add the respective revision in a particular row in journal 426, which it can identify based on the namespace associated with the respective revision. When new revisions are added to journal 426 and/or server file journal 148, file journal interface 404 can send an updated cursor to client device 150 to report the new revisions and synchronize the new revisions with client device 150. Client device 150 can also request an update to the cursor at client device 150. Client device 150 can store a copy of the last cursor received from file journal interface 404 as a reflection of the state of content items on client device 150 and/or a position of client device 150 in journal 426 indicating the last revision(s) obtained by client device 150.

Figure 11B:
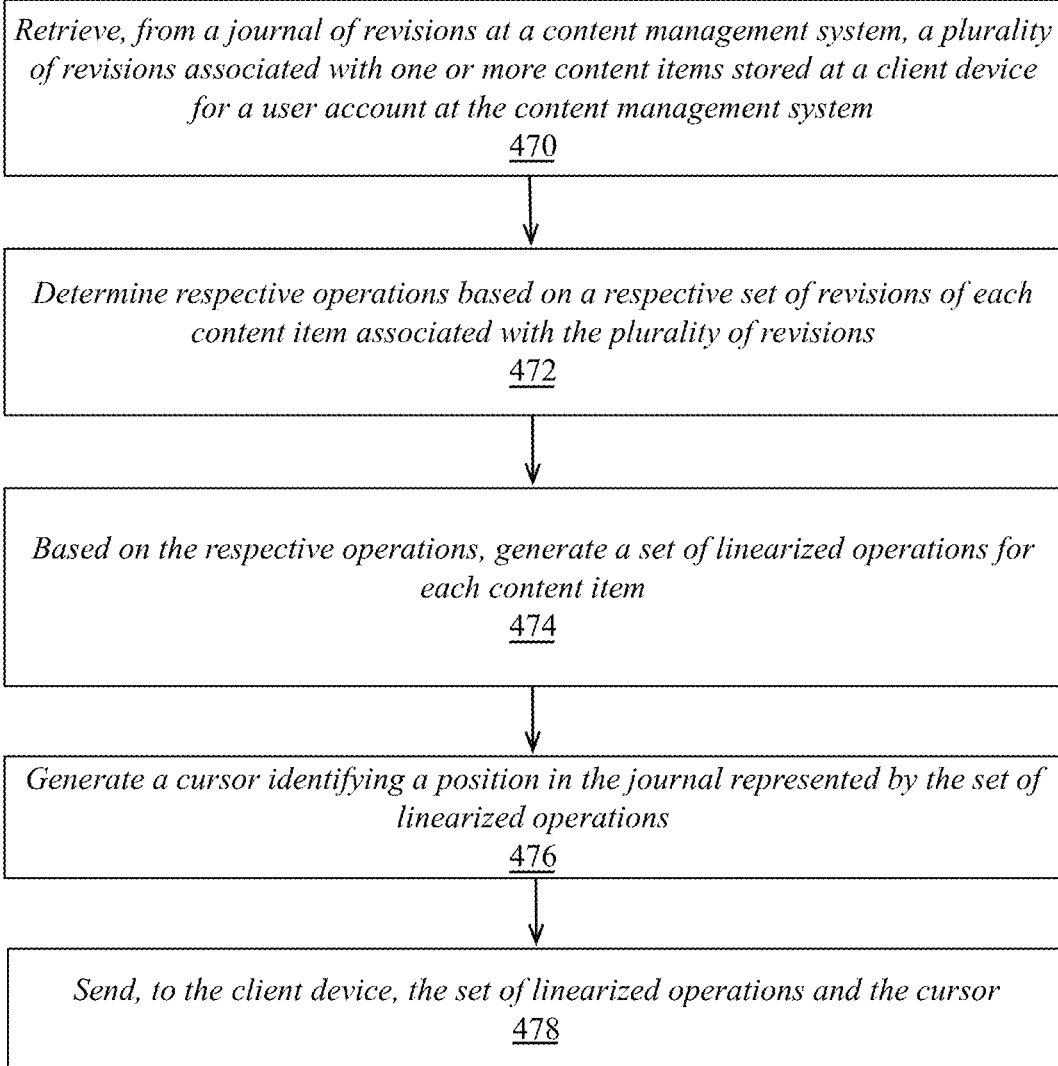
FIG. 11B shows an example method for translating revisions from a server file journal on a content management system to operations for a client device in accordance with some embodiments of the present technology.

FIG. 11B illustrates an example method for converting revisions from server file journal 148 to operations for client device 150.

Client device 150 can request updates for one or more namespaces by making a request to file journal interface 404 along with a cursor identifying the one or more NS_IDs for which updates are requested and SJIDs for each namespace indicating the last revision client device is aware of. The cursor can also include the FSAuth token including the user ID, and the last observed access permissions for the NS_IDs provided in the cursor.

Since the cursor was cryptographically signed by content management system 110, file journal interface 404 can determine that the cursor has not been tampered with. Therefore, file journal interface 404 can accept that the last observed access permissions to the NS_ID are still valid as of the SJIDs listed in the cursor, and therefore client device has access to the namespace. However, the permissions may have changed since the SJIDs listed in the cursor. Accordingly, file journal interface 404 watches for "mount" revisions, which can cause changes of access. If a "mount" revision is encountered file journal interface 404 queries authorization service 132 (as addressed in FIG. 4) to determine whether user account has access to the folder for which the mount was read from server file journal 148.

At step 470, file journal interface 404 retrieves, from journal 426 of revisions at server file journal 148, a plurality of revisions (e.g., 422) associated with one or more content items stored at client device 150 for a user account registered at content management system 110. Each revision can modify a namespace, folder, file, or any content item. Moreover, each revision can be associated with a namespace and a journal identifier (SJID) for that namespace.

In some cases, file journal interface 404 can retrieve the plurality of revisions from journal 426 based on a determination that journal 426 has been updated to include revisions that are not available at client device 150. For example, file journal interface 404 can track new revisions added to journal 426 and/or compare revisions at journal 426 with the cursor at client device 150. In some cases, file journal interface 404 can query journal 426 to retrieve the plurality of revisions and/or check revisions available at journal 426.

At step 472, file journal interface 404 determines respective operations based on a respective set of revisions of each content item associated with the plurality of revisions. For example, file journal interface 404 can linearize any revisions of a content item and translate the revisions to one or more respective operations for that content item. In some cases, file journal interface 404 can also transform multiple operations for that content item into a single operation defining or reflecting the state or modification of the content item when the multiple operations are executed in linear fashion.

In some cases, when calculating the respective operations for of the plurality of revisions, file journal interface 404 can make inferences or calculations based on the number of revisions associated with a particular content item and/or the type of content item associated with such revisions. For example, if the plurality of revisions includes a single revision for a content item, file journal interface 404 can infer from the single revision (e.g., revisions 422) and/or a block or content associated with the revision (e.g., block or content in rows 428 of journal 426) a type of modification (e.g., 429) of the content item represented by that revision, and calculate the respective operation for that content item based on the type of modification represented by the revision.

To illustrate, as shown in FIG. 7, modifications 429 depict a modification for "Dir" at namespace "101" corresponding to SJID "1" and NSID "100". This modification is the only modification (429) and revision (422) for namespace "101". Thus, file journal interface 404 can infer that the modification depicting "Dir" in namespace "101" is and add or mount of "Dir", as it represents the first instance of namespace "101" being modified or revised to include "Dir". Since "Dir" is a directory or folder, as illustrated by the block field in journal 426, the modification can be an add or mount of the directory or folder (which can trigger a look up of access rights from authentication service 132). If "Dir" was a namespace, the modification would represent a mount of namespace "Dir" at namespace "101". On the other hand, if "Dir" was a file associated with a particular content or block, which could be determined based on the block field in journal 426, then the modification for "Dir" would be an add of the file "Dir" to namespace "101". For example, if SJID "1" and NSID "101" instead depicted "File1" associated with "h1", the corresponding modification would be an add of "File1" to namespace "101".

Thus, unless the content or block field associated with a revision (422) in journal 426 depicts a deletion (e.g., a minus symbol in the block or content field), the respective operation for a first or only revision of a content item can represent a mount or add operation depending on whether the content item is a namespace or another type of content item. This is based on the assumption that other operations, such as an edit, unmount, or delete operation, would be expected to include a previous revision for mounting or adding the associated content item. If a content item does not have a previous revision associated with it, file journal interface 404 can infer that a revision associated with the content item is likely not an edit, unmount, or delete operation, but rather an add or mount operation.

In some cases, file journal interface 404 can calculate an operation for a content item based on multiple revisions (422) for that content item and associated namespace. For example, file journal interface 404 may infer a delete, edit, or unmount operation from a revision representing an add or mount of the content item and a subsequent revision representing the delete, edit, or unmount. To illustrate, as shown in FIG. 7, file journal interface 404 calculates an edit operation for "File1" in namespace "100" based on multiple modifications (429) and revisions (422) corresponding to SJIDs "1" and "4" for namespace "100" in journal 426. Since SJIDs "1" and "4" include blocks "h1" and "h4", representing content values "aaa" and "aa2" in modifications 429, file journal interface 404 can determine that SJID "1" represents an add operation and SJID "4" represents an edit operation, with a resulting state being based on the edit operation at SJID "4".

Based on the respective operations, at step 474, file journal interface 404 generates a set of linearized operations (e.g., 422) for each content item. The set of linearized operations can reflect modifications 429 of each content item based on the plurality of revisions in journal 426. File journal interface 404 can convert the plurality of revisions (422) to the set of linearized operations (424A) by linearizing the respective operations calculated for each content item based on relative clocks and/or causality.

At step 476, file journal interface 404 generates a cursor (e.g., 424B) identifying a position in journal 426 represented by the set of linearized operations. At step 478, file journal interface 404 sends the set of linearized operations and cursor to client device 150. The cursor can include a respective namespace identifier (NSID) and journal identifier (SJID) for each namespace and/or operation and can also include the FSAuth token including the user ID, and the last observed access permissions to the NS_ID provided in the cursor. The combination of an NSID and SJID in the cursor can indicate a revision number in journal 426 for a particular namespace. Client device 150 can use the cursor to identify revisions obtained by client device 150 and a position of client device 150 in journal 426 corresponding to the revisions that have been obtained by client device 150. Client device 150 can also provide its latest cursor to file journal interface 404 to report to file journal interface 404 the current position of client device 150 in journal 426. For example, client device 150 can provide the cursor to file journal interface 404 to determine if client device 150 needs new revisions.

Client device 150 can also provide its cursor to file journal interface 404 when reporting operations at client device 150 to file journal interface 404. The cursor maps the operations to specific revisions in journal 426 and/or a position in journal 426. This allows file journal interface 404 to determine if the operations from client device 150 are based on the latest revisions to the content items being modified by the operations.

Client device 150 can receive the cursor and set of linearized operations and update the content items at client device 150 based on the operations. This way, client device 150 can synchronize content items between client device 150 and content management system 110. Client device 150 can store the cursor to provide its position in journal 426 to file journal interface 404.

Client Synchronization Service

After file journal interface 404 sends operations 412 to client device 150 as described above, client synchronization service 156 can process the operations and update its local databases and file system with the updates received from content management system 110.

Client synchronization service 156 also determines that changes have been made on client device, and is responsible for sending operations from client device 150 to file journal interface 404 as described above.

Figure 12:
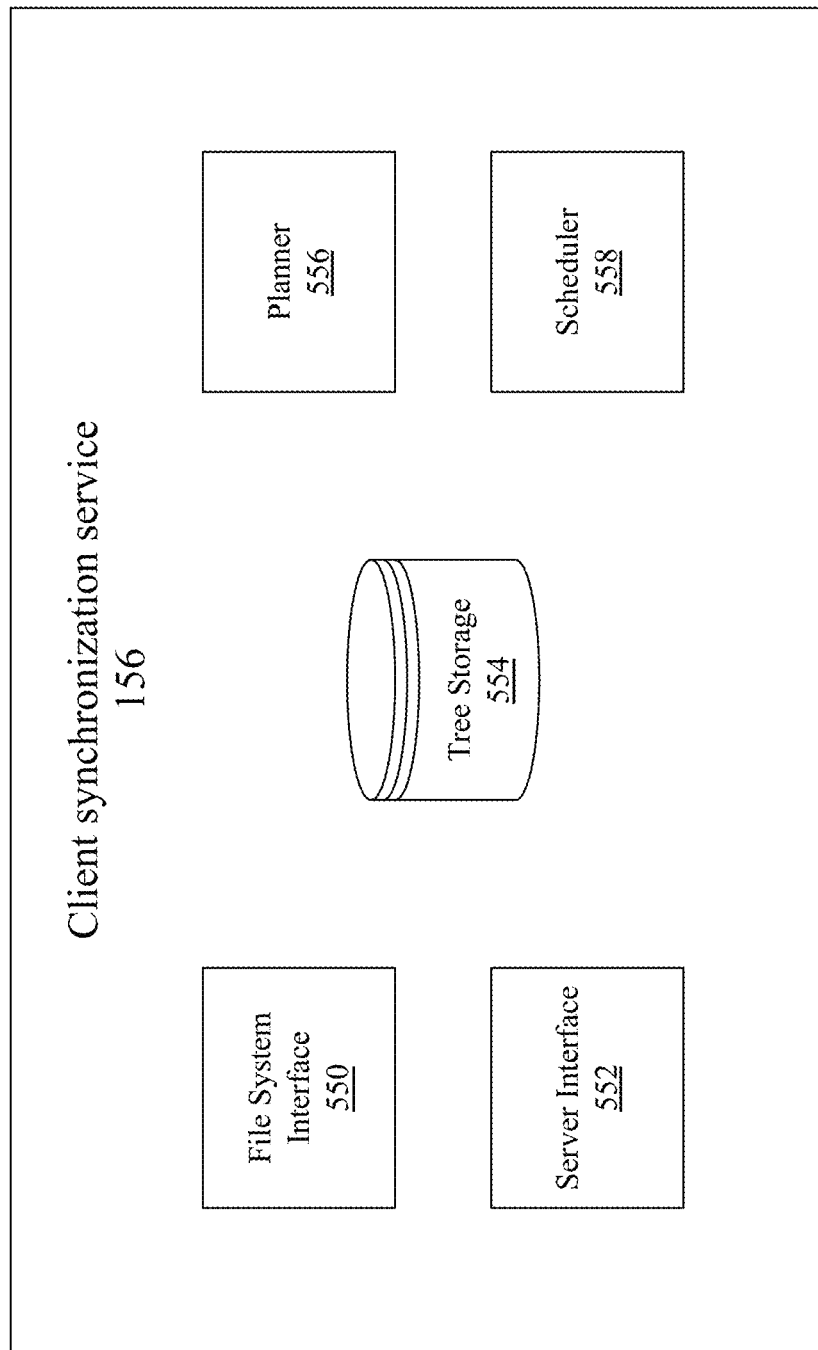
FIG. 12 shows an example of a client synchronization service in accordance with some embodiments of the present technology.

FIG. 12 shows an example of client synchronization service 156, in accordance with some embodiments. Client synchronization service 156 is configured to synchronize changes to content items between a content management system and client device 150 on which client synchronization service 156 runs.

Client synchronization service 156 may include file system interface 550, server interface 552, tree storage 554, planner 556, and scheduler 558. Additional or alternative components may also be included. High level descriptions of client synchronization service 156 and its components are discussed below with respect to FIG. 12. However, further details and embodiments of client synchronization service 156 and its components are discussed throughout.

File system interface 550 is configured to process changes to content items on the local file system of the client device and update the local tree. For example, file system interface 550 can be in communication with client synchronization service 156 of FIG. 1 detect changes to content items on the local file system of the client device. Changes may also be made and detected via client application 152 of FIG. 1. File system interface 550 may make updates to the local tree may be made based on the changes (new, deleted, modified, copied, renamed, or moved content items) to content items on the client device.

Server interface 552 is configured to aid in the processing of remote changes to content items at a remote storage of the content management system and updating of the remote tree. For example, server interface 552 can be in communication with server synchronization service 112 of FIG. 1 to synchronize changes to content items between client device 150 and content management system 110. Changes (new, deleted, modified, copied, renamed, or moved content items) to content items at content management system 110 may be detected and updates may be made to the remote tree to reflect the changes at content management system 110.

Tree storage 554 is configured to store and maintain the tree data structures used by client synchronization service 156. For example, tree storage 554 may store the local tree, the sync tree, and the remote tree. According to some embodiments, tree storage 554 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 554 may access and update the tree data structures on main memory and, before the client device or client synchronization service 156 is shut down, tree storage 554 may store the updated tree data structures on persistent memory. Because main memory is expensive in cost and often limited in size on most client devices, additional technological improvements are implemented to decrease the footprint of the tree data structures on main memory. These technological solutions are described further below.

Planner 556 is configured to detect differences between the server state associated with the content management system and the file system state associated with the client device based on the state of the tree data structures. For example, planner 556 may determine if there is a difference between the remote tree and the sync tree. A difference between the remote tree and the sync tree indicates that an action performed remotely on one or more content items stored at the content management system has caused the server state and the file system state to become out of sync. Similarly, planner 556 may also determine if there is a difference between the local tree and the sync tree. A difference between the local tree and the sync tree indicates that an action performed locally on one or more content items stored on the client device has caused the server state and the file system state to become out of sync. If a difference is detected, planner 556 generates a sequence of operations that synchronize the tree data structures.

In some scenarios, a sequence of operations generated based on a difference between the remote tree and the sync tree and a sequence of operations generated based on a difference between the local tree and the sync tree may conflict. Planner 556 may also be configured to merge the two sequences of operations into a single merged plan of operations.

Scheduler 558 is configured to take the generated sequence of operations and manage the execution of those operations. According to some embodiments, scheduler 558 converts each operation in the sequence of operations into a series of one or more tasks that need to be executed in order to perform the operation. In some scenarios, some tasks may become out dated or no longer relevant. Scheduler 558 is configured to identify those tasks and cancel them.

Tree Data Structures Overview

Figure 13:
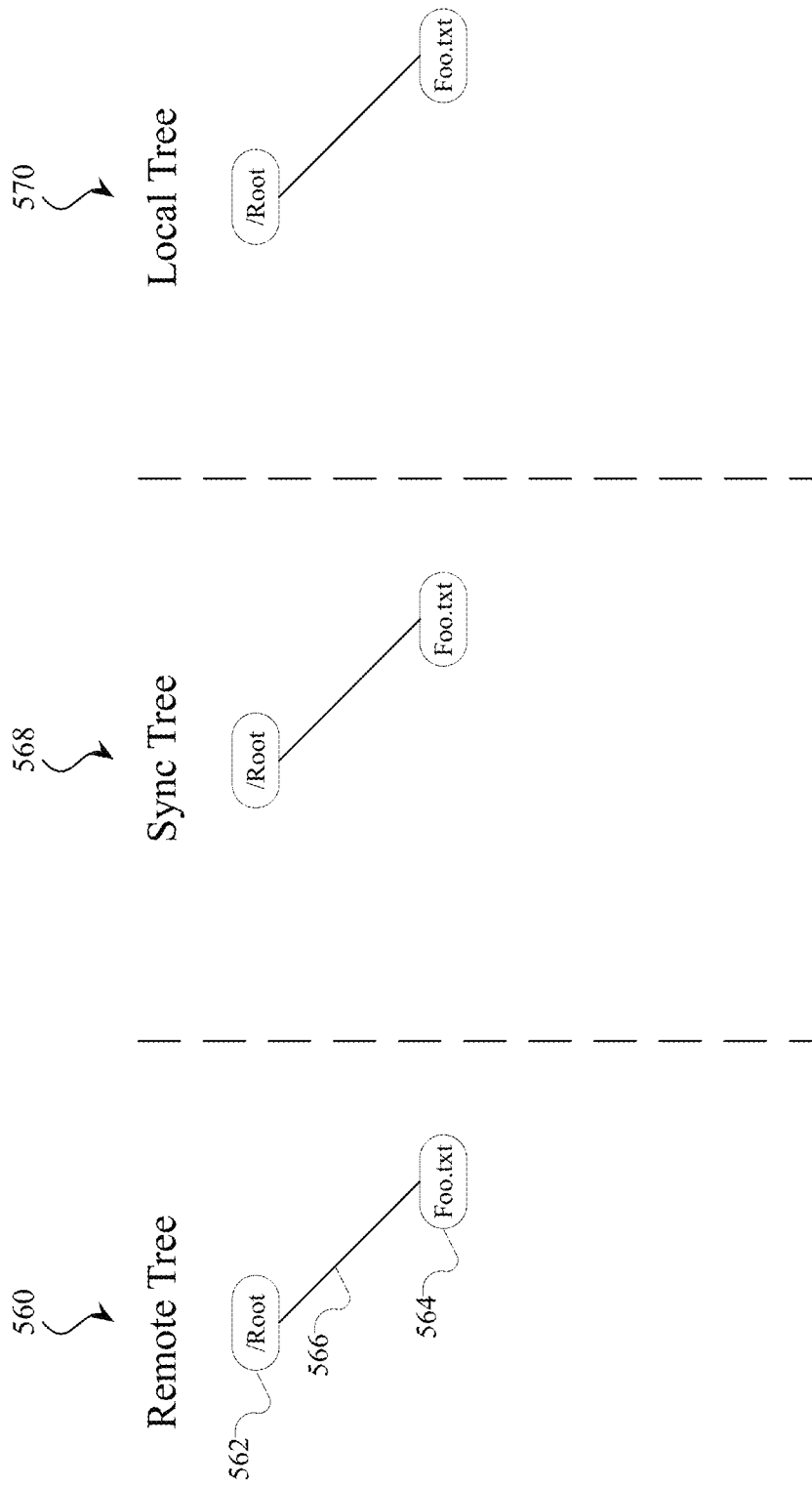
FIG. 13 shows an example of tree data structures in accordance with some embodiments of the present technology.

FIG. 13 shows an example of tree data structures, in accordance with various embodiments. The tree data structures may be stored at the client device and managed by a sync engine such as client synchronization service 156 in FIG. 12. In FIG. 13, the tree data structures are shown including remote tree 560, sync tree 568, and local tree 570.

Remote tree 560 represents a server state or the state of content items stored remotely from the client device (e.g., on a server of the content management system). Local tree 570 represents a file system state or the state of the corresponding content items stored locally on the client device. Sync tree 568 represents a merge base for the local tree and the remote tree. The merge base may be thought of as a common ancestor of the local tree and the remote tree or a last known synced state between the local tree and the remote tree.

Each tree data structure (e.g., remote tree 560, sync tree 568, or local tree 570) may include one or more nodes. Each node may have one or more child nodes and the parent-child relationship is represented by an edge. For example, remote tree 560 includes nodes 562 and 564. Node 562 is a parent of node 564 and node 564 is a child of node 562. This parent-child relationship is represented by edge 566. A root node, such as root node 562, does not have a parent node. A leaf node, such as node 564, does not have a child node.

Each node in a tree data structure may represent a content item (e.g., a file, document, folder, etc.). For example, root node 562 may represent the root folder associated with the content management system and node 564 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item.

As described above, a sync engine may determine that the server state and the file system state of the client device are synchronized when all 3 trees (e.g., remote tree 560, sync tree 568, and local tree 570) are identical. In other words, the trees are synchronized when their tree structures and the relationships that they express are identical and the data contained in their nodes are identical as well. Conversely, the trees are not synchronized if the 3 trees are not identical. In the example scenario illustrated in FIG. 13, remote tree 560, sync tree 568, and local tree 570 are shown as being identical and synchronized and, as a result, the server state and the file system state are synchronized.

Diffing Tree Structures—Delete/Add

Figure 14:
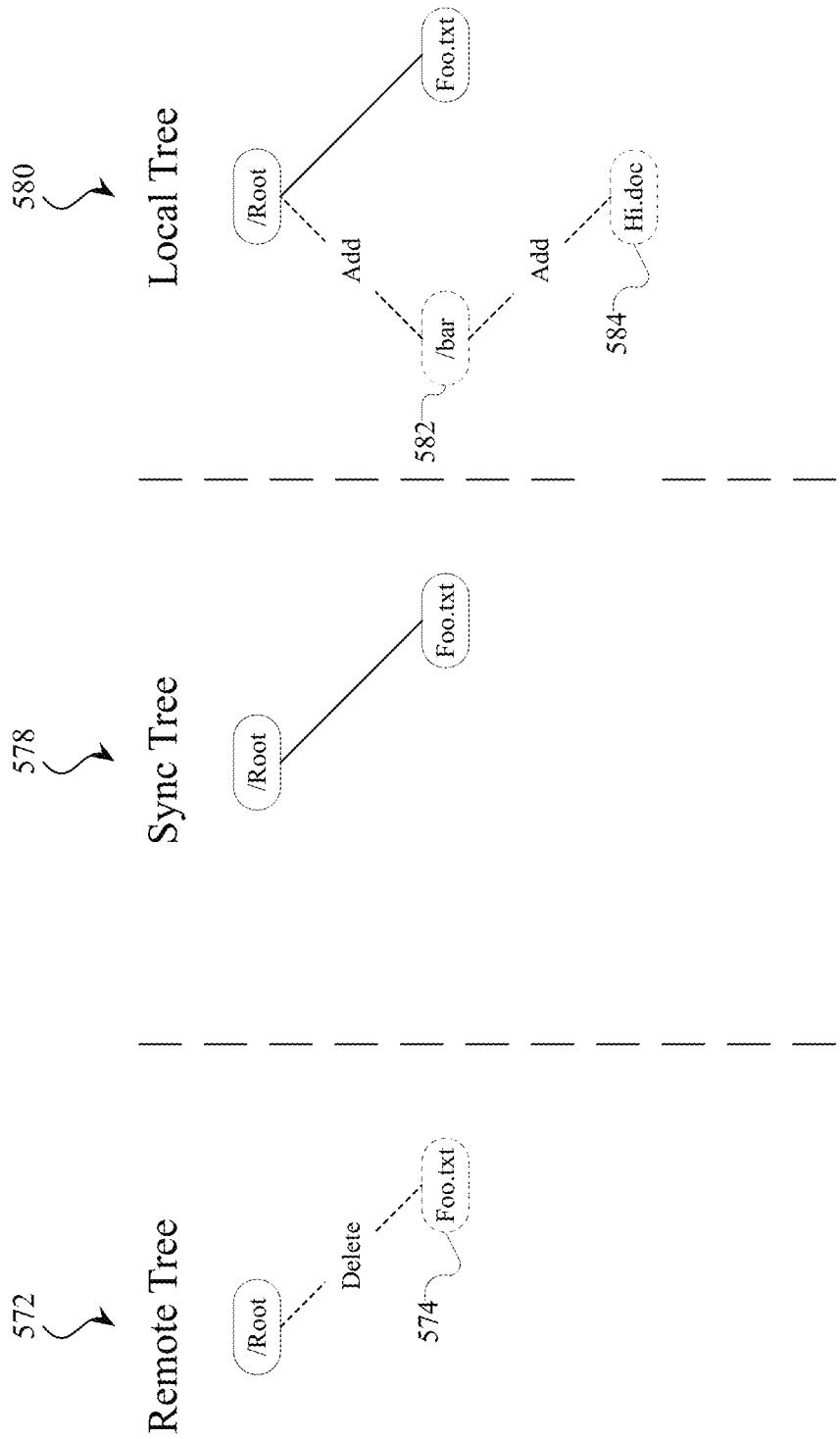
FIG. 14 shows an example of tree data structures in accordance with some embodiments of the present technology.

FIG. 14 shows an example of tree data structures, in accordance with various embodiments. As with the tree data structures shown in FIG. 13, the tree data structures shown in FIG. 14 (including remote tree 572, sync tree 578, and local tree 580) may be stored at the client device and managed by a sync engine such as client synchronization service 156 in FIG. 12. In FIG. 14, the tree data structures are shown.

FIG. 14 shows a scenario after a previously synchronized state, such as the scenario illustrated in FIG. 13, wherein additional actions are performed on the content items represented in the trees to modify the content items such that the trees are no longer in sync. Sync tree 578 maintains a representation of the previously known synchronized state and may be used by the sync engine to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 574 in remote tree 572. The modification shown in the remote tree 572 is a removal (e.g., a removal of the content item from a space managed by the content management system) or delete of the foo.txt content item. These modifications may be performed, for example, on another client device and then synchronized to the content management system or performed through a web browser connected to the content management system.

When the change is made on the content management system, the content management system generates modification data specifying the change made and transmits the modification data to the sync engine on the client device. For example, using a push model where the content management system may transmit or "push" changes to the client device unilaterally. In other implementations, a pull model where the server sends the changes in response to a request by the client device. Additionally, a hybrid model involving a long pull where the client device initiates the requests but keeps the connection open for a period of time so the content management system can push additional changes as needed while the connection is live. The client synchronization service updates the remote tree representing the server state for the content items stored by the content management system based on the modification data. For example, in remote tree 572, node 574 representing the foo.txt content item is shown as deleted.

The sync engine may identify a difference between remote tree 572 and sync tree 578 and, as a result, determine that a modification of the content items at the content management system has caused the server state and the file system state to no longer be in sync. The sync engine may further generate and execute a sequence of operations for the content items stored on the client device that are configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152 of FIG. 1) generates modification data specifying the change made. The sync engine updates the local tree representing the file system state for the content items stored on the client device based on the modification data. For example, in local tree 580, node 582 and node 584 are shown as added. Node 582 and node 584 represent the "/bar" folder and the "Hi.doc" document respectively.

The sync engine may identify a difference between local tree 580 and sync tree 578 and, as a result, determine that a modification of the content items at the client device has caused the server state and the file system state to no longer be in sync. The sync engine may further generate a sequence of operations for the content items stored by the content management system that are configured to converge the server state and the file system state so that they will be in sync. This sequence of operations may be transmitted to the content management system for execution.

As seen in FIG. 14, modifications to content items stored on the client device and content items stored by the content management system may occur at substantially the same time or within a particular time period. These modifications can be reflected in the tree data structures and used by the sync engine to generate sequences of operations for the client device and for the content management system in parallel. In other scenarios, however, modifications may not necessarily occur within the same time period and sequences of operations may be generated in an as-needed manner. Furthermore, although FIG. 14 illustrates scenarios for adding content items and deleting content items, other types of modifications such as, editing, renaming, copying, or moving content items are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the sequence of operations configured to converge the server state and the file system state.

For example, if the two tree data structures are a sync tree and a remote tree, the sync engine may identify each node in the sync tree by, for example, requesting the file identifiers of all nodes in the sync tree. For each node or file identifier for the node in the sync tree, the sync engine may determine if the node or file identifier is also in the remote tree. A node or file identifier in the sync tree that is not found in the remote tree may indicate that the node has been deleted from the server state that is represented by the remote tree. Accordingly, the sync engine may determine that a delete action has occurred on the remote tree. If the node or file identifier for the node is found in the remote tree, the sync engine may check whether the node in the remote tree has been edited or moved.

To determine whether the node in the remote tree has been edited with respect to the node in the sync tree, the sync engine may compare the metadata for the node in the sync tree with the metadata for the corresponding node (e.g., the node with the same file identifier) in the remote tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the sync engine may be compared with the metadata for the node in the remote tree. If the metadata do not match, an edit of the content item may have been edited in the server state represented by the remote tree. Accordingly, the sync engine may determine that an edit action has occurred for the node on the remote tree. If the metadata matches, no edit may have occurred.

To determine whether the node in the remote tree has been moved, the sync engine may compare the location for the node in the sync tree with the location for the corresponding node (e.g., the node with the same file identifier) in the remote tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the sync engine may determine that a move action has occurred for the node on the remote tree.

To determine whether a node has been added to the remote tree, the sync engine may identify any nodes or file identifiers in the remote tree that are not found in the sync tree. If a node or file identifier is found in the remote tree and not found in the sync tree, the sync engine may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

General Synchronization Using Trees

Figure 15:
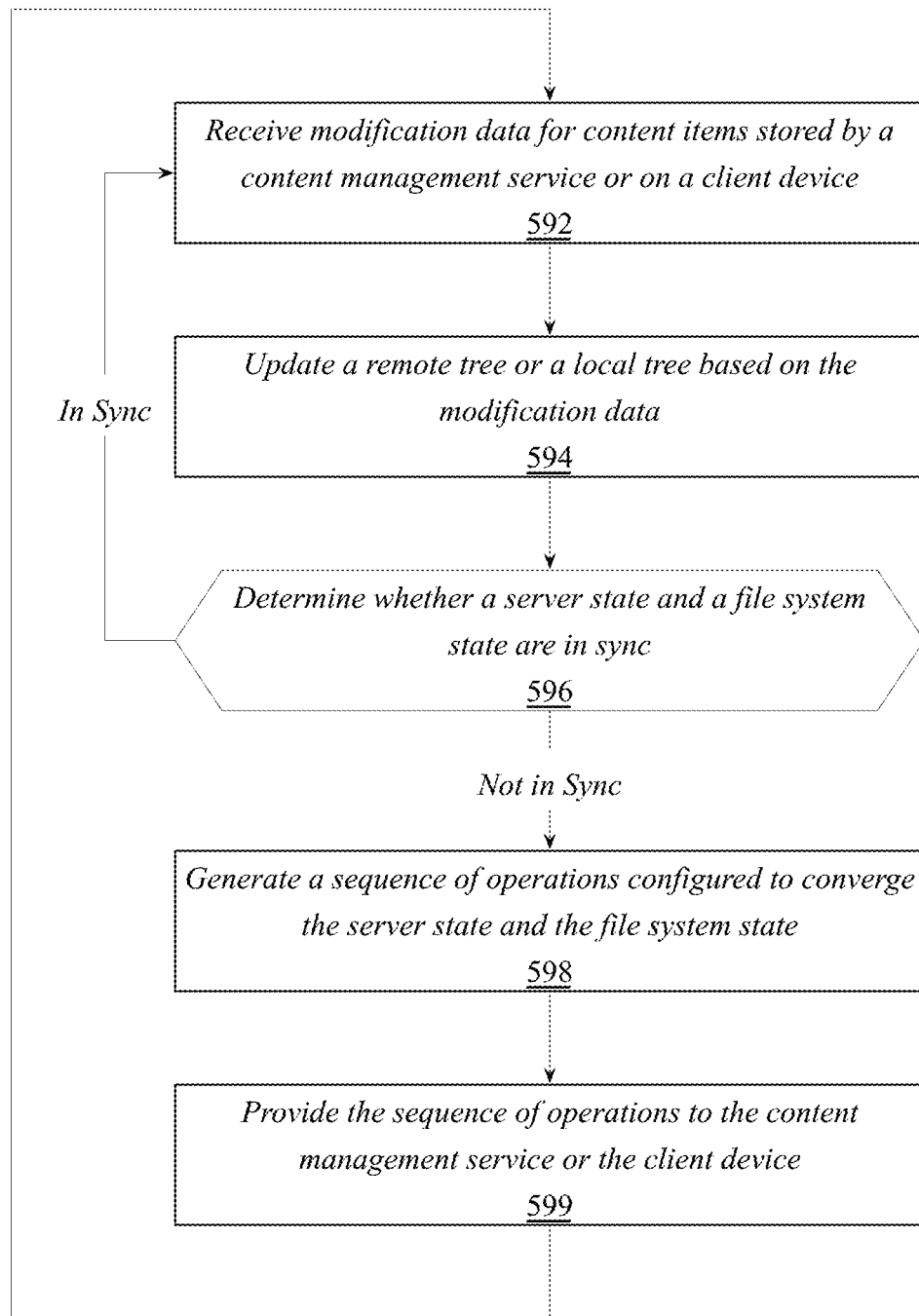
FIG. 15 shows an example method for synchronizing a server state and a file system state using tree data structures in accordance with some embodiments of the present technology.

FIG. 15 shows an example method for synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 590 may be implemented by a system such as, for example, client synchronization service 156 of FIG. 12, running on a client device.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a sequence of operations may be generated that, if executed, are configured to converge the server state and the file system state towards a synchronized state where the three tree data structures would be identical.

For example, at operation 592, the system may receive modification data for content items stored by a content management system or on a client device. The modification data may be used to update a remote tree or a local tree at operation 594.

The modification data specifies what changes occurred to one or more content items associated with a content management service. Accordingly, the modification data may be received from the content management system or from the client device (e.g., from client application 152 running on client device 150 in FIG. 1). Modification data received from the content management system may be referred to as server modification data. Server modification data specifies what changes are done to one or more content items by the content management system and may be used to update the remote tree at operation 594. Modification data received from the client device may be referred to as client modification data. Client modification data specifies what changes are done to one or more content items on the client device and may be used to update the local tree at operation 594.

At operation 596, the system may determine whether a server state for content items stored by the content management system and a file system state for the content items stored on the client device are in sync. Because the local tree and the remote tree are representative of the file system state and the server state and are continually being updated to track changes that occur at the content management system and the client device, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync and no synchronization actions are needed. Accordingly, the method may return to operation 592 and await new modification data. On the other hand, if differences are detected, the system may generate a sequence of operations configured to converge the server state and the file system state at operation 598.

The sequence of operations generated depends on the one or more differences that are detected. For example, if the difference between two trees is an added content item, the generated sequence of operations may include retrieving the added content item and adding it. If the difference between two trees is a deletion of a content item, the generated sequence of operations may include deleting the content item. The sequence of operations may also include a number of checks to ensure tree constraints are maintained. As will be described further below, the sequence of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client sequence of operations configured to operate on the content items stored on the client device to converge the server state and the file system state and this client sequence of operations may be provided to the client device for execution at operation 599.

Similarly, if there are differences between the local tree and sync tree, changes to content items stored at the client device may have occurred that may not be reflected at the content management system. Accordingly, in this scenario, the system may generate a server sequence of operations configured to operate on the content items stored by the content management system to converge the server state and the file system state and this server sequence of operations may be provided to the content management system for execution at operation 599. In some cases, both cases may be true and a client sequence of operations and a server sequence of operations may be generated and provided to their intended recipients at operation 599.

Once the sequence(s) of operations are provided to the intended recipient(s), the method may return to operation 592 and await new modification data. The sequence(s) of operations may provide one or more steps towards the convergence of the server state and the file system state or provide all steps needed to sync the server state and the file system state. For example, the content management system may receive the server sequence of operations and execute the server sequence of operations on content items stored by the content management system. This execution of the server sequence of operations causes changes to the content items stored by the content management system, which are detected and specified in server modification data, which is transmitted back to the system. The system may then update the remote tree and determine whether the server state and the file system state are in sync.

The client device may receive the client sequence of operations and execute the client sequence of operations on content items stored on the client device. This execution of the client sequence of operations causes changes to the content items stored on the client device, which are detected and specified in client modification data, which is passed to the system. The system may then update the local tree and determine whether the server state and the file system state are in sync. These operations of method 590 may continue until the server state and the file system state are in sync.

The operations of method 590 are described with respect to a client side and a server side (e.g., a local tree and a remote tree, a file system state and a server state, a client sequence of operations and a server sequence of operations, client modification data and server modification data). In various embodiments the operations associated with the two sides may occur in parallel, in sequence, in isolation of the other side, or a combination.

Rebasing

As described above with respect to FIG. 15, differences between a sync tree and a remote tree are identified and used to generate a client sequence of operations configured to converge the server state and the file system state. However, in some cases, the client sequence of operations may conflict with the current state of a local tree. Similarly, differences between the sync tree and the local tree are identified and used to generate a server sequence of operations configured to converge the server state and the file system state. However, the server sequence of operations may conflict with the current state of the remote tree. Additionally or alternatively, the client sequence of operations and the server sequence of operations may conflict with one another. Accordingly, various embodiments of the subject technology provide additional technical improvements by resolving these conflicts.

For example, the client synchronization service may identify an operation in a sequence of operations (e.g., the client sequence of operations or the server sequence of operations) that conflicts with a rule. Each rule used to identify a conflict may also be associated with a resolution for the conflict. The client synchronization service may update the sequence of operations based on the resolution for the conflict or resolve the conflict by performing operations associated with the resolutions for the conflict before providing the sequence of operations for execution.

Figure 16:
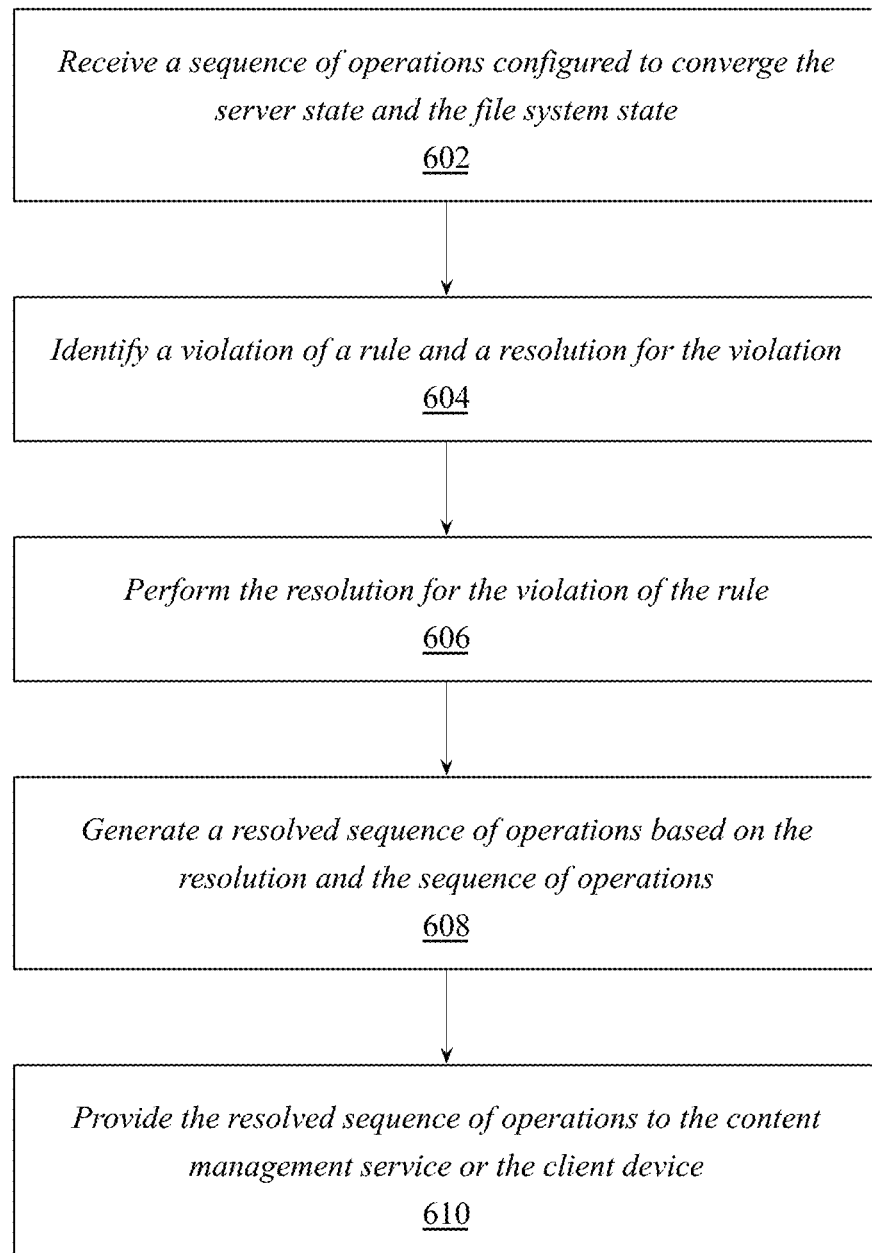
FIG. 16 shows an example method for resolving conflicts when synchronizing a server state and a file system state using tree data structures in accordance with some embodiments of the present technology.

FIG. 16 shows an example method 600 for resolving conflicts when synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156 of FIG. 12 running on a client device.

The system may receive a sequence of operations configured to converge a server state and a file system state at operation 602. The sequence of operations may be, for example, the client sequence of operations or the server sequence of operations generated and described with respect to the method 590 of FIG. 15.

At operation 604, the system identifies one or more violations in the sequence of operations based on a set of rules. The set of rules may be stored by client synchronization service 156 in FIG. 12 and specify a number of constraints, invariants, or conflicts that need to be resolved. The set of rules are applied to the tree data structures and help control synchronization behavior. Each rule in the set of rules may also be associated or otherwise linked to a resolution to a violation of that rule. For example, the resolution may include an alteration of one or more operations in the sequence of operations, a removal off one or more operations, an addition of one or more operations, one or more additional actions to the server state or the file system state, or a combination of actions.

For each operation in a sequence of operations, the system may determine whether any rule in the set of rules is violated. If a rule is violated, the system identifies a resolution of the violation and, at operation 606, performs the resolution. The resolution may include actions such as modifying one or more operations in the sequence of operations, a removing or adding one or more operations, or additional actions on the server state or the file state.

Once the resolution actions are performed, the system may generate a resolved or rebased sequence of operations based on the resolution and the sequence of operations at operation 608 and, at operation 610, provide the resolved sequence of operations to the appropriate entity for execution. For example, if the sequence of operations is a client sequence of operations, the resolved sequence of operations may be provided to the client device. If the sequence of operations is a server sequence of operations, the resolved sequence of operations may be provided to the content management service. Additionally, the method 600 of FIG. 16 may be performed on client sequence of operations and server sequence of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The sequence of operations may consist of operations each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client sequence of operations configured to operate on the client device and the resulting changes to the file system on the client device will be reflected in the local tree. Accordingly, the opposite tree for the client sequence of operations is the remote tree. Similarly, a server sequence of operations is configured to be transmitted to the content management system to be executed and the resulting changes to the server state will be reflected in the remote tree. Accordingly, the opposite tree for the server sequence of operations is the local tree.

Figure 17:
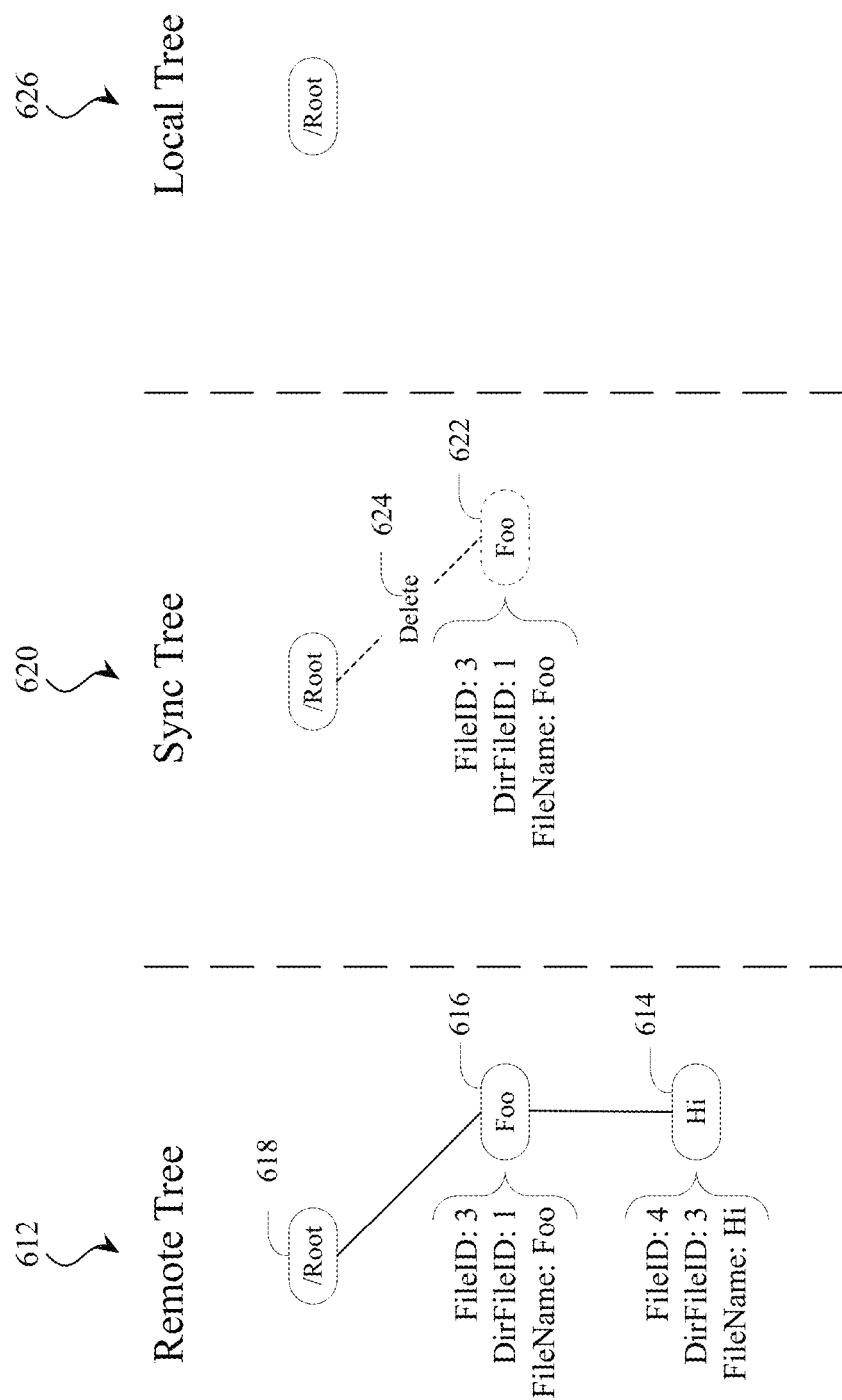
FIG. 17 shows an example of tree data structures illustrating a violation of a rule for an add operation in accordance with some embodiments of the present technology.

FIG. 17 shows an example of tree data structures illustrating a violation of a rule for an add operation, in accordance with various embodiments. The tree data structures include remote tree 612, sync tree 620, and local tree 626. When referencing the local tree 626, the remote tree 612 may be considered the opposite tree. On the other hand, when referencing the remote tree 612, the local tree 626 may be considered the opposite tree. FIG. 17 illustrates a sequence of operations adding the content item represented by node 614 in remote tree 612. For example, a client synchronization service may compare remote tree 612 with sync tree 620, identify the differences, and generate a sequence of operations that includes the addition of node 614. Node 614 is associated with a FileID of 4, a DirFileID of 3 (which references parent node 616, which is node 614's parent), and a file name of "Hi." Parent node 616 is associated with a FileID of 3, a DirFileID of 1 (which references root node 618, which is node 616's parent), and a file name of "Foo."

The client synchronization service may perform the method 600 of FIG. 16 and determine that the add operation for node 614 violates the "a directory file identifier ("DirFileID") of the content item must exist in the opposite tree data structure" rule for "add" operation types. This is illustrated in FIG. 17 by the local tree 626 not having a node with a file ID of 3, which references parent node 616 of node 614. This may occur when, for example, after differences between remote tree 612 and sync tree 620 are determined and a sequence of operations is generated, the "Foo" node corresponding to node 616 is removed from the opposite tree.

The resolution associated with this rule may include deleting the node missing from local tree 626 from sync tree 620 to synchronize sync tree 620 and local tree 626 and rediffing (e.g., finding the difference between) remote tree 612 and sync tree 620. In the scenario illustrated in FIG. 17, node 622 in sync tree 620 would be removed 624 and diffing operations would commence to identify differences between remote tree 612 and sync tree 620. This would result in the inclusion of an add operation of node 616 as well as an add operation for node 614 in the sequence of operations.

Similarly, a violation of the "file identifiers for content items must be unique in a tree" rule for "add" operation types may be resolved by operations including requesting, from the content management system, a new file ID for the node being added and using the new file ID when adding the node. A violation of the "DirFileID and file name combination for a content item are not used in the opposite tree" rule for "add" operation types may be resolved by operations including checking via the metadata associated with the two nodes whether the content items are the same. If the content items are the same, it is likely that the content item being added has already been added in other actions. If the content items are not the same, the file name for the content item being added can be renamed. For example, the file name for the content item being added can be appended with the text "(conflicted version)."

Organization Directory

As described above, FIGS. 2-3 introduce the data model of an organization directory, such as organization directory 201. In order to achieve a goal of all user accounts having access to organization directory 201, the data model includes several inventive access privileges such as traversal rights and view-name-only folders. FIG. 3 further introduces the concept of restrictive access control list 147, which rather than providing access to a folder, instead indicates that all user accounts other than those explicitly listed in restrictive access control list 147 do not have access.

As described in FIGS. 4-6, complexities introduced by the data model, and the nature of organization directory 201 wherein many user accounts have unique access rights to folders in organization directory, require a robust authorization service 132 to determine whether user accounts have access to various folders, which folders, and what level of access to the folders.

As described in FIGS. 7-17, server synchronization service 112 can be used to interface with client synchronization service 156 to synchronize content management system 110 with client device 150 and vice versa. FIGS. 7-17 address basic synchronization mechanisms, however, complexities introduced by the data model, and the nature of organization directory 201 wherein many user accounts have unique access rights to folders in organization directory 201 can lead to further synchronization challenges, and management challenges. The following description discusses these challenges and novel mechanisms for addressing these challenges.

Mount Events

One of the challenges faced by content management system 110 in hosting and synchronizing organization directory 201 is that access to folders can frequently change. However, since client synchronization service 156 does not interface directly with access control lists 145, 147, it can be difficult for client synchronization service 156 to learn about access changes.

Client synchronization service 156 interacts with server synchronization service 112, as described above, to receive messages regarding changes recorded in server file journal 148. Accordingly, the present technology provides a mechanism by which server synchronization service 112 can determine that access to a folder may have changed when server synchronization service 112 reads from server file journal 148, and can thereafter interact with authorization service 132 to determine current access permissions to the folder. Server synchronization service 156 already interacts with authorization service 132 to determine current access permissions to a folder after reading a mount revision from server file journal 148. Accordingly the present technology can take advantage of this existing mechanism by including duplicate mount revisions in server file journal 148 when certain access permissions are changed.

A duplicate mount revision is needed as opposed to generating a revision that merely informs that access permissions may have changed for a folder because some access changes can result in a user account being able to view different content items after an access change. For example, the present technology supports more than just access changes from write capabilities to read capabilities, or read capabilities to no access. The present technology can also support access changes from read capabilities to traverse or "view name only" capabilities, and such changes can require deletion of content items in addition to the change in access to a folder.

For example as seen in FIG. 18, prior to an access change, finance folder 206 is a team-shared folder that is visible to all user accounts associated with organization directory 201. Accordingly Member 1 can view finance folder 206 and its content items 223 on client device 150. However, after the access change where finance folder 206 has become a confidential folder where user accounts other than those on the finance team can only see the existence of the folder (view-name-only rights). Accordingly, after the access change, Member 1 can only see a folder representing finance folder 206 on client device 150.

The change is more than locking finance folder 206 so Member 1 cannot see the contents inside of it. Prior to the access change content items 223 were stored on client device 150, and the change in access requires that these content items be removed from client device 150. One way to accomplish this is to tell user account of Member 1 on device 150 to unmount finance folder 206, which can delete finance folder and all of its contents. Thereafter, finance folder 206 can be remounted, and authorization service 132 can inform server synchronization service 112 to mount finance folder 206 for Member 1 with read-name-only access. Synchronization service 112 can then inform client device 105, having access to the user account for Member 1, that an empty folder—finance 206—has been mounted. Client device 105 does not learn of the existence of content items 223 since these content items are not sent to client device 150 and client device 105 does not store them.

For access changes that do not affect the content items stored on a client device, such as a change from a read permission to a write permission, a duplicate mount entry in server file journal 148 is not necessary. Only the change in access needs to be added to the Auth token in the cursor and synced down to client device 105.

Figure 19:
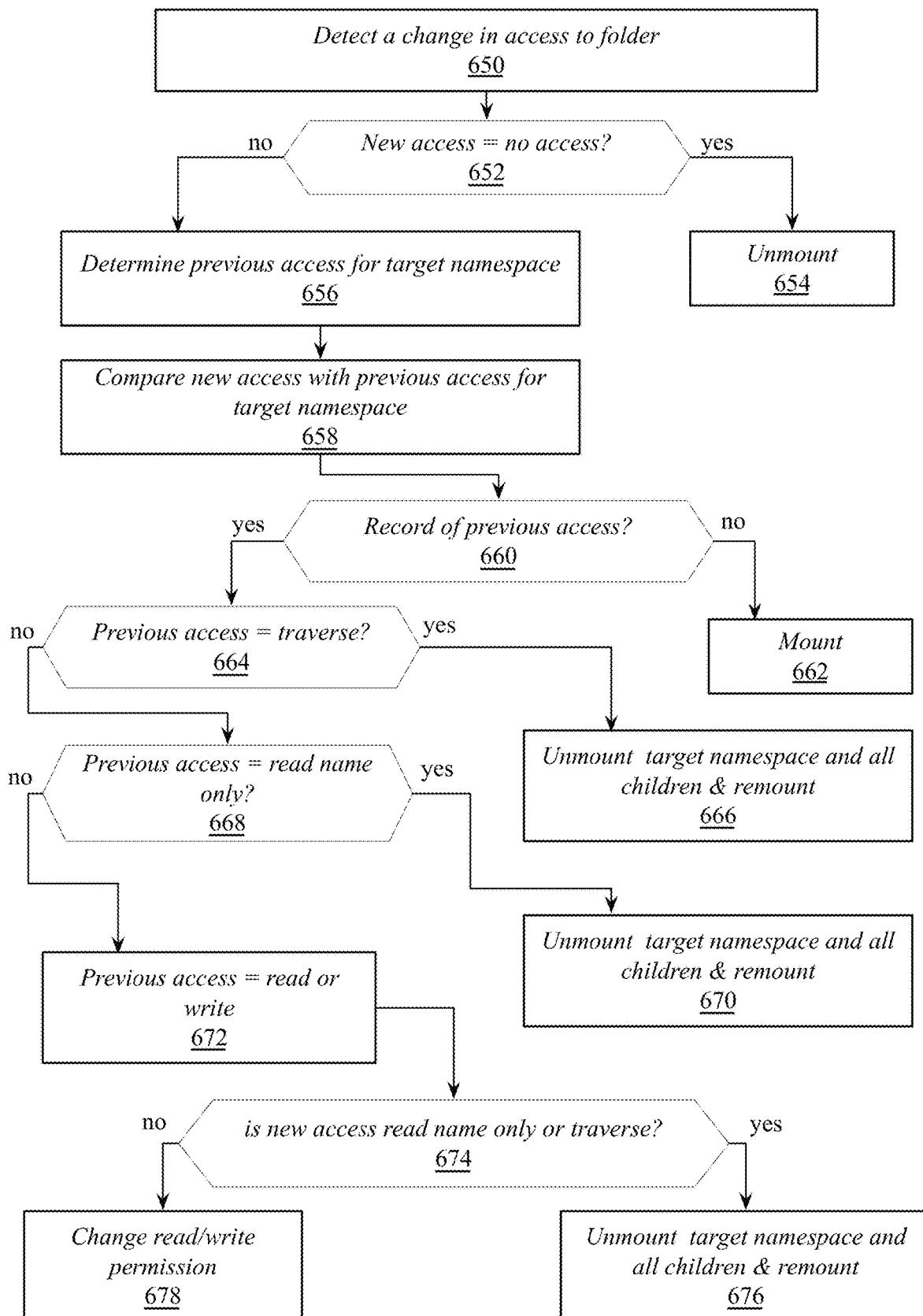
FIG. 19 shows an example method of determining whether traverse rights or read-name-only rights should be granted to a user account for folders in accordance with some embodiments of the present technology.

FIG. 19 illustrates an example method for determining when a duplicate mount should be written to server file journal 148. FIG. 20 illustrates an example access matrix 680 showing a previous access state in the left column and a new access state in the top row, and the necessary mount actions needed to transition from the previous access state to the new access state.

The method illustrated in FIG. 19 begins when content management system 110 detects (650) a change in access for any user account to a folder. Content management system 110 determines (652) if the access state is a "no access" state, and if the new access state is "no access" then an unmount revision 654 is written into server file journal 148 for that folder.

If the access change resulted in some access state other than "no access," then content management system 110 determines (656) the previous access state for the namespace including the folder (the target namespace) for which the access state has changed, and can compare (658) new access state for the folder with previous access state.

If there is no record (660) of previous access for the target namespace, this means that the folder needs to be mounted, and a mount revision (662) is written to server file journal 148.

If there is a record (660) of previous access for the target namespace, and the previous access was a traverse access (664) than a duplicate mount (666) consisting of an unmount revision followed by a mount revision is written to server file journal 148 for the target namespace.

As noted above unmounting the target namespace will cause client device 150 to delete the target namespace and all content items within the target namespace, and the subsequent mount of the target namespace will cause client device 150 to receive only the content items to which the user account of client device 150 has access.

If previous access to the target namespace was not traverse access, then content management system 110 can determine if the previous access to the target namespace was read-name-only access (668). If the previous access to the target namespace was read-name-only access than a duplicate mount (670) consisting of an unmount revision followed by a mount revision is written to server file journal 148 for the target namespace.

If previous access to the target namespace was not a traverse access or read-name-only access, then previous access was a read or write access (672), and content management system 110 can determine (674) whether the new access is a partial access such as read-name-only access or traverse access. If the new access is read-name-only access or traverse access than a duplicate mount (676) consisting of an unmount revision followed by a mount revision is written to server file journal 148 for the target namespace. If the new access is not read-name-only access or traverse access than access change is from read to write access, or write to read access, which only requires a change of the read/write permission in the cursor for that namespace and sending the new cursor to the client to update the permissions. Note that a mount or duplicate mount is not required in this instance because the content items stored on client device 150 are not changing due to the access change.

Inheritance Propagation/Traversal Path Determination

Some access changes will affect folders above or below the folder receiving the access change in the file path. For folders that are subordinate to the access change, this is not a problem as access permissions will be inherited down the path unless another namespace exists subordinate in the path. Since namespaces never inherit access permissions and they have their own access permissions, changes to access permission higher in path shouldn't affect the namespace. Thus when access changes to a folder in a path, subordinate content items will end up with the proper access permissions using the method discussed above with respect to FIG. 19.

However, when access changes for a folder in a path, this can have consequences for folders higher in the path. FIGS.

Figure 21A:
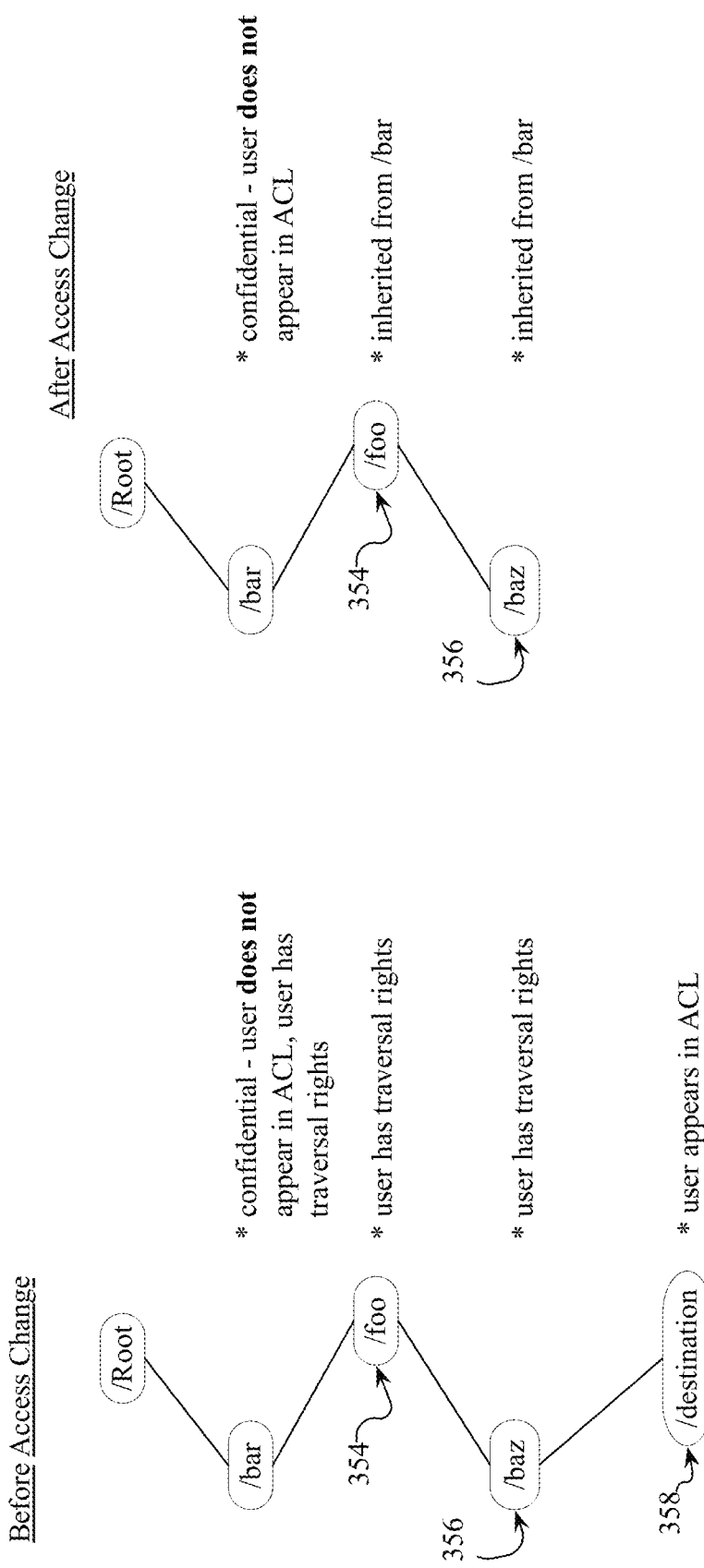
FIG. 21A shows a directory before and after an access change in accordance with some embodiments of the present technology.

21A and 21B illustrates an example of a need to propagate access changes up a path. FIG. 21A illustrates a path: "/root/bar/foo/baz/destination" before and after an access change. As explained with respect to FIG. 5, the user has explicit permissions to access "/destination" 358, but does not have explicit access to confidential folder "/bar", and instead has traversal rights to "/bar", "/foo" 354, and "/baz" 356.

As illustrated in FIG. 21A, the access change removed folder 358 "/destination"—e.g., this folder was deleted or unmounted. Merely deleting folder 358 would still leave the user with traversal rights to folders 354 and 356, but this is not desired since the user account's access to folder 358 was the basis for the traversal rights to folders 354 and 356. Therefore, whenever access to a folder is changed in a path where at least one folder higher in the path has traversal rights, access rights for each folder needs to be determined and changed accordingly as addressed with respect to FIG. 22.

Figure 21B:
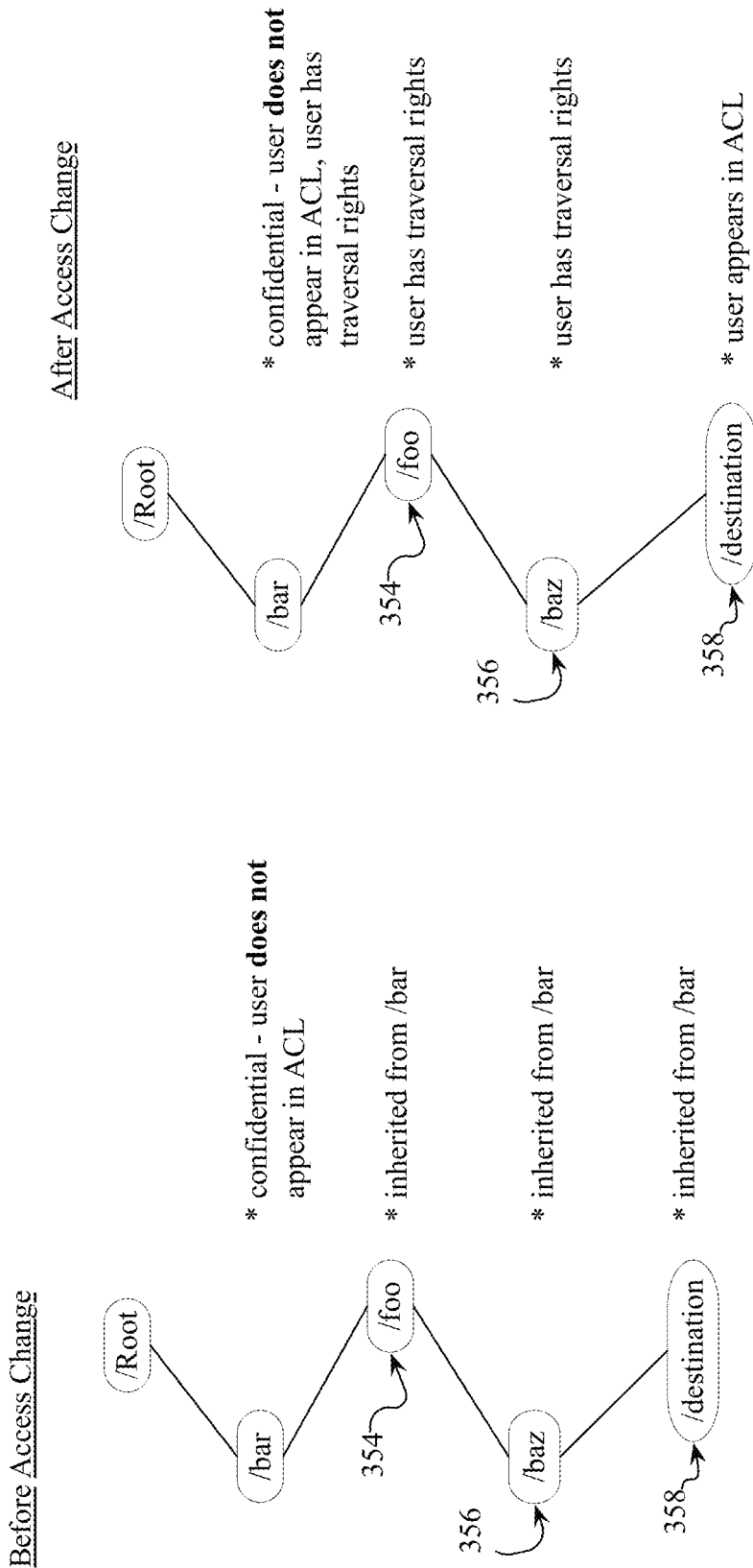
FIG. 21B shows a directory before and after an access change in accordance with some embodiments of the present technology.

FIG. 21B illustrates the opposite action from that illustrated in FIG. 21A. FIG. 21B illustrates a path: "/root/bar/foo/baz/destination" before and after an access change. In FIG. 21B a user account does not have access to "Thar", "/foo" 354, "/baz" 356 and "/destination" 358 prior to the access change since "/bar" is a confidential folder to which the user does not have access, and "/foo" 354, "/baz" 356, and "/destination" 358 all inherit access privileges from "Thar". After the access change the user appears in the restrictive access control list for "/destination" 358, which requires that the user account have at least traversal rights to "/bar", "/foo" 354, and "/baz" 356.

As illustrated in FIG. 21B, the access changed to folder "/destination" 358—e.g., this folder was added or mounted. Attempting to mount folder 358 results in an error when a client device attempts to synchronize, because client device 150 would receive an instruction to mount "/destination" 358 in a folder to which it is unaware. Therefore, whenever access to a folder is changed in a path where at least one folder higher in the path is a confidential folder, access rights for each folder higher in the path need to be determined and changed accordingly as addressed with respect to FIG. 22.

Figure 22:
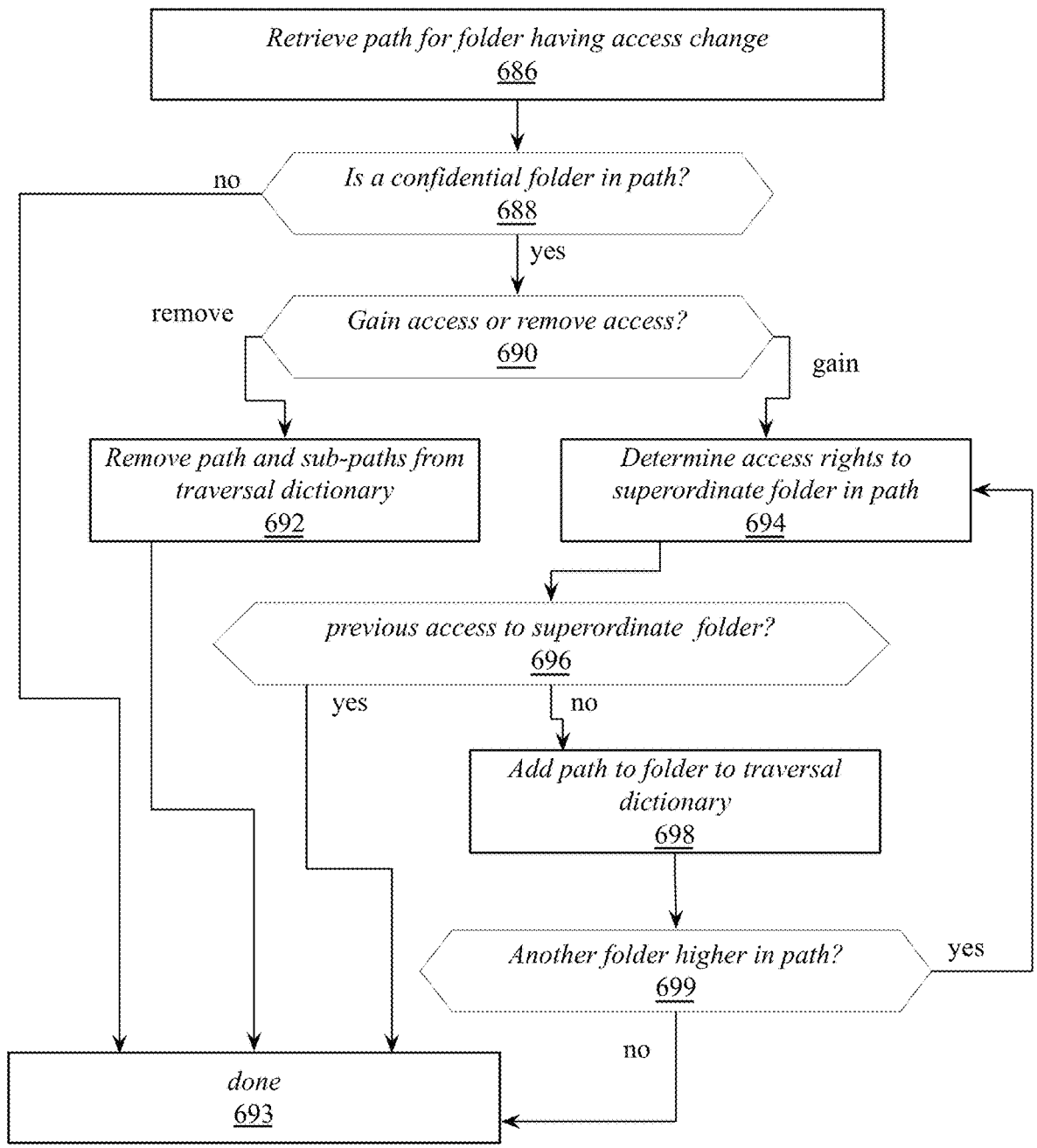
FIG. 22 shows an example method for propagating access changes in a directory tree in accordance with some embodiments of the present technology.

In some embodiments in association with writing an unmount or mount revision for a folder to server file journal 148, content management system 110 can determine if access rights to other folders in the path of the folder receiving the unmount or mount revision need to be revised to account for changes in traversal rights to folders in the path. FIG. 22 illustrates an example process for determining whether a traversal dictionary needs to be updated to reflect updated traversal rights for any folders in a path containing a folder having an access change. In some embodiments, a traversal dictionary can be a database stored in metadata database 146 listing all traversal paths for a user account. In some embodiments, a traversal dictionary can be metadata stored in metadata database 146 that is associated with each folder and list a next subordinate folder for which a user account has traversal rights and identifying the folder at the end of the path which provides the need for the traversal right. For example in FIG. 21B "/bar" would include "{/foo: [/destination]}", and "{/baz: [/destination]}" in its traversal dictionary, where "/foo", "/baz" are the folders for which the user account has traversal rights, and "[/destination]" provides the need for the traversal right. Each folder in the path can be associated with a similar metadata.

The example process begins by retrieving (686) the path for the folder having an access change from mount table 380 (e.g. "/root/bar/foo/baz/destination" in FIGS. 21A and 21B).

Content management system 110 can determine (688) whether any folders in the path are confidential folders (e.g. "/bar" in FIGS. 21A and 21B). If no folders in the path are confidential folders the process is complete (693).

If a folder in the path is a confidential folder then the process can determine (690) for a specific user account whether that user account has gained access or lost access. If the specific user account has lost access to the folder having an access change (e.g., folder "/destination" 358 in FIG. 21A), then content management system 110 can remove from the traversal dictionaries (692) any folders in the path for which the traversal right comes from "[/destination]" (e.g., "/bar", "Koo", "/baz"). If the specific user account has gained access to the folder receiving an access change (e.g., folder "/destination" 358 in FIG. 21B) then content management system 110 can determine (694) the specific user account's access rights to the next superordinate folder (e.g., folder "/baz" 356 in FIG. 21B) in the path by determining (696) whether the specific user account previously had access to the superordinate folder (e.g., folder "/baz" 356 in FIG. 21B).

If content management system 110 determines (696) that the specific user account did not previously have access to the superordinate folder (e.g., folder "/baz" 356 in FIG. 21B) then the path to the superordinate folder (e.g., "/root/bar/foo/baz/") can be added (698) to the traversal dictionary for that folder for the specific user account. If there is a next superordinate folder (e.g., folder "/foo" 354 in FIG. 21B) (699) then actions 694, 696, 698 can be repeated. If there is not a next superordinate folder (699) then the process is complete (693). In some embodiments the traversal dictionary updating process (actions 694, 696, 698) can also be complete (693) when a traversal dictionary for any folder in the path does not need to be changed in response to the new access rights gained (690).

Also, if content management system 110 determines (696) that the specific user account previously had access to the superordinate folder (e.g., when the process determines previous access rights to "/root" if FIG. 21B) then the process is complete (693) since the user account already has access, access does not need to be further granted.

File System Warnings

One of the challenges of synchronizing content management system 110 with client device 150 which has its own file system, is that content management system 110 may support more advanced and more complex behaviors than those available on client device 150. This creates opportunities for a user to perform actions that may seem routine on client device 150, but that are not allowed by content management system 110, or that will result in undesirable outcomes in content management system 110. For example, if a user operating client device 150 deletes content from a team-shared folder using client device 150 the user may be intending to only remove the content from their client device, however the deletion would be synchronized to content management system 110 and result in deleting the content item for all users with rights to the team-shared folder. In another example, the user operating client device 150 may attempt to delete a team-shared folder on their client device, but only an administrator working in an appropriate management interface can delete a team-shared folder, and therefore this operation is not allowed. Another challenge is that some client devices perform the same action differently depending on the operating system they run, but content management system 110 desires to perform actions consistently. For example, if a user tries to move a read-only folder, some operating systems may make a copy of the folder and place the copy in the destination, while other file systems do not allow a read-only folder to be moved.

The present technology provides file system warnings engine 707 that can deal with actions performed by a user that may result in an undesirable outcome or an action that is not allowed. File system warnings engine 707 can provide informational messages to a user after performing certain actions and alert the user that the action is either not allowed or confirm that the user intends the potentially undesirable consequences of the action.

Figure 23:
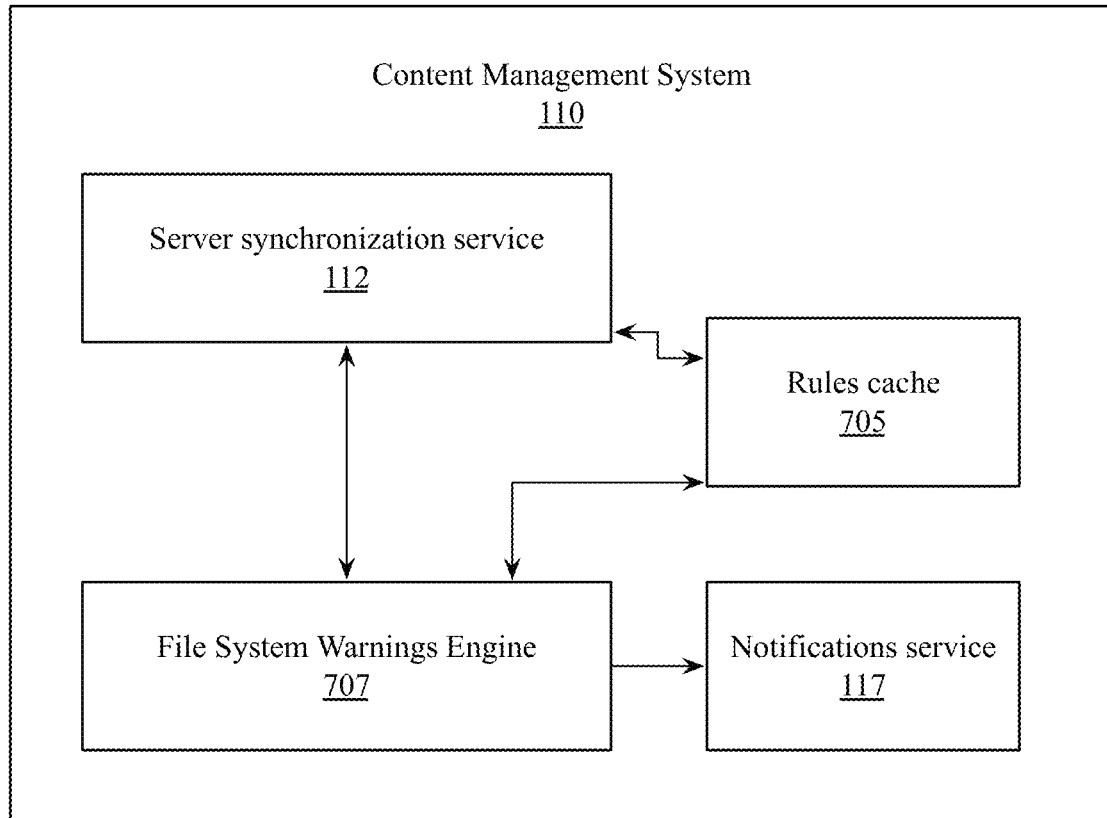
FIG. 23 shows an example file system warnings system in accordance with some embodiments of the present technology.

FIG. 23 illustrates a system diagram showing components of content management system 110 that interact to provide file system warnings to client devices 150. Content management system 110 includes server synchronization service 112, which is described throughout this description and interacts with client synchronization service 156 to synchronize content item events taking place on client device 150 with content management system 110, and vice versa. Server synchronization service 112 can write certain data applying to an event coming from client synchronization service 156 to rules cache 705 and can notify file system warnings engine 707 of the event. File system warnings engine 707 can examine the data supplied by server synchronization service 112 in rules cache 705 to determine whether a warning is appropriate or not. When server synchronization service 112 determines that a warning should be sent, server synchronization service 112 can interact with notification service 117 to send a file system warnings to client device 150.

FSW Rule Engine

File system warnings engine 707 can detect many different actions that can have undesired consequences or actions that are not allowed and for which it would be desirable to warn or inform the user of the consequences. Each of these actions can have a warning tailored to the specific action. In some embodiments, the warnings can even be specific to the method of access utilized by the client device (e.g., access via sync engine, access via mobile application, access via web browser, access via third-party application, access through administrator content manager tool, etc.). As such there can be many different warnings, and each are tailored to specific warning criteria.

The number of warnings and associated permutations of possible criteria create several challenges. First, having so many rules can create performance challenges. In order to provide an acceptable user experience the warnings need to appear shortly after the offending action has occurred. Additionally, making multiple queries to server synchronization service 112 to identify criteria to determine whether a file system warning has been triggered can also impact synchronization performance. Furthermore, file system warnings engine 707 can become complex if rules are nested within each other to minimize calls to server synchronization service 112. Nested rules make updating or changing rules or adding rules more challenging.

The present invention addresses each of these challenges by initially having server synchronization service 112 provide some foundational information and write it to rules cache 705. Thereafter, file system warnings engine 707 can refer to rule cache for information already provided, or request new information as needed from server synchronization service 112. Importantly, each item of information only needs to be obtained once and stored in rules cache 705. Since each item of information only needs to be obtained once, each rule can be written in a modular fashion, and need not be dependent on any other rules. Each rule can be evaluated separately by evaluating information stored in rules cache 705.

Figure 24:
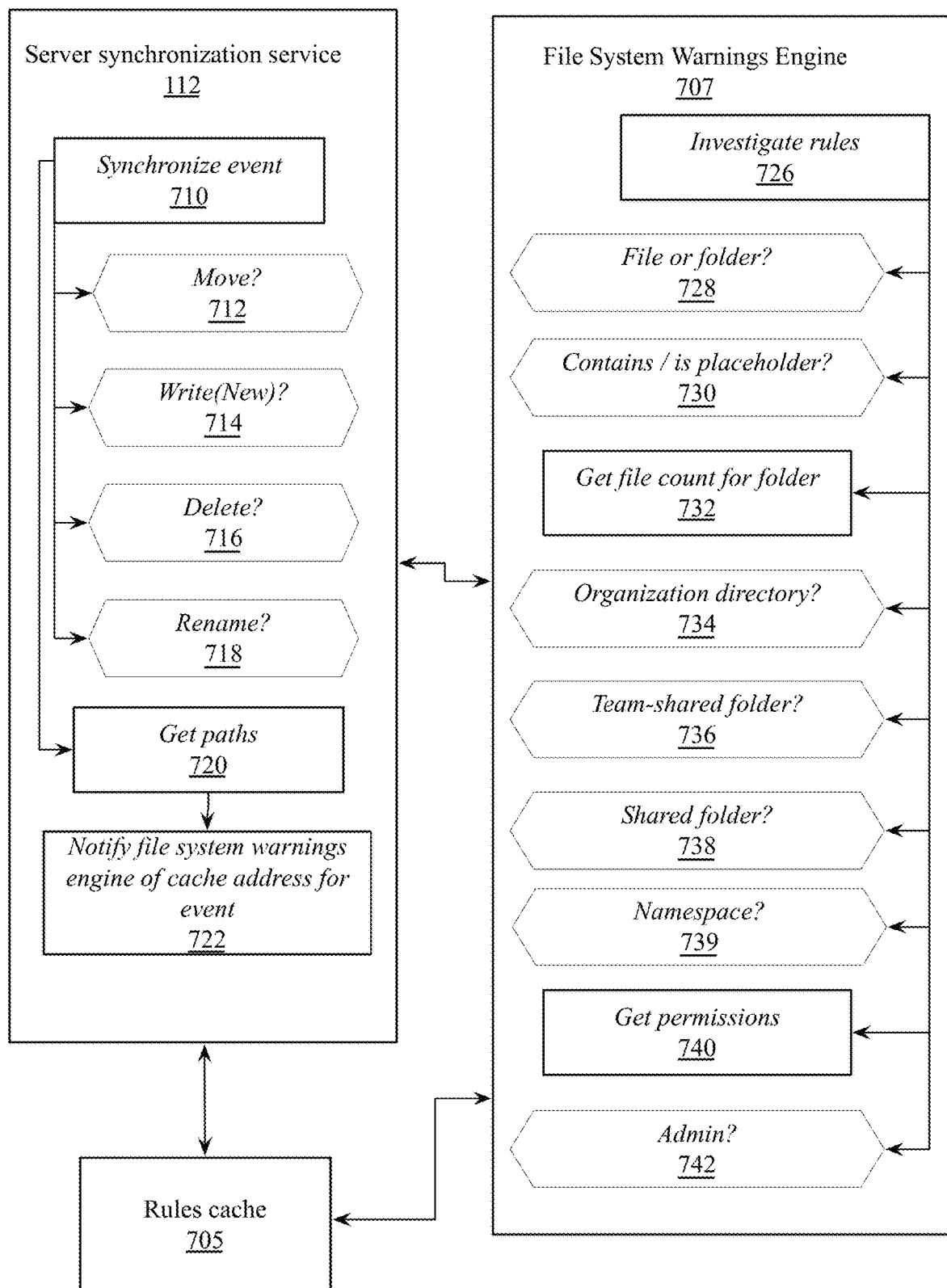
FIG. 24 shows an example method for determining whether to send a file system warning and for determining which warning to send in accordance with some embodiments of the present technology.

FIG. 24 illustrates example actions and queries performed by server synchronization service 112 and file system warnings engine 707. When server synchronization service 112 receives a synchronization event, it can synchronize (710) the event as described herein. In addition to handling synchronization activities with respect to the event, server synchronization service 112 can determine basic information describing the event such as if the event involves a move event (712), a write event (714) of a new content item, a deletion (716), or a rename event (718), and can record the determined event along with any paths (720) relevant (origin path and destination path, as applicable) to the determined event to rules cache 705. Server synchronization service 112 can then notify file system warnings engine 707 of an address at rules cache 705 where the basic information pertinent to the event has been recorded.

After learning of the event from server synchronization service 112, file system warnings engine 707 can begin to investigate (726) individual warning rules. For each rule, file system warnings engine 707 can look up information pertinent to the event that has been recorded at the given address in rules cache 705 to determine if the individual warning rule applies.

As part of investigating (726) an individual warning rule, file system warnings engine 707 may determine that additional criteria that is not stored in rules cache 705 is needed and can request this information from server synchronization service 112. For example file system warnings engine 707 can request to learn criteria such as whether the event pertains to a content item that is file or folder (728), whether the content item is a placeholder content item or is a folder that contains a placeholder content item (730), how many content items a folder contains (732), whether a folder is in a top level of an organization directory (734), whether the folder is a team-shared folder (736), whether a folder is a root of a namespace (739), whether a folder is a shared folder (738), what permissions are associated with a folder (740), and whether the user causing the event is logged-in as an administrator (742). Note that the queries and actions to determine the criteria listed in FIG. 24 may not be listed in any particular order, and there may be more or less queries and actions that those shown.

In some embodiments, only a partial set of the example queries and actions need to be performed before an applicable rule is determined. For example, many of the queries only pertain when the content item is a folder. As such when it is determined that the content item is a file it is not necessary to perform additional queries.

In some embodiments, the individual rules can be investigated in series. In such embodiments file system warnings engine 707 need only perform relevant queries and actions to determine whether the specific rule applies. Criteria derived from to the relevant queries and actions are recorded in rules cache 705 at the address pertinent to the event. When a subsequent rule is analyzed, file system warnings engine 707 can first determine whether relevant queries and actions have already been answered and recorded in rules cache 705, thereby eliminating the need to request such information from server synchronization service 112.

FIG. 25 illustrates a table including descriptions of some example file system warnings. The table illustrated in FIG. 25 does not represent a complete listing of all file system warnings, rather the file system warnings listed are merely representative of some file system warnings.

The warnings presented in FIG. 25 reflect events recorded on client device 150 wherein the user has performed an action using the native file system of client device 150. Since the native file system of client device 150 is unaware of many rules pertaining folders and content items at content management system 110, client device 150 will often allow the actions to take place. However when client device 150 attempts to synchronize with content management system 110, synchronization service 112 rejects the changes from client device 150 and informs client synchronization service 156 to undo the action. Accordingly corrective solutions for actions taking place through the native file system of client device 150 sometimes require undoing the user action.

Example warning 750 pertains to an attempt by a user to delete their user account folder. However, only the administrator using the administrator console may delete a user account folder. Accordingly warning 750 will alert the user that they are not allowed to delete their user account folder and they will receive a notification that deletion will be undone.

Warning 752 pertains to an attempt by a user to move a confidential folder to a non-confidential folder. Such an action is not allowed because this action would potentially allow information that is intended to be confidential to become public. Warning 752 can be accompanied by an option to undo the move or invite the user to change access to the confidential folder.

Figure 26A:
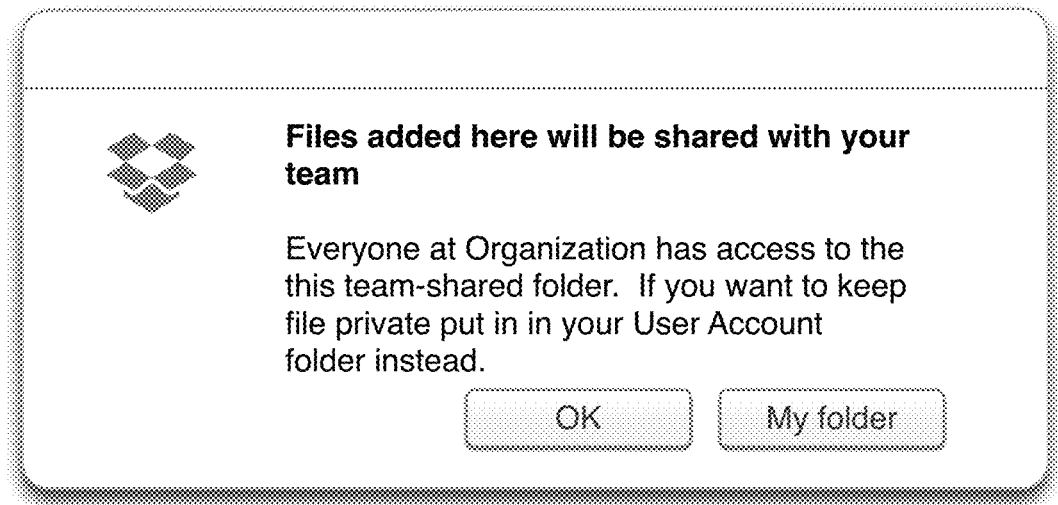
FIG. 26A, FIG. 26B, and FIG. 26C show an example file system warning in accordance with some embodiments of the present technology.
Figure 26B:
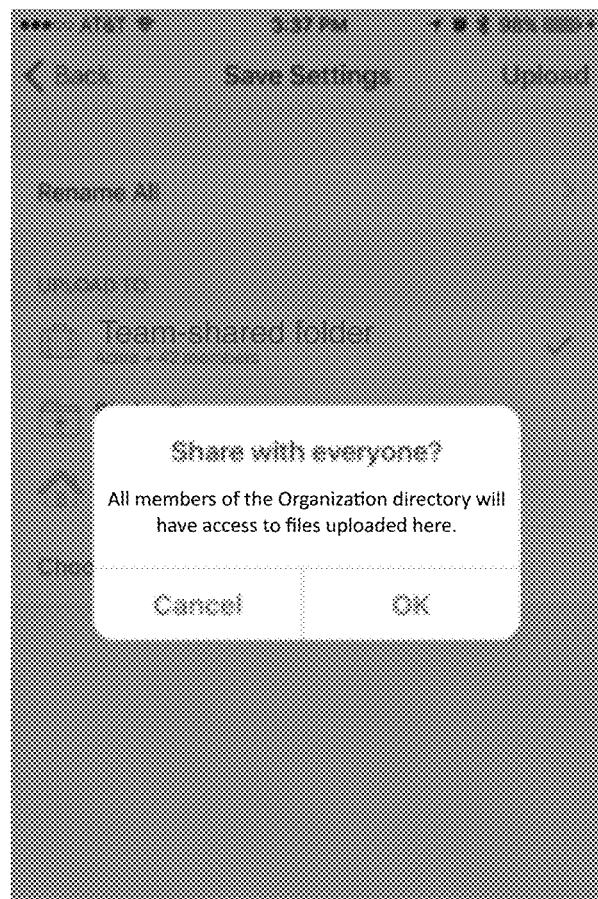

Warning 754 pertains to an attempt by a user to add new content to a team-shared folder. This warning is merely an informational warning to alert the user that the new content item will be shared with everyone associated with the team-shared folder. FIG. 26A illustrates an example of warning 754 presented on local file system of client device 150, and FIG. 26B illustrates an example of the version of warning 754 for client device 150 accessing content management system 110 using a mobile application.

The example warning illustrated in FIG. 26A warns the user that a content item saved to the team-shared folder will be accessible to everyone at the organization, and gives the user the option to proceed with saving the content item to the team-shared folder or to save the content item to the user account's folder. The example warning illustrated in FIG. 26B is similar to the warning in FIG. 26A except that in the mobile application the user is only given the option to continue with saving the content item to the team-shared folder or to cancel the action.

Warning 756 pertains to an attempt by a user account that has administrator privileges, but the administrator is not using an administrator console. The administrator has attempted to delete a folder from the organization directory using the file system of client device 105 but an administrator can only delete a folder from the organization directory when they are using the administrator console. Warning 756 gives the administrator the option to undo the action or to launch the administrator console. As will be addressed below, many administrator actions are only permitted through the administrator console to ensure that the administrator does not take inadvertent actions.

Warning 758 pertains to an attempt by a user to delete an on-demand content item. On demand content items appear as content items on client device 150 but are actually placeholder content items that when selected, are downloaded from content management system. When a user attempts to delete an on-demand content item it is often for the reason that the user is trying to clean up storage on client device 150. However since the content item is an on-demand content item and does not take up space in storage on client device 150, deleting the on-demand content item will not have the desired effect. Additionally, deleting an on-demand content item will often have undesired effect of removing the content item from the users account. Warning 758 informs the user that the content item is an on-demand content item and that the deleting the content item removes the item from the user's account and gives the user an option to continue with the deletion or cancel.

Warning 760 pertains to when a user account attempts to delete 100 or more content items. This warning is triggered by what is usually believed to be an inadvertent deletion, and warns the user that the content items are to be deleted and gives the user the option to continue with the deletion, cancellation, or make the content items on-demand content items to save space on storage of client device 150.

Warning 762 pertains to when a user account attempts to unmount a shared folder. Warning 762 warns the user that un-mounting of the shared folder will delete the folder from the user's account but that it will remain accessible to everyone else to which the folder has been shared, and gives the option to continue, to cancel the unmount, or to learn more about the behaviors of shared folders.

As may be apparent from FIG. 25, some warnings operate to alert the user that a particular action is not permitted, e.g. warnings 750, 752, etc., while some warnings are conformational warnings that operate to inform the user of potential undesirable consequences, and give the option to continue (confirm the action) or to cancel, and sometimes to receive more information on the topic. In some embodiments, the user may be given an option to request to not see warnings pertaining to a specific type of action again. In some embodiments, option may only apply to conformational warnings and not alerts regarding disallowed actions.

File system warnings engine 707 also includes warnings pertinent to actions taking place on client device 150 when it is operated in other contexts (e.g., using mobile application, using web interface, etc.). When actions take place in other contexts then the local file system of client device 150 the solutions provided with warnings may not require actions to be undone but instead can notify a user that the action failed. Failing actions is possible in these contexts because these contexts are specific in function to use with content management system 110.

Figure 26C:
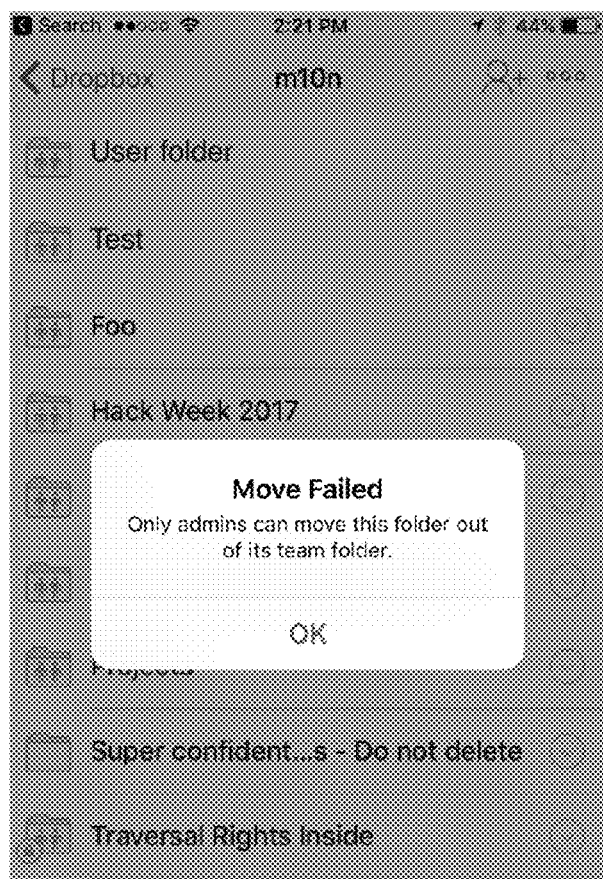

For example, FIG. 26C illustrates an example warning in a mobile application where a user has attempted to move a folder from a team-shared folder, and the user is informed that the move has failed. This warning is similar to warning 764 in FIG. 25, but warning 764 is specific to an action taking place on the file system of client device 150. In warning 764 the user is given additional options such as to undo the move or to launch an interface to change access options to team-shared folder (assuming the user has such privileges).

Batching of Warnings

Figure 27:
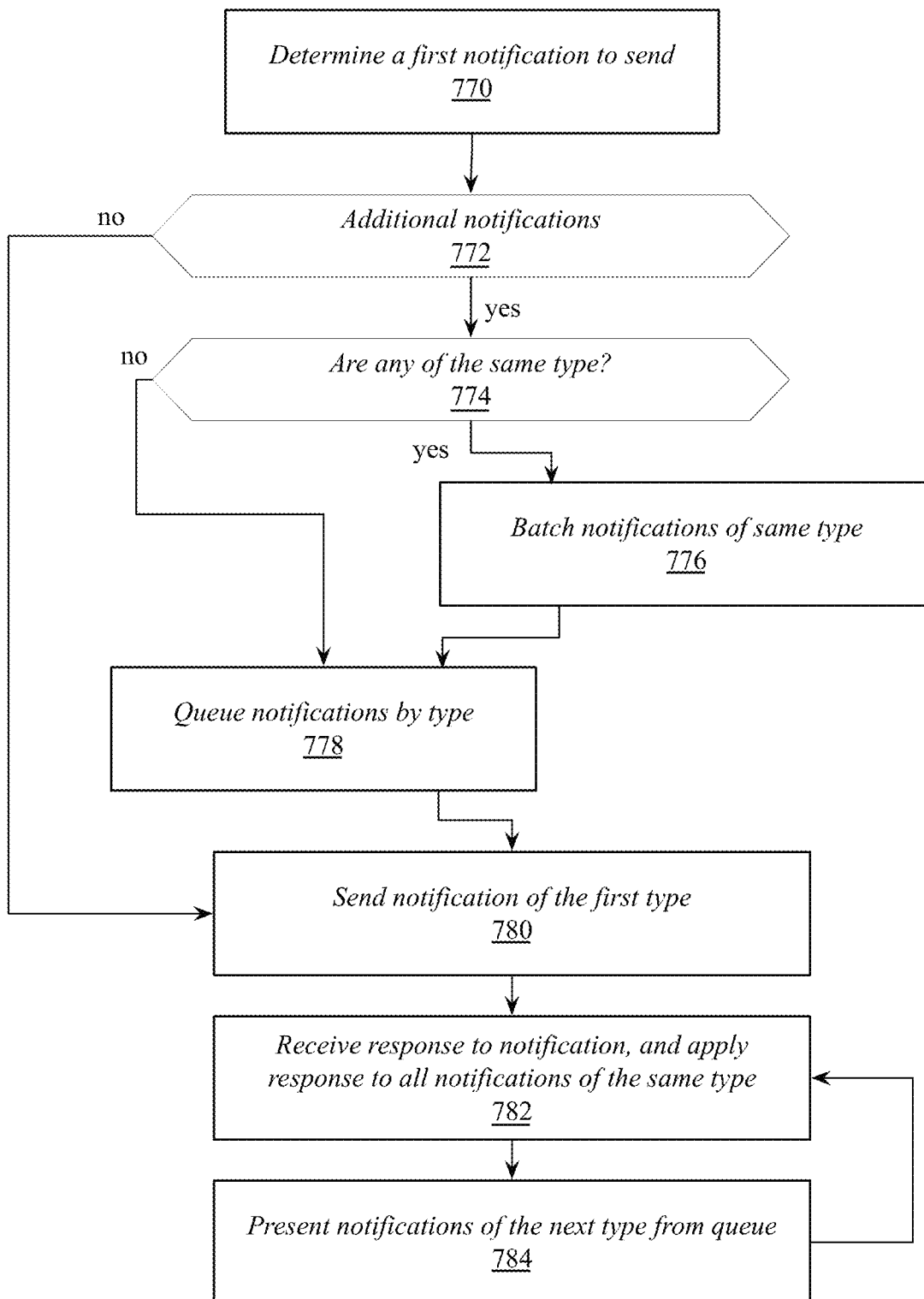
FIG. 27 shows an example method of batching file system warnings in accordance with some embodiments of the present technology.
Figure 28:
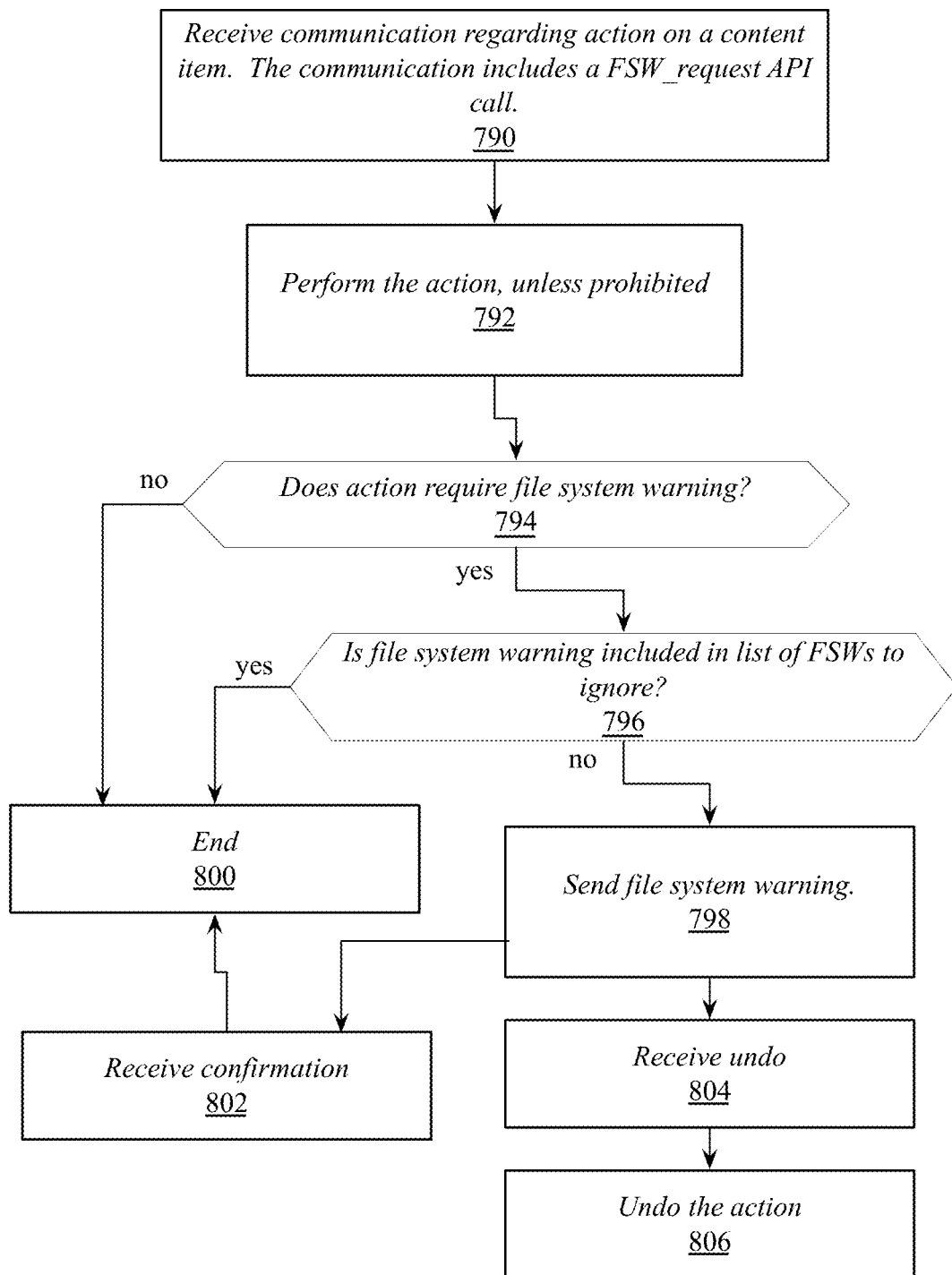
FIG. 28 shows an example method for receiving and responding to a file system warnings application programming interface (API) call in accordance with some embodiments of the present technology.

In some embodiments a single user action may trigger a plurality of file system warnings. For example, if the user attempted to move multiple folders, or multiple content items, each individual move may trigger a file system warning. In another example, a user may be working off-line for a period of time making many changes and upon reconnecting to content management system 110, the user may trigger a plurality of file system warnings. Sending the user a flood of file system warnings would not provide a good user experience. Accordingly, the present technology provides for a mechanism of batching file system warnings as illustrated in FIG. 27.

File system warnings engine 707 can determine (770) a first notification to send to a user operating client device 150 and inform notifications service 117 of the first notification. Instead of immediately dispatching the first notification to client device 150, notification service 117 may briefly delay dispatching a first notification to determine (772) if there are additional notifications. In some embodiments the delay can be up to one second. If an additional notification arrives within the delay, a further delay of up to one second can occur.

If there are no additional notifications then the first notification can be dispatched (780) to client device 150. If additional notifications (772) arrive, notification service 117 can determine (774) if any of the additional notifications are of the same type as the first notification.

If any of the additional notifications are of the same type (774), notification service 117 can batch (776) notifications of the same type, and then queue (778) notifications by their type. Thereafter, notification service 117 can send (780) a single notification of the first type to client device 150, and wait to receive (782) a response to the notification, and apply (782) the response to all notifications of the same type. For example, if the first type of notification pertained to moving content items into a team-shared folder, and the user responded to allow the content to be added into the team-shared folder and be accessible to the entire team, the response (782) can be applied to all notifications of that type. Thus, an assumption is made that the user had the same intent for all of the content items to which subsequent batched notifications of that type pertain since all of the actions likely occurred in a relatively short period of time.

In some embodiments, the content items to which the batched notifications pertain can all be merged into a single notification rather than having the first notification that pertains to an individual content item be representative of the whole group.

After applying (782) the response to all notifications of the same type, notification service 117 can dispatch (784) a notification of the next type from the queue, and upon receiving a response (782) can apply the response to all notifications of that type. These actions can be repeated by notification service 117 until all queued notifications have been sent.

API being Aware of FSW

In some embodiments, a file system warnings application programming interface (API) can be provided to third-party developers for inclusion in applications that interface with content management system 110. The file system warnings API can be especially useful in situations in which a user performs an action using a third-party platform that is allowed by content management system 110, but may have unintended consequences, and a conformational warning would be helpful. However, if the file system warnings API were designed to require a response to a conformational warning prior to an action taking place, the performance of the third-party platform may be unacceptable. Another challenge is that third-party platforms may not support file system warnings, and such confirmatory responses cannot be a prerequisite to performing an action.

The present technology addresses these challenges. When a user interacts with a third-party platform to perform an action in content management system 110, the third party platform can send a communication, and content management system 110 can receive (790) the communication that specifies the action(s) to be performed on a specific content item(s), and the communication can optionally include a file system warning API call.

Whether or not the received (790) communication includes the file system warning API call, content management system 110 can still perform (792) the action, unless the action is prohibited. (If the action is prohibited, and third-party platform did not include a file system warnings API call, content management system can return an error.)

After performing (792) the action, or prohibiting the action, file system warnings engine 707 can determine (794) if the action requires a file system warning. If not, the process can end (800).

If it is determined (794) that the action requires a file system warning, file system warnings engine 707 can determine (796) if the file system warning is included in the list of file system warnings to ignore. As addressed above, in some embodiments, a user may indicate that some file system warnings do not need to be shown again in the future. In such embodiments, the third party platform can include codes that identify specific types of file system warnings that either the user or the third-party developer has determined do not need to be presented.

Assuming the file system warning was not included (796) in a list of file system warnings to ignore, file system warnings engine 707 can send (798) the appropriate file system warning.

If the file system warning requires confirmation and file system warnings engine 707 receives (802) confirmation of the action, the process can end. However if file system warnings engine 707 receives (804) an undo instruction then file system warning engine 707 can take steps to undo (806) the action. Should no response be received, the action will remain completed.

Placing Shared Content within the Organization Directory

Providing an organization directory where some folders are accessible to all user accounts, but some folders are confidential can create some challenges with respect to maintaining confidential content items as confidential while also allowing user accounts a comfortable environment that operates as they expect when they take actions within the organization directory. This is especially true in the organization directory described herein that supports nested namespaces, restrictive access control lists, traversal access rights, and view-name-only access rights in addition to other more traditional access rights.

Figure 29:
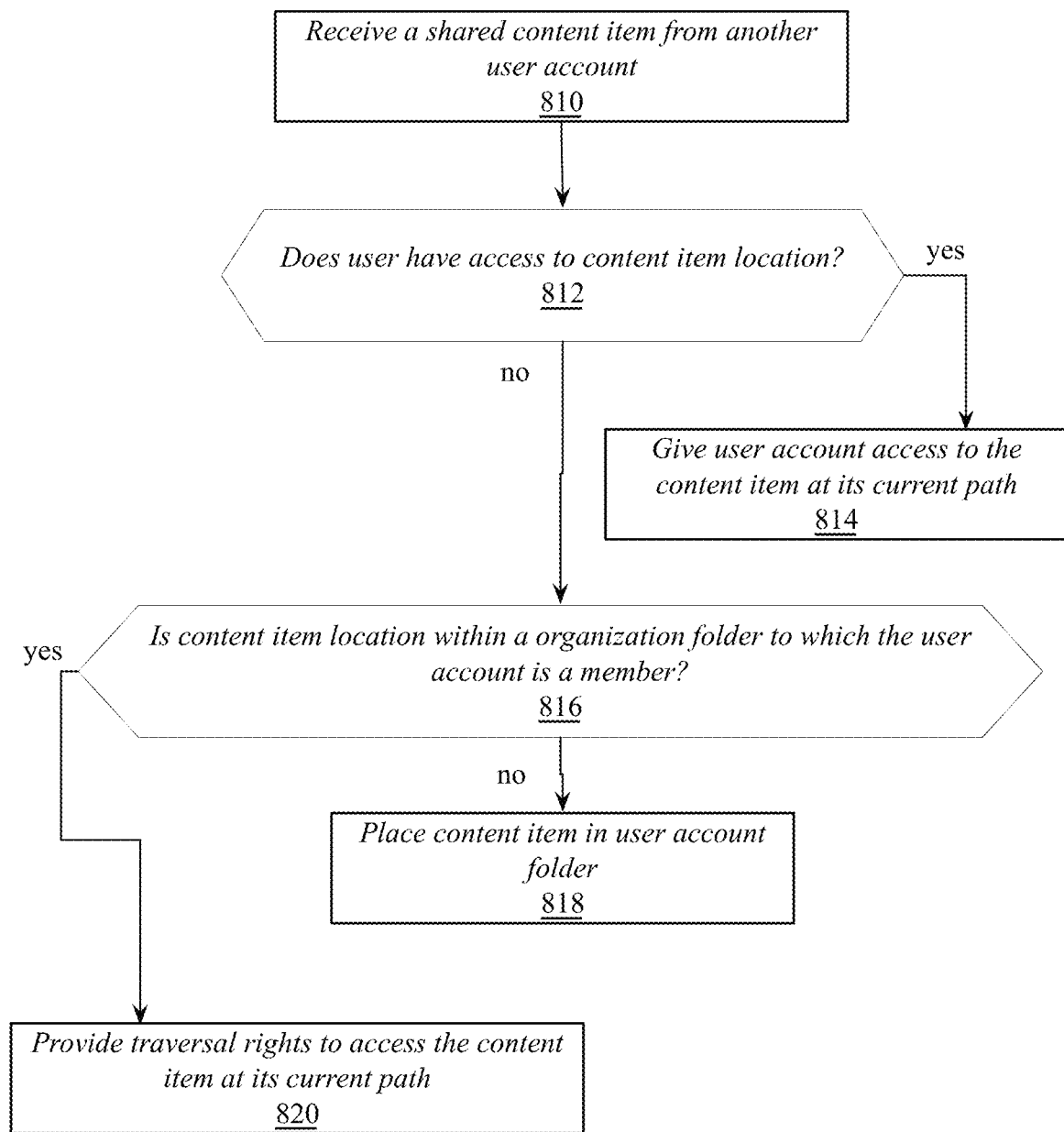
FIG. 29 shows an example method for determining where to place a file shared with a user account in an organization in accordance with some embodiments of the present technology.

One challenge that can arise is in determining where a shared content item should be located within a first user account's directory. FIG. 29 illustrates an example process by which content management system 110 can determine where a content item shared by a second user account should be placed within the directory of a first user account.

Figure 30A:
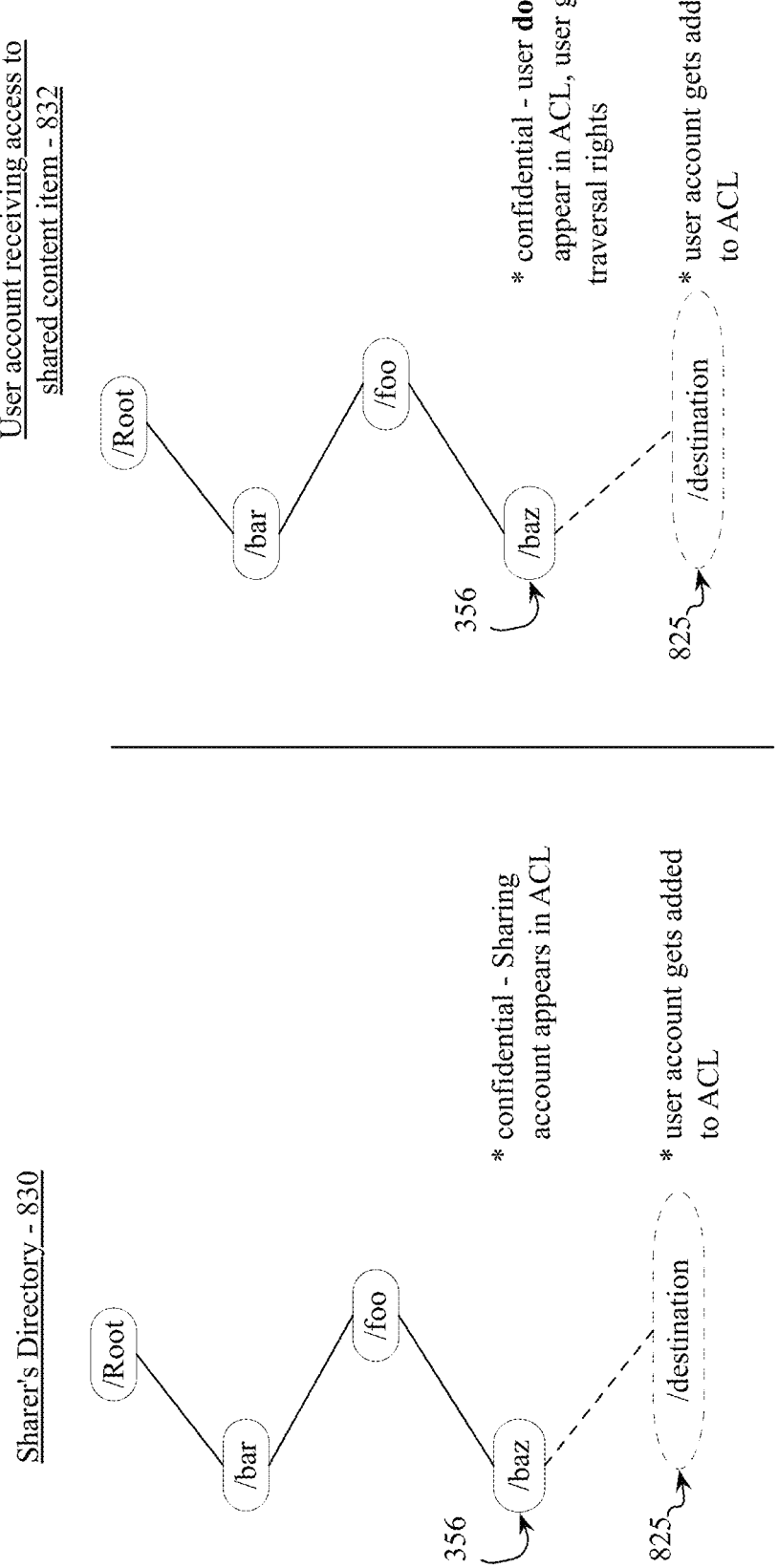

The process can begin when content management system 110 receives (810) a shared content item from the second user account to be shared with the first user account. Content management system 110 can determine (812) whether the first user account has access to a folder containing the shared content item. For example, in FIG. 30A, content management system 110 can determine (812) whether folder 356 containing shared content item 825 is accessible to the first user account. In FIG. 30A the first user account does not have access to folder 356 since it is a confidential folder and the first user account does not appear in restrictive access control list 147. In FIG. 30B the first user account does have access to folder 356 since it is not a confidential folder. While in FIG. 30C the first user account does not have access to folder 356 because the first user is not a member of the second user account's organization.

When it is determined (812) that the first user account has access to the content item's location, content management system 110 can give the first user account access (814) to the content item at its current path. This outcome is illustrated in FIG. 30B, where the first user account is a member of the same organization as a second user account so they both have access to the organization directory. This is illustrated in FIG. 30B where the second user has added shared content item 825 in their account's directory in a folder that is not confidential. Content item 825 has been explicitly shared with the first user account by including the first user account in an access control list to perhaps designate content item 825 as confidential or perhaps read only. Since the first user account already had access to folder 356, shared content item 825 can be placed within, the first user account's directory 832 at the same path to which it is located in the second user account's directory 830.

When it is determined (812) that the first user account does not have access to the shared content item in its location, then content management system determines (816) whether the content item is located within an organization folder to which the first user account is a member. If so, then content management system 110 can locate the shared content item 825 in the first user account's directory 832 at the same path to which it is located in the second user account's directory 830 and content management system 110 must also provide (820) traversal rights to be able to access shared content item 825 at its current path. For example, as illustrated in FIG. 30A, the first user account does not have access to confidential folder 356 but since the first user account is a member of the same organization as the second user account, the first user account can be given traversal rights to access shared content item 825 at its present path. This also maintains the condition that every user account having access to an organization directory should access the same content item at the same path.

If, however, it is determined (816) by content management system 110 that the first user is not a member of the organization from which content item 825 has been shared, shared content item 825 can be placed in the user account's folder. This scenario is illustrated in FIG. 30C, which illustrates the first user account's folder 832 before receiving 834 shared content item 825, and after receiving 836 shared content item 825. Since the first user account does not have access to the organization directory 830 from which content item 825 has been shared, content item 825 is located in user account's folder.

Prevention of Content Leaking

Another challenge in managing content management system 110 is that many user accounts can be making changes to content items at the same time. This causes a well known set of challenges wherein version conflicts for content items can result when two users try to submit edits to the same content item at the same time. Additionally, content management system 110 also faces new challenges such as ensuring that content items that are intended to be confidential do not inadvertently become public. This can arise when, for example, one user account deletes a confidential folder, while another user account attempts to save a content item to that confidential folder. Content management system 110 includes a mechanism to ensure that content items that were intended to be confidential, remain confidential.

Figure 31:
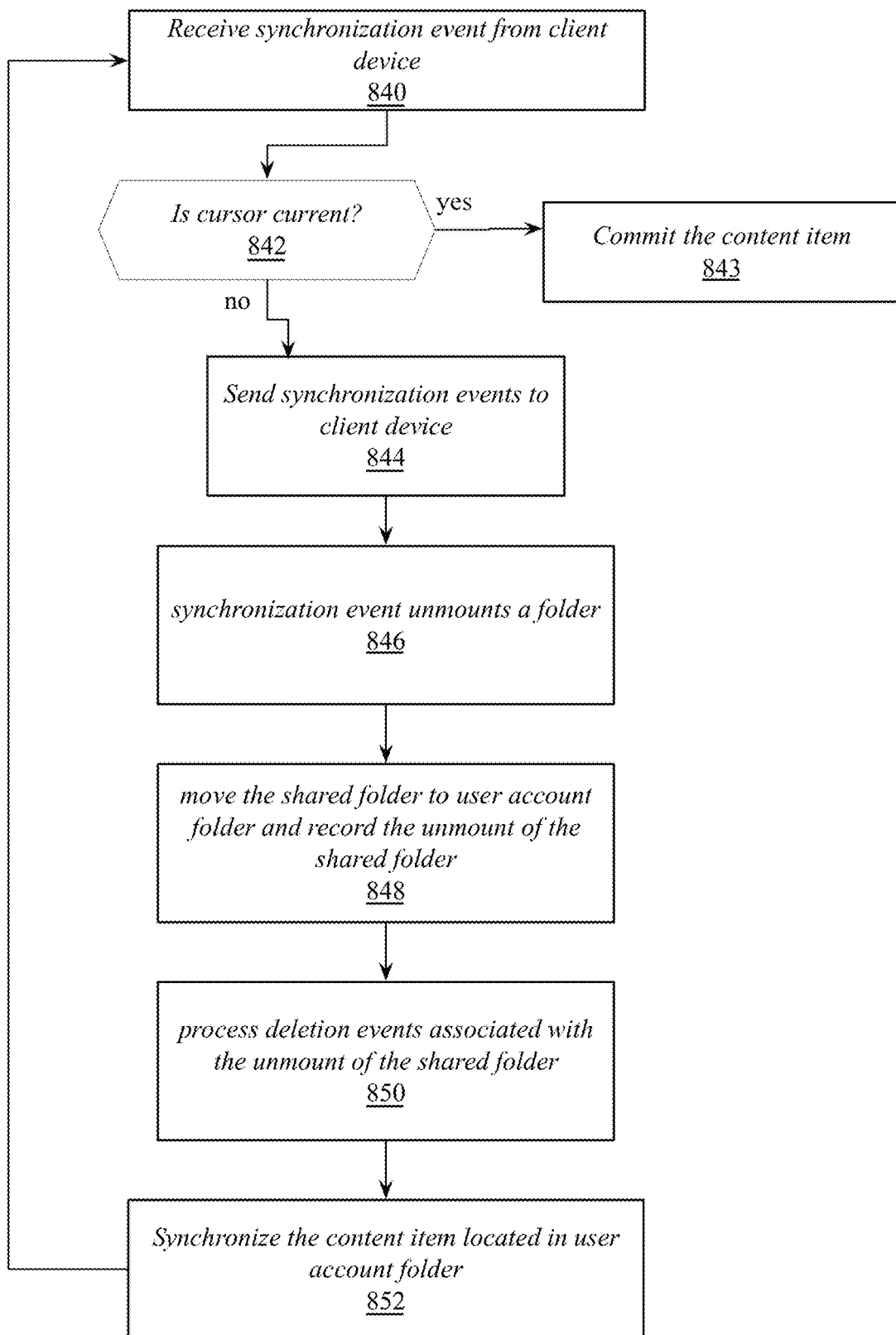
FIG. 31 shows an example method for preventing loss of data or inadvertent sharing of a confidential content item in accordance with some embodiments of the present technology.
Figure 32A:
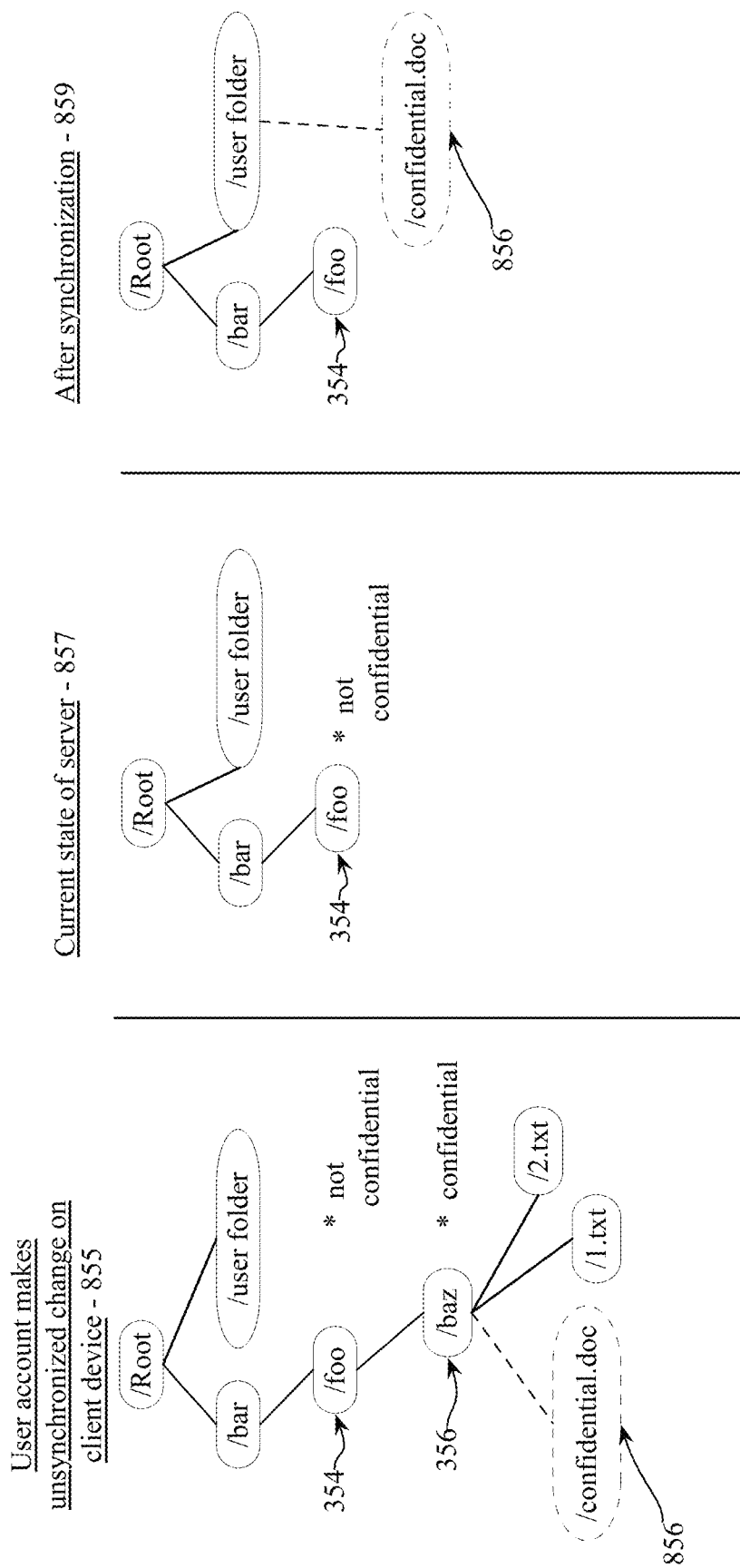
FIG. 32A and FIG. 32B show example scenarios that could lead to loss of data or inadvertent sharing of a confidential content item in accordance with some embodiments of the present technology.

FIG. 31 illustrates an example process for preventing confidential content items from inadvertently becoming publicly available or inadvertently lost. The process begins when server synchronization service 112 receives (840) a synchronization event from client device 150. For example, as illustrated in FIG. 32A, a user account has added or edited content item 856, which is intended to be a confidential content item stored within confidential folder 356. As addressed above, the synchronization event from client device 150 includes a cursor that indicates the last revisions to a specified namespace (e.g., folder 356) that client device 150 is aware of. Server synchronization service 112 can determine (842) if the cursor is current (i.e., whether client device 150 is up to date with the latest changes to the specified namespace). If the cursor is current (842), then the state of the server is as reflected on client device 150, and server synchronization service 112 can commit (save) the content item to content management system 110.

However, if the cursor is not current (842), then server synchronization service 112 can fail to synchronize (840) the synchronization event from client device 150, and instead sends (844) synchronization events to client device 150 in order to update client device 150 to reflect the current state of content management system 110.

In some embodiments, a synchronization event unmounts (846) a shared folder, which will cause client device 150 to delete the shared folder. FIG. 32A illustrates an example of when the client device directory 855 includes folder 356, but the current state of the server 857 shows that folder 356 is no longer mounted, and therefore, client device 150 must be synchronized with content management system 110 by also deleting folder 356.

However, this event could lead to several undesirable side effects depending on how client synchronization service 156 handles the unmount of folder 356. One undesirable side effect is that any content items within folder 356, including those content items that have not yet been synchronized to the server could be deleted as client device 150 deletes folder 356 to become synchronized with client device 150. A user account would not have saved a new or revised content item to a directory they knew would immediately be deleted. Fortunately, client synchronization service 156 does not delete content items in this manner. Instead server synchronization service 112 informs client synchronization service 156 of each individual content item that should be deleted so only content items that are known by the server and that are intended to be deleted by server synchronization service 112 and client synchronization service 156 are deleted.

While this mechanism ensures that no new or unsynchronized content item will be deleted since server synchronization service 112 will be unaware of such content items and will not instruct for them to be deleted, it can cause the side effect that a new or modified content item such as content item 856 can remain behind after the deletion and needs to be synchronized to the server.

Figure 32B:
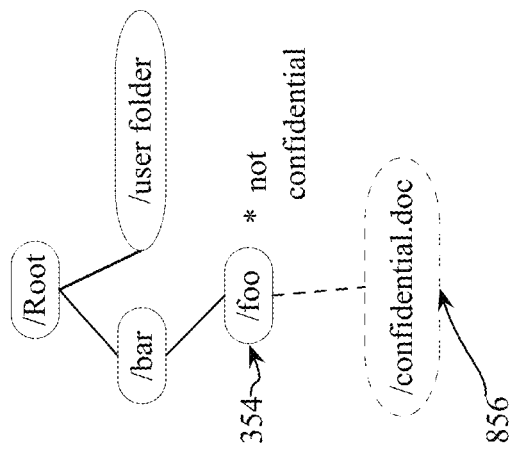

One possible, but undesirable mechanism to synchronize content item 856 to content management system 110 would be to attempt to add it as close as possible to its original path. For example, if the server were to see content item 856 saved in a folder that does not exist (it was just deleted) server synchronization service 112 would either create the folder and content item, or just store the content item in the next parent folder that does exist. This behavior would be reasonable, and provide a possible solution except in the case that content item 856 is confidential and these folders might not be confidential. This would cause a confidential content item 856 to be publicly available. This is reflected in FIG. 32B as a "state to avoid" 861.

To prevent this side effect of potentially allowing a confidential content item to become non-confidential, client synchronization service 156 moves (848) the unmounted folder 848 to the user account folder and concurrently informs server synchronization service 112 that the folder has been unmounted. (This is important so that the server does not see the moved folder as something that needs to be synchronized up to the server.) Now as client synchronization service 156 processes deletion events (850) to delete the individual content items as instructed by server synchronization service 112, unsynchronized content item 856 remains behind, stored in the user account folder as shown in the "after synchronization" state 859 in FIG. 32A. Content item 856 can then be synchronized from client device 150 to content management system 110.

While content item 856 might not be in the location that a user intended, content item 856 was not inadvertently deleted, and it was not inadvertently made public as it now resides in the user account's personal folder that is not shared with others. Content item 856 can thereafter be moved to a new location if desired by the user account.

Restoring Access Control List Entries after Deletion

Even with the many safeguards provided by server synchronization service 112 and client synchronization service 156 that act to prevent user accounts from performing actions that are likely unintentional or that may have unintended consequences, there are some actions that users may perform that they may later wish to undo. The present technology provides mechanisms for making undo actions easier. For example one challenge that can be faced is when a folder, such as a confidential folder, that has customized access privileges provided by entries in access control list 145 or restrictive access control list 147, becomes deleted. When a folder becomes deleted, so do those entries in access control lists 145 and 147. However, when a user or an administrator later attempts to undelete or restore the deleted folder, this action only reconstructs the folder and content items within the folder from blocks remaining stored in content storage 142. Undeleting or restoring of a deleted folder does not have analogous action for access control lists 145 and 147—that data is deleted and does not remain on disc.

To remedy this problem, content management system 110 can make copies of access control list 145 and 147 modifications and store these modifications in metadata database 146 in association with a folder identifier, which can be used to reconstruct access control list 145 and 147 entries.

Figure 33:
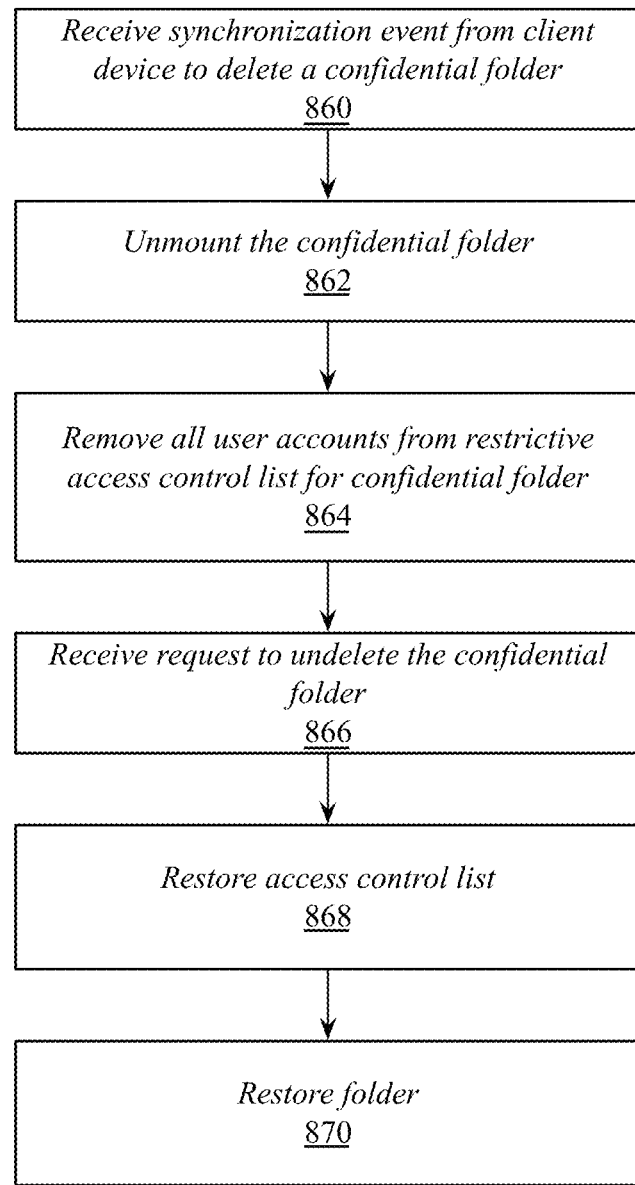
FIG. 33 shows an example method for restoring access control list entries after deletion in accordance with some embodiments of the present technology.

FIG. 33 illustrates an example process for deleting and restoring a confidential folder. Server synchronization service 112 can receive (860) a synchronization event from client device 150 to delete the confidential folder, and can then cause the confidential folder to become unmounted (862). In association with unmounting (862) the confidential folder, all entries in access control lists 145 and 147 pertaining to the confidential folder are deleted (864). Subsequently server synchronization service 112 can receive a request (866) to undelete the confidential folder.

To restore the confidential folder, content management system 110 must restore (868) access control list entries by retrieving access control list data from metadata database 146 and repopulate access control list 145 and 147 entries. This must be done prior to providing any access to any user accounts otherwise all user accounts having access to a parent folder will temporarily have access to the contents of the confidential folder. Content management system 110 can then reconstruct (870) the confidential folder and server synchronization service 112 can instruct client devices 150 to also reconstruct (870) the confidential folder so that it is restored (870) on both content management system 110 and client devices 150.

Converting to Organization Directory

Thus far the present description has covered aspects of providing the organization directory including access rights within the organization directory, and interacting within the organization directory, among others. However all of these topics assume that organization directory already exists. The present technology also addresses a process for converting user accounts from a single user account access model into organization directory access model.

For example, the present technology addresses challenges associated with modifying or rebuilding directories such as ensuring that private content items remain private, providing mechanisms for crash/failure tolerance, and efficiently synchronizing client devices 150 with content management system 110 after transitioning a user account to the organization directory of content management system 110.

Figure 34:
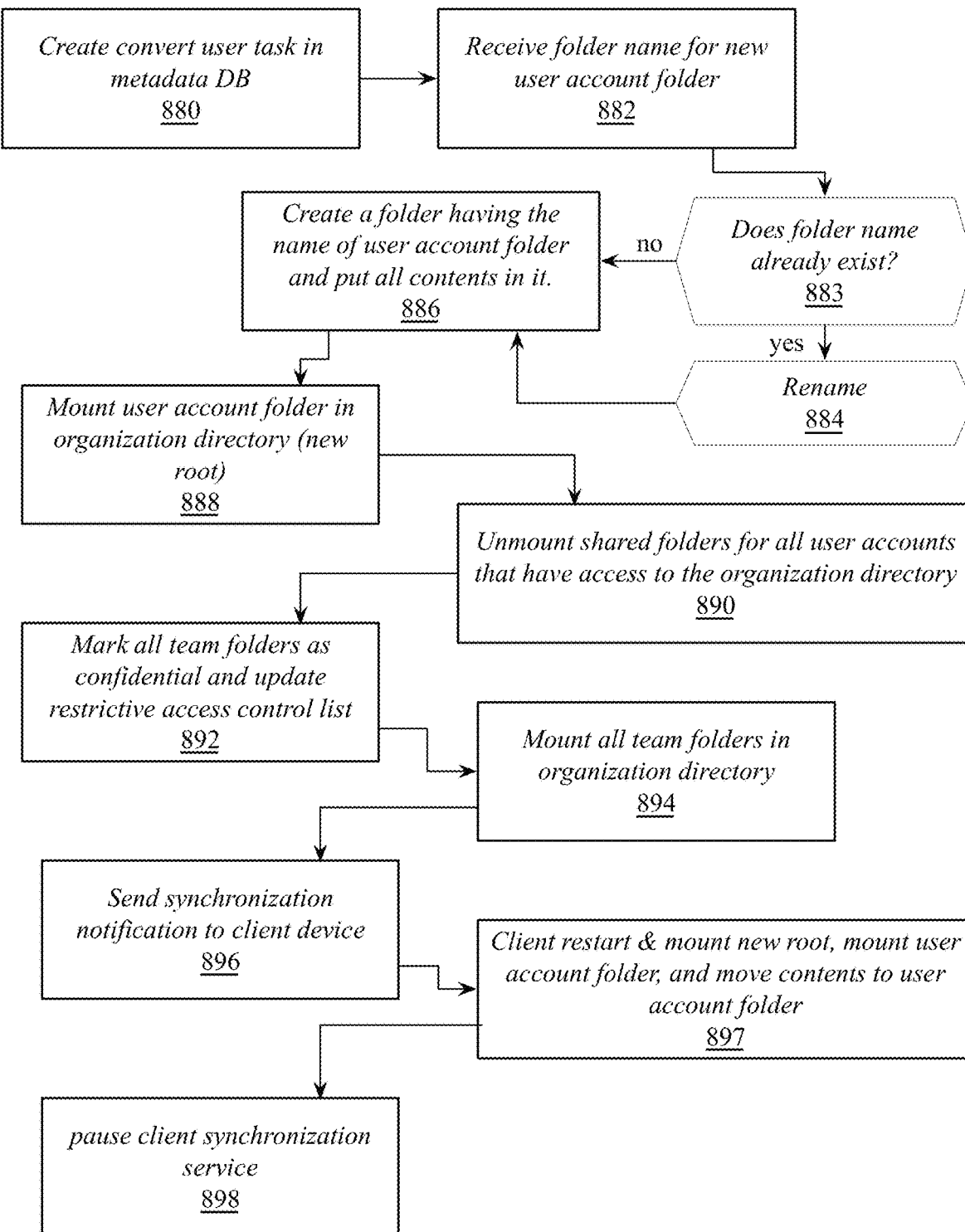
FIG. 34 shows an example method for transitioning an existing user account into a organization directory in accordance with some embodiments of the present technology.

FIG. 34 illustrates an example method for converting a user account from single user account 902 into organization directory 201. The process begins when content management system 110 creates (880) a convert-user task in metadata database 146. The convert-user task can be accompanied by a list of operations to complete before the convert-user task can be considered complete. The convert-user task and list of operations together ensure that should the convert-user task fail at any point, the convert-user task can be resumed from where it left off. After each completed operation, the list of operations can be updated to remove the completed operation.

Figure 35:
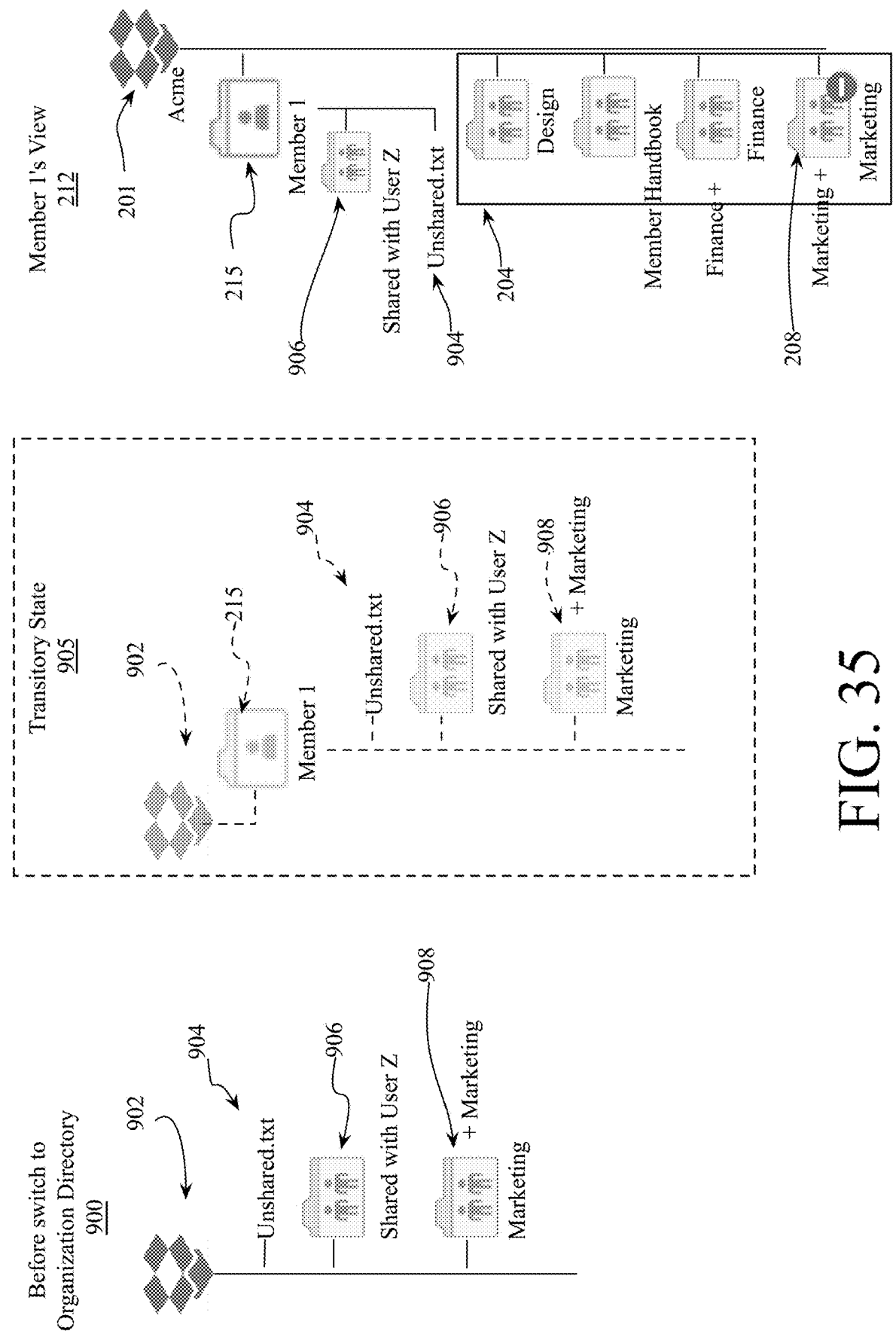
FIG. 35 shows an example transition from an existing user account into an organization directory in accordance with some embodiments of the present technology.

FIG. 35 illustrates an example transition from user account view 900 before being switched to organization directory 201, and the same user account's view 212 after transition to organization directory 201.

User account view 900 shows a user account in a single user account model, wherein root directory 902 stores unshared content items 904, shared folders 906, and group collections 908. In comparison, organization view 212 shows root organization directory 201 including user account folder 215, and team collections 204. User account folder 215 is the only folder within organization directory 201 that is private to the user account. All other folders are shared with at least one other user account having access to organization directory 201.

Returning to FIG. 34, after the convert-user task has been created (880), content management system 110 can receive the folder name for the new user account folder 215 from team service 130. Content management system 110 determines (883) whether any other folder in user account view 900 is the same as the name supplied for new user account folder 215. If the username already exists (883) then the folder within user account view 900 is renamed (884). Then, after ensuring that no duplicated folder will result, content management system can create (886) folder 215 having the name of the new user account folder and put all contents of root directory 902 into the folder 215 as seen in intermediate state 905 of organization directory 201 in FIG. 35. All of the content items of directory 902 are put into folder 215 because 215 is a private folder—this move is synchronized with client device 150 to bring client device into transitory state 905. By including the content items in private folder 215 this ensures that content items will default to an access state of being private to the user account in the event that the convert-user task does not explicitly move a content item elsewhere.

Intermediate state of organization directory 905 shows user account root directory 902 containing new user account folder 215 with all content items from user account root directory 902 from view 900 stored within it.

The next step in the transition from user account directory 902 to organization directory 201 is to mount (888) user account folder 215 within organization directory 201 and declare organization directory 201 as the root namespace for the user account.

All folders that are shared with other user accounts that have access to organization directory 201 are unmounted (890) for those user accounts. This ensures that while Member 1's user account is being transitioned into organization directory 201, that the interim changes and moves for the folder are not synchronized to those accounts. The folder can be remounted after Member 1 has been transitioned to organization directory 201. However, users that do not have access to organization directory 201 will not experience the unmount of the shared folder since no changes are happening to their account. For example folder 906 is shared with "user Z" whom does not have access to organization directory 201. Accordingly folder 906 is not unmounted for user Z. In contrast folder 908 is shared with the marketing team, and the marketing team is a team within the organization that has access to organization directory 201. Accordingly folder 908 is unmounted from the user accounts of all members of the marketing team.

Next any folders, such as team-shared folders, that have access permissions that restrict some members having access to organization directory 201 from accessing the folder are marked confidential (892) and modifications are made to restrictive access control list 147. Thereafter all team-shared folders can be mounted (894) in organization directory 201 and they already have appropriate access permissions configured. This step converts folder 908 into team-shared folder 208 in organization directory 201. In some embodiments other content items can be moved out of user folder 215 and into other locations of organization directory 201 as instructed by list of operations associated with the convert-user task. In some embodiments content items can be selected to be moved out of user folder 215 using the same decisions as discussed with respect to FIG. 29 above.

After removing specified folders and content items out of user account folder 215 while directory 902 is in transitory state 905, the user has completed transitioning to organization directory 201 on the server. Any content items specified by the events associated with the convert-user task have been moved out of account folder 215 such as marketing team-shared folder 208. Other content items such as shared folder 906 that is shared with a user account that does not have access to organization directory 201 remains in user account folder 215 as is private content item 904. One of the benefits of transitioning to organization directory 201 is that everyone with access to organization directory 201 has access to a directory containing all of the organization's content items. As such, FIG. 35 shows Member 1's view 212 of organization directory 201 that includes team-shared collections 204 that weren't previously associated with the user account.

Now that the transition from user specific account 902 to organization directory 201 is complete on the server, content management system 110 can send a synchronization notice (896) to client device 150.

In response to receiving the synchronization notice (896), client device 150 sends it's copy of the cursor to the server which specifies the namespaces of which it is aware that needs to be synchronized. However, due to the transition to organization directory 201, the server recognizes that client device 150 needs to to be transitioned to organizations view 201, and can cause client device 150 to restart and mount new root of organization directory 201 and mount user account folder 215 within the root of organization directory 201.

Content management system 110 can also determine that client device 150 is so out of date that providing individual synchronization events by providing the linearized list of events from server synchronization service 112 would not be an efficient way of bringing client device 150 into the current state, content management system 110 can instruct client device 150 to pause (898) client synchronization service 156.

Rather than bring client device 150 into synchronization with content management system 110 through the normal synchronization process, client device 150 can be more efficiently brought up-to-date using a quick start procedure.

Quick Start & Rebuilding Namespaces Views

Whether client device 150 is starting up for the first time and needing to synchronize organization directory 201, or it has been a long time since client device 150 last synchronized with content management system 110, it may be more efficient to rebuild a namespace then to synchronize individual events from content management system 110. In such embodiments client synchronization service 156 can be paused while a quick start procedure is performed to efficiently bring client device 150 up to date.

First content management system 110 determines a reasonably current namespace view for the user account, and there are two mechanisms by which content management system 110 can construct an up-to-date namespace view without reading through an entire list of revisions from server file journal 148.

Figure 36:
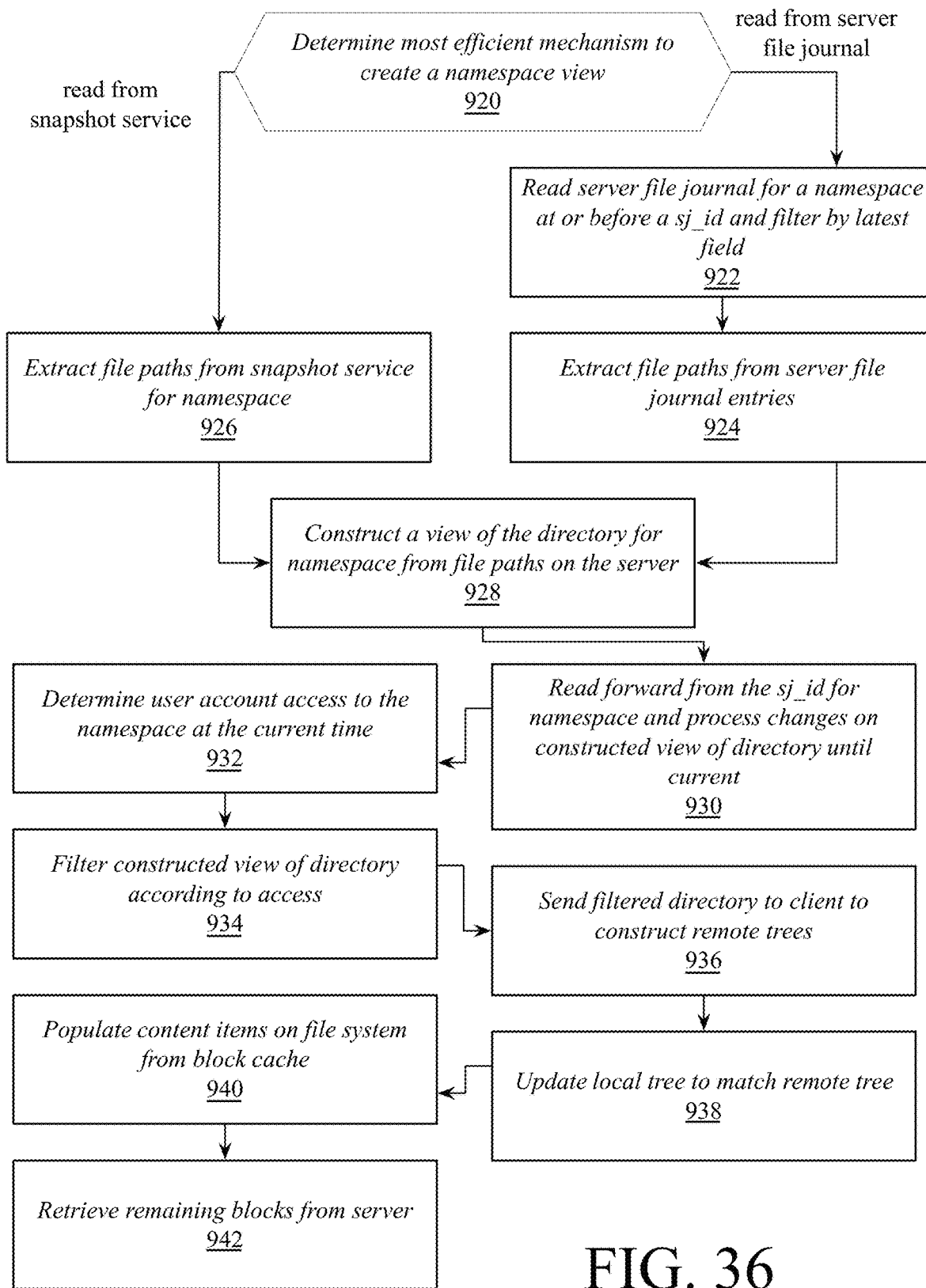
FIG. 36 shows an example method of creating a namespace view in accordance with some embodiments of the present technology.

FIG. 36 illustrates an example process for constructing an up to date namespace view by content management system 110. First content management system 110 can determine (920) a most efficient mechanism to create the namespace view.

A first method is to choose an arbitrary point in server file journal from which to read for the namespace, and to identify all paths in the namespace at that point in time. As addressed above, server file journal 148 is a collection of rows describing revisions to content items. The rows are organized by namespace identifiers and server file journal identifiers. The combination of a namespace identifier and a server file journal identifier (ns_id, sj_id) corresponds to a specific row in server file journal 148 containing a specific revision within the namespace that is identified. Content management system 110 can read (922) from server file journal 148 for a specific namespace ID at or before a recent row in server file journal 148. The revisions in server file journal 148 can be filtered by a latest tag, which identifies rows in server file journal 148 as being the last revision to any specific path. Accordingly, by reading all rows of server file journal 148 for a specified namespace having the latest tag applied will yield a list of revisions that identify every file path for the specified namespace. These file paths can be extracted (924) from the server file journal 148 entries and used to construct (928) a namespace view directory structure.

The second method is to read from a snapshot service provided by content storage service 116, which stores condensed snapshots of a namespace in content storage 142 at a recent point in time. The snapshot service is described in more detail below, however, by way of introduction, the snapshot service stores a condensed view of a namespace—including all of the content items in it—for a recent point in time. Large namespaces may need to be sharded over multiple pages, and shard page names can include a hash that identifies each file path stored on that shard page. A benefit of storing path information in the shard names is that the shard pages don't need to be opened to extract file paths, and you can use file path information to only open the shard page(s) you are looking for when using the snapshot service. Each snapshot is current for a particular namespace at a specific server file journal ID (ns_id, sj_id).

Returning to FIG. 36, file paths can be extracted (926) from the snapshot service for a namespace, and these file paths are used to construct (928) a namespace view directory structure.

Content management system 110 can heuristically determine (920) which mechanism is likely to be the most efficient mechanism. If the namespace is not very active, and therefore there are not too many rows of revisions in server file journal 148 for any given content item, content management system may decide that the server file journal method is preferred. If however the namespace is very active, or some other factor causes content management system 110 to determine that it is more efficient to read from snapshot service, that method can be used.

Both mechanisms result in using extracted file paths to construct (928) a namespace view directory structure for a particular point in time in the past. In the server file journal method, content management system reads entries from server file journal 148 at or before a particular server file journal ID, and in the snapshot method, the paths were extracted from a snapshot that was current as of a particular server file journal ID. Accordingly content management system 110 can bring the namespace view into a more current state by processing revisions (930) stored in rows in server file journal 148 that are after the server file journal ID that was used when paths were extracted from server file journal entries or snapshot service as described above.

Now that the server has a current view of a particular namespace, that view needs to be filtered for the user account requesting the namespace view since, as described above, a given user account may not be able to see every content item in a namespace. Content management system can determine (932) access for the user account in the namespace using principles described with respect to FIG. 4 above, and can filter (934) the constructed namespace view according to access permissions for the user account. Content management system 110 can send (936) the filtered namespace view to client device 150 to construct a remote tree.

Client device 150 can update (938) its local tree to match the remote tree. When updating its local tree, creating new directories is mainly a processing task however; storing the content items can require downloading a large amount of data. Fortunately, any content items already stored on client device do not need to be downloaded. Client device 150 can recreate the content items from a block cache on client device 150 that contains blocks for deleted content items and comments for the content items. Using those already downloaded blocks is more efficient than downloading the blocks. However, any blocks not found in the block cache need to be downloaded (942) from the server either from the snapshot service which can provide a compressed version of a namespace, or incrementally from content storage service 116.

The process illustrated in FIG. 36 can be repeated for each namespace mounted in organization directory 201.

Once client device 150 has mounted the appropriate tree structure, and downloaded any compressed namespaces from the snapshot service, server synchronization service 112 can send the latest cursor down to client device 150 and can remove the convert-user task for the user account, which also allows the client synchronization service 156 to resume.

Figure 37:
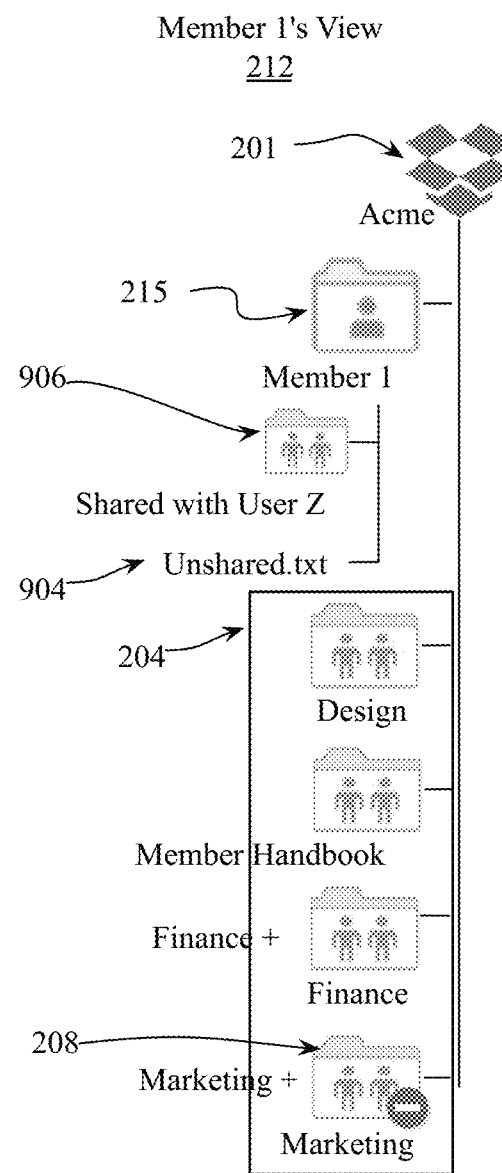
FIG. 37 shows an example constructed namespace directory in accordance with some embodiments of the present technology.

FIG. 37 illustrates an example of information used to construct Member 1's view of organization directory 201. For any namespace, the namespace view builder process described with respect to FIG. 36 can result in extracted paths for the namespace that are filtered according to Member 1's access rights. FIG. 37 illustrates paths in the namespace for Member 1's user account folder 215. This can be used to determine a directory tree for the namespace and this process can be repeated for each namespace.

Each namespace can be located within organization directory based on information from the mount table.

Snapshot Service

In some instances it can be useful to have a complete namespace all saved together in one place. For example, in instances when an entire namespace needs to be constructed, such as when a namespace is shared with a new account, or when a new client device is added to user account, or when transiting to organization directory—it can be more efficient to download an entire namespace from one place instead of reading each revision from server file journal 148 and using content storage service 116 to extract blocks making up a content item from content storage 142.

To address this need, content storage service 116 can include a snapshot service that stores namespace views at a point in time, or more specifically, as of a server journal id (sj_id) for that namespace. A namespace view is a highly compressed snapshot of the contents of a namespace at that namespace ID (ns_id). The snapshot includes all the contents of a namespace, and is not filtered for a user account's permissions, or hidden files, etc. Namespace snapshots might be so large that the namespace need to be divided into pages. Each page can include representations of a paths from within the namespace (a subset of the paths that make up the namespace).

Since each page is compressed, it is preferable to avoid opening any page on the server, where it would potentially utilize a large amount of memory. Accordingly, every path and prefix of the path can be hashed, and the hashes can be stored in the name of the snapshot page. Therefore, it is possible to search for the hash of a path without having to open any page of the snapshot to find that path. This optimization also works in reverse where the path names can be extracted from the snapshot pages to reconstruct a directory tree for a namespace.

To reconstruct a directory tree, the paths can be topologically sorted (parent_prefix_hash→path_hash). The initial set of paths with no dependencies are the children of the root of the namespace, and then we can reconstruct the full path (e.g., "/foo/bar/baz") from the set of paths (e.g., "/foo," "/foo"→"/foo/bar", "/foo/bar"→"/foo/bar/baz". Each path state along this set contains the last component of its path, e.g. "foo" "bar", "baz".

As addressed above, the namespace snapshots are not filtered for user account access permissions. Instead, after constructing the directory tree from the namespace, the paths in the directory tree can be filtered according to user account access permissions. User account access permissions can be obtained as described with respect to FIG. 4, above. Then each path to which the user account has access can be designated as allowed, e.g., represent the set of filters as follows:

ALLOW_ONLY (hash1, hash2, hash3, . . . )
ALLOW_MOUNT (hash4, hash5, . . . )
each hash containing full path hashes.

If a filter is specified, content storage service can filter the paths out at runtime without doing a full topological sort, and this especially important because it only requires looking at data in a single page of a snapshot to apply the filters to that page.

Organization Directory Content Manager

As referenced above, organization directory 201 can be managed by an administrator accessing organization directory through an administrator console. FIGS. 38A, 38B, 38C, and 38D show example user interfaces of administrator console 950.

Managing organization directory 201 has several challenges, especially as pertains to diversity of content types (e.g., team content, user account collections, etc.), and a diversity of access points to organization directory 201 (administrator console, client synchronization service, web access, mobile application, etc.). An administrator may have different capabilities depending on the type of content, the access point, and administrator role, and it is necessary to ensure that the administrator is aware of the role and permissions with which the administrator is working to avoid unintentional changes to organization directory 201.

An administrator can have several types of access. First an administrator can access organization directory 201 as a user, with no special privileges over any other user. In the user role, the administrator has access to his/her respective user account collection, and can view the team-shared folders of the organization directory 201.

An administrator can have owner access. In the owner role, an administrator can manage team-shared folders, including confidential team-shared folders. However, an administrator cannot access any user account collections (in some embodiments, administrator may have read-name-only permissions). In some embodiments, the owner role may only be invoked when an administrator accesses organization directory 201 through administrator console 950. In some embodiments, an administrator can perform a limited set of owner actions when accessing organization directory 201 through other access points than administrator console 950. For example, the administrator may be able to change access permissions for a team-shared folder, but cannot delete a team-shared folder when accessing organization directory 201 through any access point other than administrator console.

An administrator can have a log-on-as-user access where the administrator explicitly becomes a specific user account through administrator console 950. In this role, the administrator can access the specific user account and manage its user account collection.

Figure 38A:
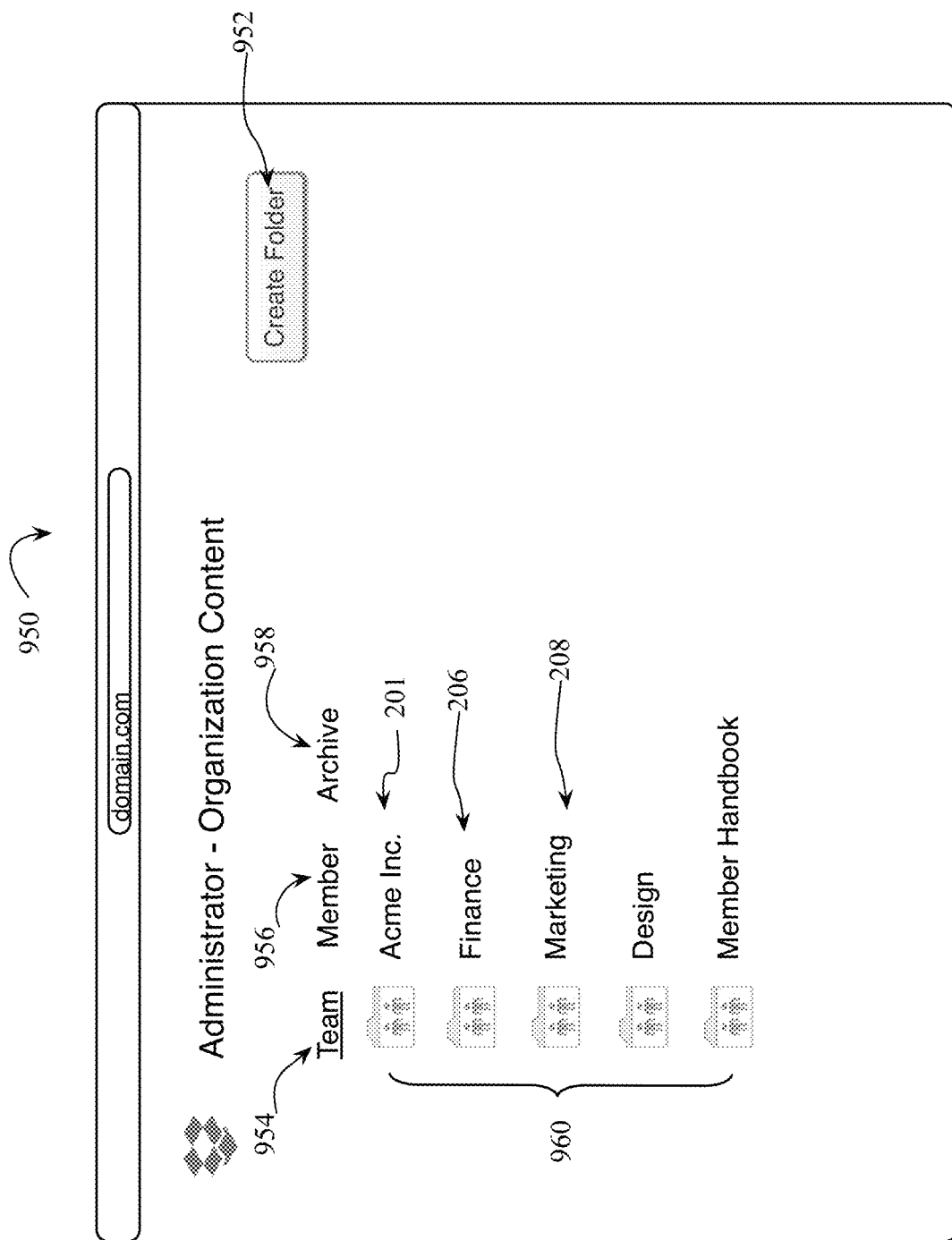
FIG. 38A, FIG. 38B, FIG. 38C, and FIG. 38D show example administrator console views in accordance with some embodiments of the present technology.

FIG. 38A illustrates an example of administrator console 950 showing team-shared folders 960 displayed under "team" page 954. In this page 954 of administrator console 950 an administrator can access all team-shared folders 960, and can change access permissions through edits to restrictive access control list 147, can create new team-shared folders using button 952, and can archive team-shared folders (addressed below).

In some embodiments, prior to accessing team page 954 of administrator console 950, the administrator must escalate their permissions to "team owner" level. In some embodiments permission escalation can be achieved through authorization service 132 as addressed with respect to FIG. 4. Client device 150, being operated by the administrator, can request access to all team-shared folders in organization directory in the view context of administrator console 950. In some embodiments, the administrator can be prompted with a message in administrator console 950 confirming that the administrator wishes to escalate their permissions to "team owner" level.

Figure 38B:
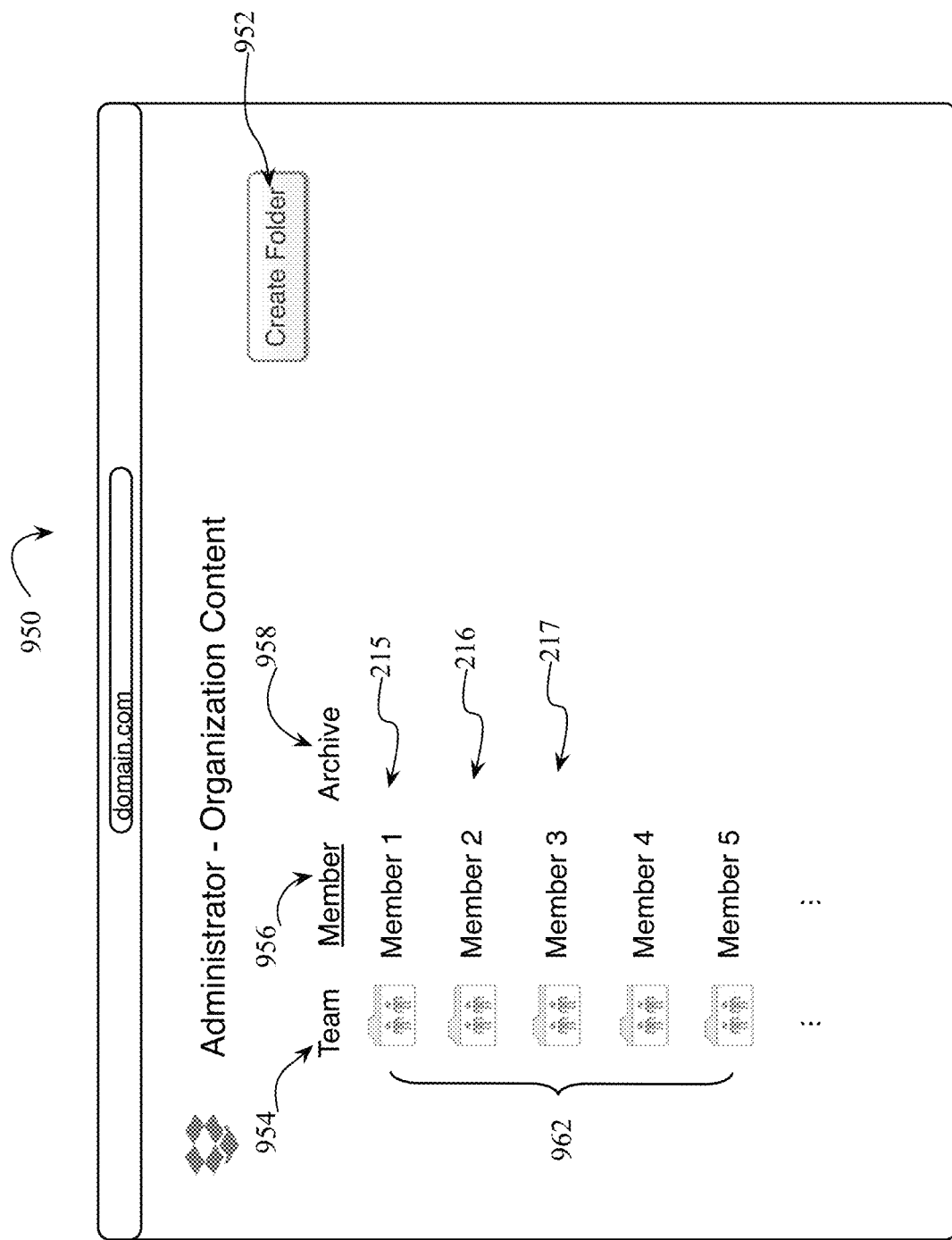

FIG. 38B illustrates an example of administrator console 950 showing user account folders 960 displayed under "member" page 956. On page 956 of administrator console 950 an administrator can view all user accounts folders 962, and can create new user account folders using button 952, but cannot access any such folders, or modify the folders without changing their role from administrator to a user actor.

Figure 38C:
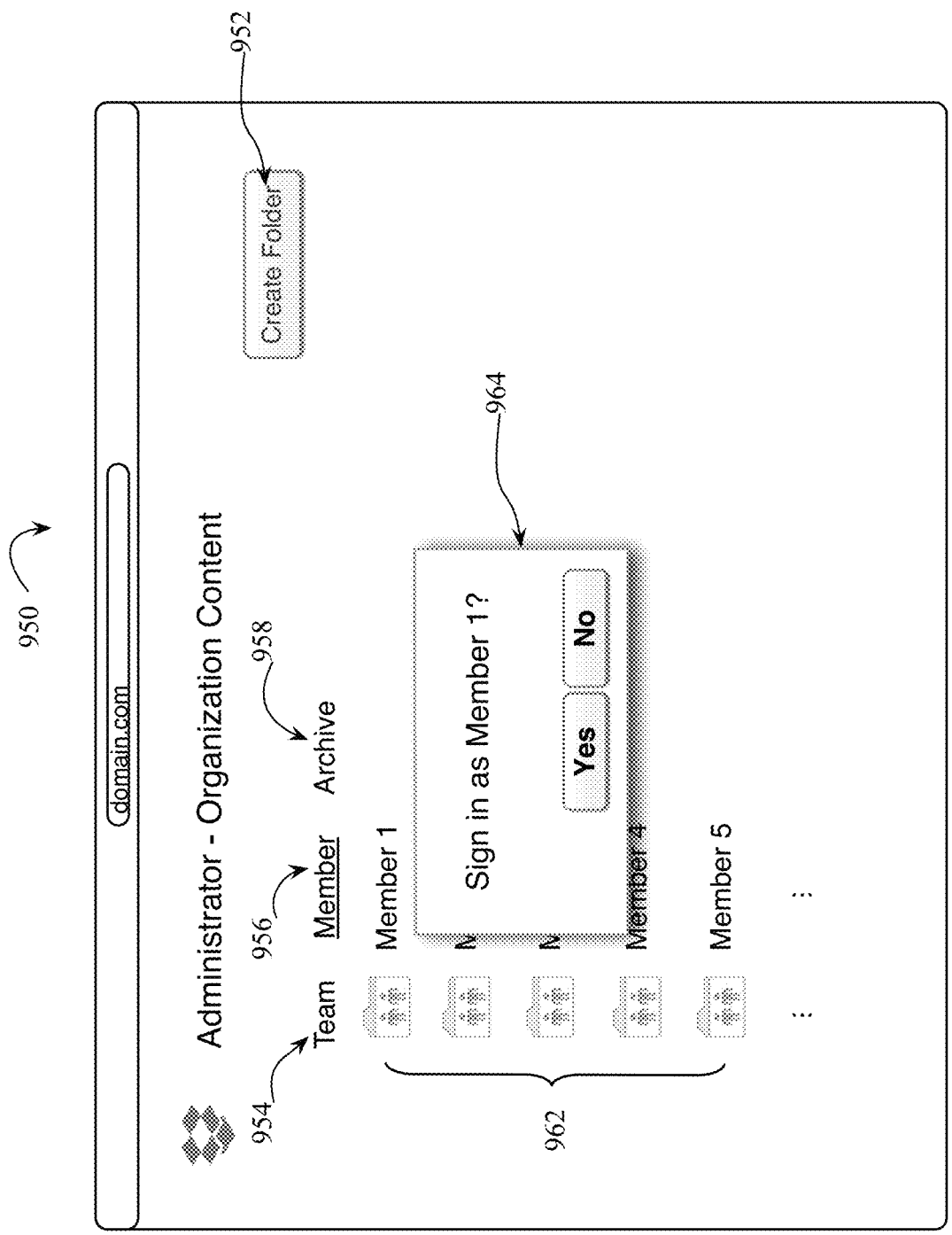
Figure 38D:
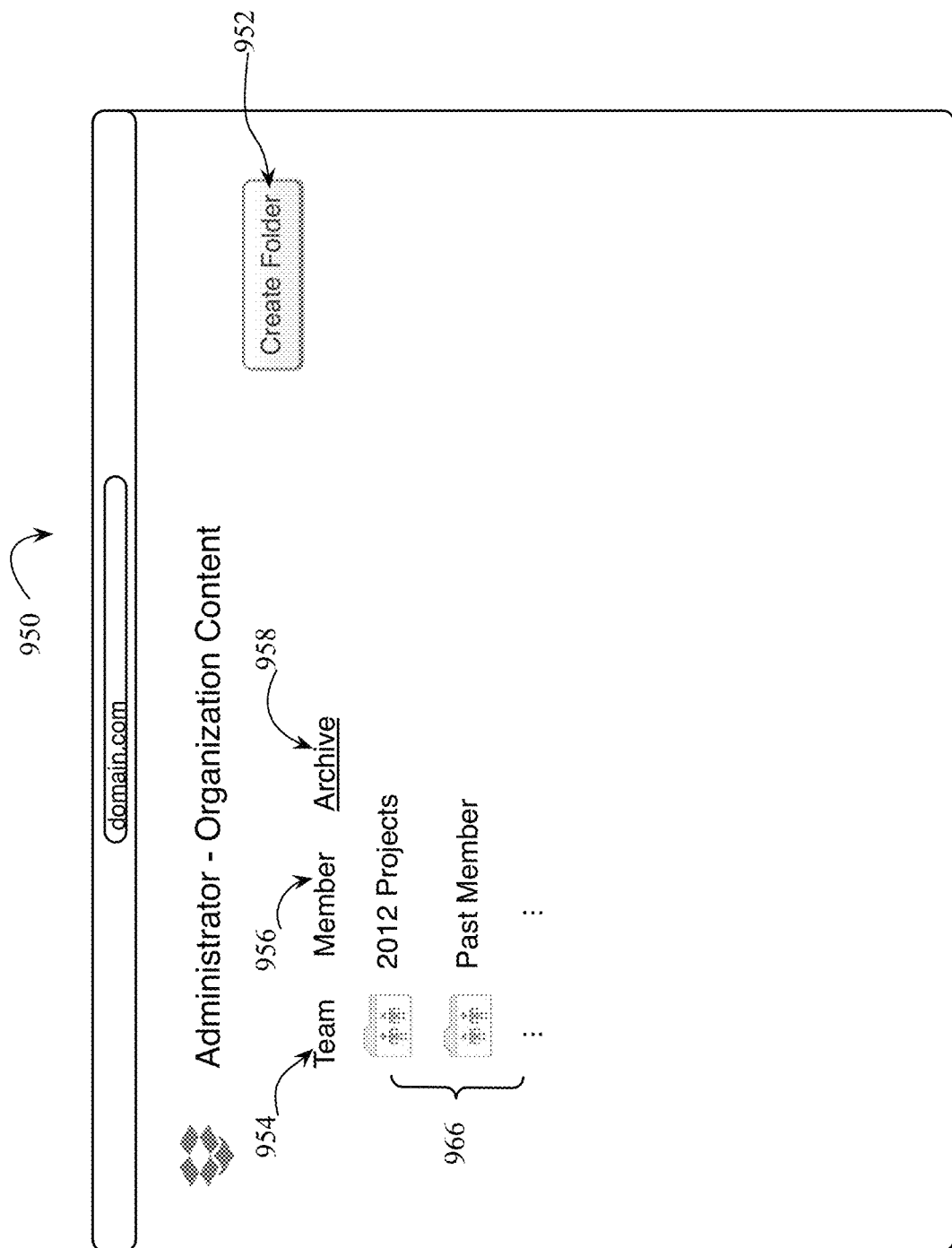

In some embodiments, when an administrator attempts to access a user account folder in administrator console 950, the administrator must change their role to user of the specific user account for the folder the administrator wishes to access. In some embodiments the role change can be achieved through authorization service 132 as addressed with respect to FIG. 4. Client device 150, being operated by the administrator, can request access to a specific user account folder in organization directory 201 in the view context of administrator console 950. In some embodiments, as shown in FIG. 38C, the administrator can be prompted with message 964 in administrator console 950 asking if the administrator wishes to sign in as the member.

FIG. 38B illustrates an example of administrator console 950 showing archive page 958 and displaying archived folders 966. As addressed herein, one intent of organization directory 201 is to provide a single directory for all of an organization's content items, and this includes content items that are no longer needed. An administrator can move a folder into the archive by removing all access to the folder, or by explicitly moving a folder into the archive. Archived folders do not appear in any user account views; they are only accessible to an administrator. Archived folders 966 can include user account folders for user accounts that no longer have access to organization directory 201, or to team-shared folders that are no longer needed. In some embodiments, the administrator does not need any role change or privilege escalation in order to access or restore an archived folder 966.

In some embodiments, a folder can be archived by moving the folder into an archive directory within or at least associated with organization directory 201. The archive directory is hidden from all user accounts having access to organization directory 201, and its existence and contents can only be viewed within administrator console 950.

In some embodiments, when a team-shared folder is archived, a new file can be written into or associated with the archived folder that records information from access control list 145 and restrictive access control list 147 so that if the folder needs to be restored, or an administrator needs to know previous user accounts with access, the information is stored with the archive.

In some embodiments, rather than making a separate request of authorization service 132 for privilege escalation, it can be possible to request a maximum access level associated with the user account (or administrator account) wherein the user account can elevate their privileges through explicit request, up to the maximum access provided by authorization service 132, but that that does not require an additional request to authorization service 132.

In some embodiments administrator console 950 can also provide an informational view. The informational view can present various statistics relevant in managing organization directory 201. For example, the informational view can provide information regarding a number of users having access to organization directory 201, storage space utilized or available, license information, statistics regarding file activity within organization directory 201, etc. In some embodiments the informational view is accessible by any administrator, and does not require further elevated privileges.

In some embodiments administrator console 950 can also provide a search function to allow administrators to search for content items within organization directory 201. In some embodiments the search function is accessible by any administrator, and does not require further elevated privileges.

Figure 39:
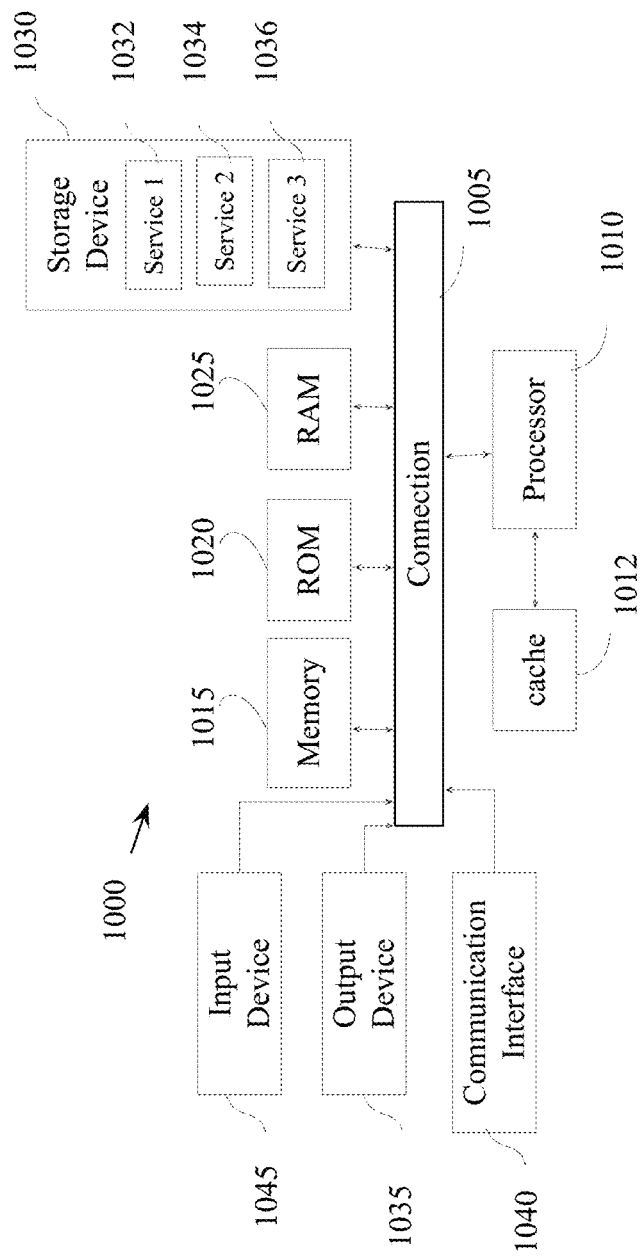
FIG. 39 shows an example of a system for implementing certain aspects of the present technology.

FIG. 39 shows an example of computing system 1000, which can be for example any computing device making up client device 150, content management system 110 or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions stored thereon, when executed the instructions are effective to cause a content management system to:
include a first folder in a restrictive access control list, wherein the restrictive access control list overrides a default access policy for a directory including the first folder to prohibit all user accounts having access to the directory from accessing the first folder except for a user account that is included in the restrictive access control list in association with the first folder, wherein the default access policy for the directory permits all user accounts having access to the directory to at least read contents of each folder within the directory;
determine whether the first folder has an associated property that requires that the first folder be visible to user accounts that have access to the directory; and
provide read-name-only access to the first folder for the user accounts that have access to the directory except for the user account that is included in the restrictive access control list in association with the first folder.

2. The non-transitory computer readable medium of claim 1, further comprising instructions to cause the content management system to:
provide access to a second folder to a second user account by including the second folder and the second user account in the restrictive access control list, wherein the second folder is located in a path is subordinate to the first folder to which the user account has no access;
determine that the second user account should be granted a traversal right to the first folder; and
store the traversal right to the first folder in a traversal dictionary.

3. The non-transitory computer readable medium of claim 1, further comprising instructions to cause the content management system to prohibit all user accounts from having access to the directory and from seeing the existence of the first folder except for the user account that is included in the restrictive access control list in association with the first folder.

4. The non-transitory computer readable medium of claim 1, further comprising instructions to cause the content management system to:
associate the user account with a membership in a team; and
record the team in association with the first folder in the restrictive access control list, wherein the user account is included in the restrictive access control list when the team to which the user account is a member is listed in the restrictive access control list.

5. The non-transitory computer readable medium of claim 1, further comprising instructions to cause the content management system to:
receive from a first client device authorized to access a second user account on the content management system to synchronize content associated with the second user account between the first client device and the content management system, wherein the second user account is not included in the restrictive access control list in association with the first folder;
determine whether the second user account has access rights to a second folder that is located in a path subordinate to the first folder to which the second user account has no access;
when it is determined that the second user account has access rights to the second folder that is located in the path subordinate to the first folder to which the user account has no access, synchronize the first folder with the first client device by transmitting a representation of the first folder, but not including any content items within the first folder other than the second folder;
when it is determined that the second user account does not have access rights to the second folder that is located in the path subordinate to the first folder to which the user account has no access, determine if the first folder is associated with a property requiring that the property be visible;
when it is determined that the first folder is associated with a property requiring that the property be visible, synchronize the first folder with the first client device by transmitting a representation of the first folder, but not including any content items within the first folder; and
when it is determined that the first folder is not associated with a property requiring that the property be visible, do not synchronize the first folder.

6. A method comprising:
including a first folder in a restrictive access control list, wherein the restrictive access control list overrides a default access policy for a directory including the first folder to prohibit all user accounts having access to the directory from accessing the first folder except for a user account that is included in the restrictive access control list in association with the first folder, wherein the default access policy for the directory permits all user accounts having access to the directory to at least read contents of each folder within the directory;
determining whether the first folder has an associated property that requires that the first folder be visible to user accounts that have access to the directory; and
providing read-name-only access to the first folder for the user accounts that have access to the directory except for the user account that is included in the restrictive access control list in association with the first folder.

7. The method of claim 6, further comprising:
providing access to a second folder to a second user account by including the second folder and the second user account in the restrictive access control list, wherein the second folder is located in a path is subordinate to the first folder to which the user account has no access;
determining that the second user account should be granted a traversal right to the first folder; and
storing the traversal right to the first folder in a traversal dictionary.

8. The method of claim 6, further comprising prohibiting all user accounts from having access to the directory and from seeing the existence of the first folder except for the user account that is included in the restrictive access control list in association with the first folder.

9. The method of claim 6, further comprising:
associating the user account with a membership in a team; and
recording the team in association with the first folder in the restrictive access control list, wherein the user account is included in the restrictive access control list when the team to which the user account is a member is listed in the restrictive access control list.

10. The method of claim 6, further comprising:
receiving from a first client device authorized to access a second user account on a content management system to synchronize content associated with the second user account between the first client device and the content management system, wherein the second user account is not included in the restrictive access control list in association with the first folder;
determining whether the second user account has access rights to a second folder that is located in a path subordinate to the first folder to which the second user account has no access;
when it is determined that the second user account has access rights to the second folder that is located in the path subordinate to the first folder to which the user account has no access, synchronizing the first folder with the first client device by transmitting a representation of the first folder, but not including any content items within the first folder other than the second folder;
when it is determined that the second user account does not have access rights to the second folder that is located in the path subordinate to the first folder to which the user account has no access, determining if the first folder is associated with a property requiring that the property be visible;
when it is determined that the first folder is associated with a property requiring that the property be visible, synchronizing the first folder with the first client device by transmitting a representation of the first folder, but not including any content items within the first folder; and
when it is determined that the first folder is not associated with a property requiring that the property be visible, do not synchronize the first folder.

11. A content management system comprising:
at least one processor;
at least one memory having instructions stored thereon, that when executed the instructions are effective to cause the at least one processor to:
include a first folder in a restrictive access control list, wherein the restrictive access control list overrides a default access policy for a directory including the first folder to prohibit all user accounts having access to the directory from accessing the first folder except for a user account that is included in the restrictive access control list in association with the first folder, wherein the default access policy for the directory permits all user accounts having access to the directory to at least read contents of each folder within the directory;
determine whether the first folder has an associated property that requires that the first folder be visible to user accounts that have access to the directory; and
provide read-name-only access to the first folder for the user accounts that have access to the directory except for the user account that is included in the restrictive access control list in association with the first folder.

12. The system of claim 11, further comprising instructions to cause the at least one processor to:
provide access to a second folder to a second user account by including the second folder and the second user account in the restrictive access control list, wherein the second folder is located in a path is subordinate to the first folder to which the user account has no access;
determine that the second user account should be granted a traversal right to the first folder; and
store the traversal right to the first folder in a traversal dictionary.

13. The system of claim 11, further comprising instructions to cause the at least one processor to prohibit all user accounts from having access to the directory and from seeing the existence of the first folder except for the user account that is included in the restrictive access control list in association with the first folder.

14. The system of claim 11, further comprising instructions to cause the at least one processor to:
associate the user account with a membership in a team; and
record the team in association with the first folder in the restrictive access control list, wherein the user account is included in the restrictive access control list when the team to which the user account is a member is listed in the restrictive access control list.

15. The system of claim 11, further comprising instructions to cause the at least one processor to:
receive from a first client device authorized to access a second user account on the content management system to synchronize content associated with the second user account between the first client device and the content management system, wherein the second user account is not included in the restrictive access control list in association with the first folder;
determine whether the second user account has access rights to a second folder that is located in a path subordinate to the first folder to which the second user account has no access;
when it is determined that the second user account has access rights to the second folder that is located in the path subordinate to the first folder to which the user account has no access, synchronize the first folder with the first client device by transmitting a representation of the first folder, but not including any content items within the first folder other than the second folder;
when it is determined that the second user account does not have access rights to the second folder that is located in the path subordinate to the first folder to which the user account has no access, determine if the first folder is associated with a property requiring that the property be visible;
when it is determined that the first folder is associated with a property requiring that the property be visible, synchronize the first folder with the first client device by transmitting a representation of the first folder, but not including any content items within the first folder; and when it is determined that the first folder is not associated with a property requiring that the property be visible, do not synchronize the first folder.

\* \* \* \* \*